US012614812B2

(12) United States Patent
Ko et al.

(10) Patent No.: US 12,614,812 B2
(45) Date of Patent: Apr. 28, 2026

(54) BATTERY MODULE WITH REINFORCED SAFETY

(71) Applicant: LG ENERGY SOLUTION, LTD., Seoul (KR)

(72) Inventors: Yoon-Oh Ko, Daejeon (KR); Sang-Min Baek, Daejeon (KR); Seung-Su Cho, Daejeon (KR); Jong-Tae Choi, Daejeon (KR); Jin-Ju Park, Daejeon (KR); Sang-Yoon Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 36 days.

(21) Appl. No.: 18/665,249

(22) Filed: May 15, 2024

(65) Prior Publication Data

US 2024/0304941 A1 Sep. 12, 2024

Related U.S. Application Data

(63) Continuation of application No. PCT/KR2023/005105, filed on Apr. 14, 2023.

(30) Foreign Application Priority Data

| Apr. 15, 2022 | (KR) | ........................ 10-2022-0047032 |
| Apr. 12, 2023 | (KR) | ........................ 10-2023-0048357 |

(Continued)

(51) Int. Cl.
*H01M 10/00* (2006.01)
*H01M 10/48* (2006.01)
(Continued)

(52) U.S. Cl.
CPC ....... *H01M 50/383* (2021.01); *H01M 10/482* (2013.01); *H01M 10/486* (2013.01);
(Continued)

(58) Field of Classification Search
CPC ............. H01M 50/383; H01M 10/482; H01M 10/486; H01M 50/211; H01M 50/249;
(Continued)

(56) References Cited

U.S. PATENT DOCUMENTS

| 10,446,818 B2 | 10/2019 | Hashimoto et al. |
| 2015/0221909 A1 | 8/2015 | Maruoka et al. |

(Continued)

FOREIGN PATENT DOCUMENTS

| CN | 111668397 A | 9/2020 |
| CN | 113794011 A | 12/2021 |

(Continued)

OTHER PUBLICATIONS

Extended European Search Report for European Application No. 23788652.8, dated Mar. 3, 2025.

*Primary Examiner* — Nicholas P D'Aniello

(74) *Attorney, Agent, or Firm* — Birch, Stewart, Kolasch & Birch, LLP

(57) ABSTRACT

A battery module has an improved structure to control the discharge of a flame generated in the battery module. A battery pack and a vehicle can include the battery module. The battery module includes a cell assembly having a plurality of battery cells stacked side by side and having a taping member partially attached to at least a top sealing portion; a module terminal electrically connected to the cell assembly; and a module case configured to have an outer side at which the module terminal is installed, accommodate the cell assembly in an inner space thereof, and have a top hole communicating with the inner space and formed at an upper side thereof. At the top of the cell assembly, at least a part of an unattached region of the taping member is located in a portion where the top hole is formed.

19 Claims, 31 Drawing Sheets

(30) Foreign Application Priority Data

| Apr. 13, 2023 | (KR) | ........................ 10-2023-0049002 |
| Apr. 13, 2023 | (KR) | ........................ 10-2023-0049009 |

(51) Int. Cl.

| H01M 50/211 | (2021.01) |
| H01M 50/249 | (2021.01) |
| H01M 50/264 | (2021.01) |
| H01M 50/271 | (2021.01) |
| H01M 50/284 | (2021.01) |
| H01M 50/296 | (2021.01) |
| H01M 50/342 | (2021.01) |
| H01M 50/383 | (2021.01) |

(52) U.S. Cl.
CPC ....... *H01M 50/211* (2021.01); *H01M 50/249* (2021.01); *H01M 50/264* (2021.01); *H01M 50/271* (2021.01); *H01M 50/284* (2021.01); *H01M 50/296* (2021.01); *H01M 50/3425* (2021.01); *H01M 2200/20* (2013.01); *H01M 2220/20* (2013.01)

(58) Field of Classification Search
CPC ............. H01M 50/264; H01M 50/271; H01M 50/284; H01M 50/296; H01M 50/3425; H01M 2200/20; H01M 2220/20
See application file for complete search history.

(56) References Cited

U.S. PATENT DOCUMENTS

| 2018/0048036 | A1* | 2/2018 | Melack ............ H01M 10/0481 |
| 2019/0001838 | A1 | 1/2019 | Choi et al. |
| 2019/0280263 | A1* | 9/2019 | Shin ...................... H01M 10/42 |
| 2020/0091484 | A1 | 3/2020 | Guen |
| 2020/0203689 | A1* | 6/2020 | Huang ............. H01M 10/4257 |
| 2021/0050573 | A1 | 2/2021 | Lee |
| 2021/0078714 | A1* | 3/2021 | Demont ............. H01M 50/463 |
| 2021/0320374 | A1 | 10/2021 | Lee et al. |
| 2022/0052392 | A1 | 2/2022 | Jeon et al. |
| 2022/0085421 | A1 | 3/2022 | Tada |
| 2022/0115737 | A1 | 4/2022 | Shin et al. |
| 2022/0247005 | A1 | 8/2022 | Cho et al. |
| 2022/0271387 | A1 | 8/2022 | Shin et al. |
| 2022/0355136 | A1 | 11/2022 | Lee et al. |

FOREIGN PATENT DOCUMENTS

| EP | 3 506 391 | A1 | 7/2019 |
| JP | 2014-175183 | A | 9/2014 |
| KR | 10-2013-0127815 | A | 11/2013 |
| KR | 10-1538634 | B1 | 7/2015 |
| KR | 10-2016-0075468 | A | 6/2016 |
| KR | 10-2017-0010531 | A | 2/2017 |
| KR | 10-2018-0127769 | A | 11/2018 |
| KR | 10-2019-0122474 | A | 10/2019 |
| KR | 10-2020-0107213 | A | 9/2020 |
| KR | 10-2020-0107214 | A | 9/2020 |
| KR | 10-2021-0004189 | A | 1/2021 |
| KR | 10-2021-0042480 | A | 4/2021 |
| KR | 10-2021-0063939 | A | 6/2021 |
| KR | 10-2266389 | B1 | 6/2021 |
| KR | 10-2021-0090965 | A | 7/2021 |
| KR | 10-2021-0097542 | A | 8/2021 |
| KR | 10-2022-0021143 | A | 2/2022 |

* cited by examiner

PH

A3

M1

M2

M3

M4

M5

M6

M7

M8

X

Y (a)                    (b)

(a)                    (b)

BATTERY MODULE WITH REINFORCED SAFETY

The present application is a continuation of PCT/KR2023/005105, filed Apr. 14, 2023, and claims priority to Korean Patent Application No. 10-2022-0047032 filed on Apr. 15, 2022 in the Republic of Korea, Korean Patent Application No. 10-2023-0048357 filed on Apr. 12, 2023 in the Republic of Korea, and Korean Patent Application No. 10-2023-0049002 filed on Apr. 13, 2023 in the Republic of Korea, and Korean Patent Application No. 10-2023-0049009 filed on Apr. 13, 2023 in the Republic of Korea the disclosures of which are incorporated herein by reference.

TECHNICAL FIELD

The present disclosure relates to a battery, and more particularly, to a battery module with reinforced safety, and a battery pack and a vehicle including the battery same.

BACKGROUND ART

As the demand for portable electronic products such as smart phones, tablet PC and smart watches is greatly increasing and electric vehicles are widely propagated, batteries loaded thereon, particularly secondary batteries capable of repeated charging and discharging, are being actively researched.

Currently commercialized secondary batteries include nickel cadmium battery, nickel hydrogen battery, nickel zinc battery, lithium secondary battery, and so on. Among these, the lithium secondary battery has almost no memory effect to ensure free charge and discharge, compared to the nickel-based secondary battery, and the lithium secondary battery is spotlighted due to a very low discharge rate and a high energy density.

The lithium secondary battery mainly uses a lithium-based oxides and a carbon material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed therebetween, and an exterior, or a battery case, for hermetically accommodating the electrode assembly together with an electrolyte.

Generally, the lithium secondary batteries can be classified into a can-type secondary battery having an electrode assembly included in a metal can and a pouch-type secondary battery having an electrode assembly included in a pouch of an aluminum laminate sheet, depending on the shape of the exterior.

Recently, secondary batteries are widely used for driving or energy storage not only in small devices such as portable electronic devices but also in medium and large devices such as electric vehicles and energy storage systems (ESS). These secondary batteries can constitute one battery module in such a form that a plurality of secondary batteries are electrically connected and are stored together in a module case. At this time, each secondary battery included in one battery module can be called a battery cell. In addition, a plurality of battery modules can be connected to form one battery pack.

However, when a plurality of battery modules are included in a battery pack and each battery module includes a plurality of battery cells, this can be vulnerable to a thermal chain reaction between battery modules or between battery cells. For example, when an event such as thermal runaway occurs inside one battery module, propagation of the thermal runaway to another battery module or other battery cell needs to be suppressed. If the propagation of thermal runaway between battery modules or between battery cells is not properly suppressed, an event that has occurred in a specific battery module or battery cell can cause a chain thermal reaction in other battery modules or other battery cells, which can cause an explosion or fire or increase its scale.

In particular, when an event such as thermal runaway occurs in any one battery module, a gas, flame, or the like can be discharged to the outside. At this time, if the discharge of the gas, flame, or the like is not properly controlled, the gas, flame, or the like can be discharged toward other battery modules, and there is a risk of causing a thermal chain reaction of other battery modules. In particular, a module terminal exists at the front side of the battery module, and a component for electrically connecting to another battery module or battery pack, such as a module bus bar, can exist. Therefore, if a flame is discharged to the front side of the battery module, it can damage the module terminal inside the battery pack and cause an electrical short. In addition, since other battery modules can exist at the front side of the battery module, when a flame is discharged to the front side of a specific battery module, the discharged flame is directed to another battery module, and fire spread between battery modules is likely to occur.

If thermal propagation between battery modules or between battery cells is not properly controlled, a voltage drop in the battery module or battery pack can occur rapidly. Also, this can cause unexpected damage by bringing about a sudden shutdown of a device equipped with a battery module or battery pack. For example, if the voltage of the battery pack suddenly drops while the electric vehicle is running, it is not possible to secure enough time to move the electric vehicle to a safe place.

Moreover, if a fire or an explosion suddenly occurs since thermal propagation between battery modules or battery cells is not properly controlled, there is a high possibility of causing human injury to users. For example, when a thermal runaway or the like occurs in an electric vehicle, occupants may not be able to escape safely unless a certain level of time is secured before a full-scale fire proceeds.

DISCLOSURE

Technical Problem

The present disclosure is designed to solve the problems of the related art, and therefore the present disclosure is directed to providing a battery module with an improved structure to appropriately control the discharge of a flame or the like generated in the battery module, and a battery pack and a vehicle including the battery module.

However, the technical problem to be solved by the present disclosure is not limited to the above, and other problems not mentioned herein will be clearly understood by those skilled in the art from the following disclosure.

Technical Solution

In one aspect of the present disclosure, there is provided a battery module, comprising: a cell assembly having a plurality of battery cells stacked side by side in a left and right direction and having at least one taping member partially attached to at least a top sealing portion of each of the plurality of battery cells, an area of the top sealing portion not having the at least one taping member being an unattached region; a module terminal electrically connected to the cell assembly; and a module case configured to have an outer side at which the module terminal is installed, accommodate the cell assembly in an inner space thereof, and have at least one top hole communicating with the inner space and formed at an upper side thereof, wherein at least a part of the unattached region is under the a least one top hole.

The module terminal can be located at a front side of the module case.

In addition, the at least one taping member can be a plurality of taping members, and the plurality of taping members can be spaced apart in a front and rear direction at the top sealing portion of at least one battery cell of the plurality of battery ells.

In addition, at least a part of the at least one top hole can expose a portion between the plurality of taping members.

In addition, the at least one top hole can be configured such that, at the top of the cell assembly, the unattached region is exposed more than the taping member.

In addition, the module case can be configured such that the at least one top hole is located above all of the plurality of battery cells.

In addition, the battery module according to an aspect of the present disclosure can further comprise a thermistor configured to measure a surrounding temperature and disposed at an upper side of the at least one taping member.

In addition, the battery module according to an aspect of the present disclosure can further comprise a top cover made of an electrical insulation material, interposed between an upper portion of the cell assembly and the module case, and having at least one cover hole aligned with the at least one top hole.

In addition, the at least one cover hole may have a plurality of cover holes having a smaller size than the top hole, and the plurality of cover holes are disposed to correspond to the at least one top hole.

In addition, the plurality of cover holes can be formed with a honeycomb structure.

In addition, the battery module according to an aspect of the present disclosure can further comprise a printed circuit board interposed between the cell assembly and the top cover and configured to transmit an electrical signal for the cell assembly, and the top cover can be configured such that the at least one cover hole is not aligned with the printed circuit board.

In addition, the module case can be configured such that the at least one top hole is aligned with the printed circuit board.

In addition, the battery module according to an aspect of the present disclosure can further comprise a blocking cover located at an outer side of the module case and configured to open and close the at least one top hole according to an internal pressure of the module case.

In addition, the battery module according to an aspect of the present disclosure can further comprise a spacer disposed at the top of the blocking cover.

In another aspect of the present disclosure, there is also provided a battery pack, comprising the battery module according to the present disclosure.

In still another aspect of the present disclosure, there is also provided a vehicle, comprising the battery module according to the present disclosure.

A battery module can have a cell assembly having a plurality of battery cells stacked in a first direction and having at least one taping member attached to a top sealing portion of each of the plurality of battery cells, an area of the top sealing portion not having the at least one taping member being an unattached region, a module case configured accommodate the cell assembly in an inner space thereof, a plurality of top holes formed at an upper side of the module case, wherein the plurality of top holes are arranged in rows and columns so that a portion of each of the plurality of battery cells is exposed.

The at least one taping member can be a plurality of taping members, and the plurality of taping members can be attached with different bonding strengths.

Taping members of the plurality of taping members closer to an end of each of the plurality of battery cells can have a higher bonding strength than taping members of the plurality of taping members further from the end of each of the plurality of battery cells.

A blocking cover can be on the upper side of the module case, the blocking cover having a plurality of opening and closing portions aligned with the plurality of top holes, the plurality of opening and closing portions rupturing when internal pressure of the module case exceeds a predetermined value.

Advantageous Effects

According to the present disclosure, when gas or flame is generated inside the battery module, the discharge of the gas or flame can be appropriately controlled.

In particular, according to one aspect of the present disclosure, the flame of the cell ignited inside the battery module can be directed toward a direction other than the direction where the electrode lead or module terminal is located.

Therefore, according to this aspect of the present disclosure, the propagation of thermal runaway between battery modules can be prevented, and the spread of fire can be prevented or suppressed.

In addition, according to this aspect of the present disclosure, it is possible to prevent an electrical short from occurring inside the battery pack.

Also, according to one aspect of the present disclosure, when a battery cell is ignited, exposure of flame to the outside of the battery pack can be suppressed as much as possible.

In addition, according to one aspect of the present disclosure, propagation of thermal runaway between battery cells or between battery modules can be more effectively prevented or suppressed.

In particular, according to one aspect of the present disclosure, even if gas or flame is generated in a specific battery cell, it is possible to prevent or minimize the effect of gas or flame to other adjacent battery cells.

Therefore, according to this aspect of the present disclosure, even if thermal runaway occurs in a specific battery cell or a specific battery module, thermal propagation between cells or between modules can be prevented or slowed down. Therefore, it is possible to secure time for the user to take appropriate measures such as escape or fire suppression.

According to one aspect of the present disclosure, a battery module with improved safety and an application device thereof can be provided. In particular, when the battery module according to the present disclosure is applied to a vehicle, occupant safety can be ensured more effectively.

The present disclosure can have various other effects in addition to the above, and such effects will be described in each aspect, or any effect that can be easily inferred by those skilled in the art will not be described in detail.

DESCRIPTION OF DRAWINGS

The accompanying drawings illustrate a preferred aspect of the present disclosure and together with the foregoing disclosure, serve to provide further understanding of the technical features of the present disclosure, and thus, the present disclosure is not construed as being limited to the drawing.

BEST MODE

Hereinafter, preferred aspects of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Meanwhile, in this specification, terms indicating directions such as "up", "down", "left", "right", "front" and "rear" used, but these terms are merely for convenience of description and can vary depending on the location of an object or the location of an observer, as apparent to those skilled in the art.

In addition, in this specification, terms indicating directions such as "inner" or "outer" can be used, but, unless otherwise specified, "inner" can mean a direction toward the central portion of the battery module, and "outer" can mean a direction opposite thereto.

In addition, various aspects are included in this specification, but features identical or similar to those of other aspects will not be described in detail, and different features will be described in detail for each aspect.

Figure 1:
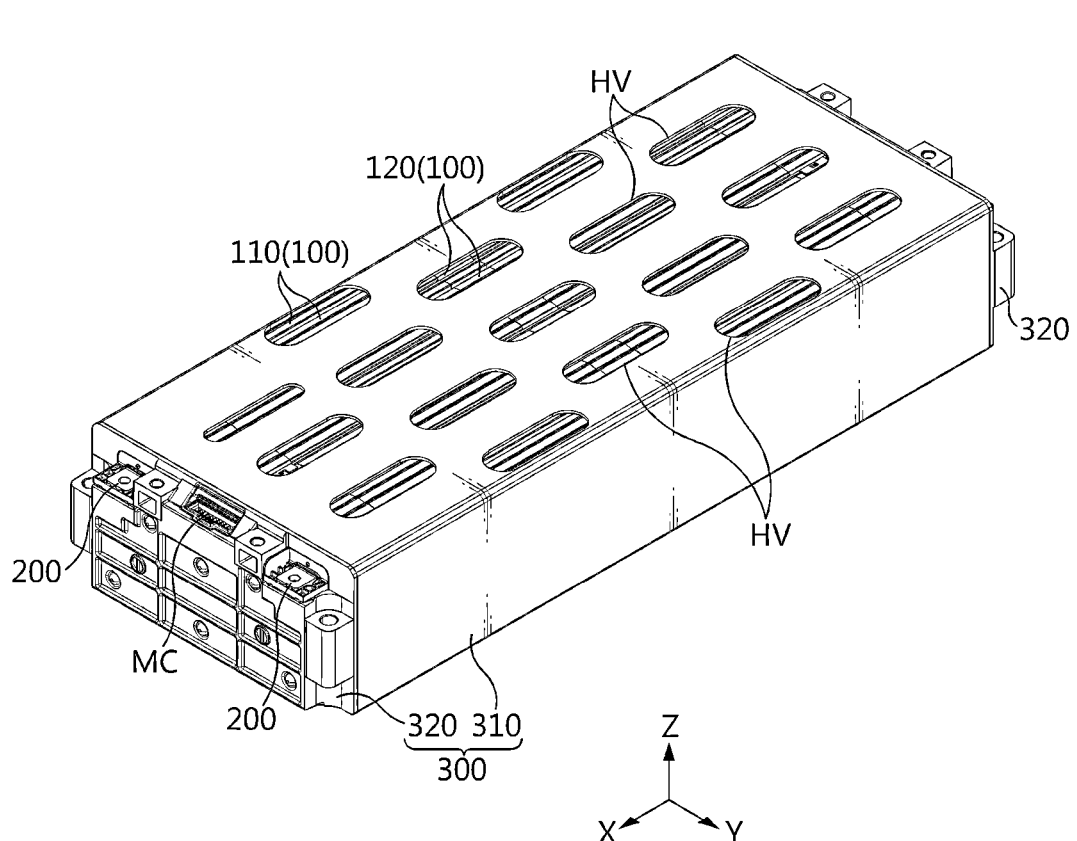
FIG. 1 is a perspective view schematically showing a battery module according to an aspect of the present disclosure.

FIG. 1 is a perspective view schematically showing a battery module according to an aspect of the present disclosure. Also, FIG. 2 is an exploded perspective view of FIG. 1.

Figure 2:
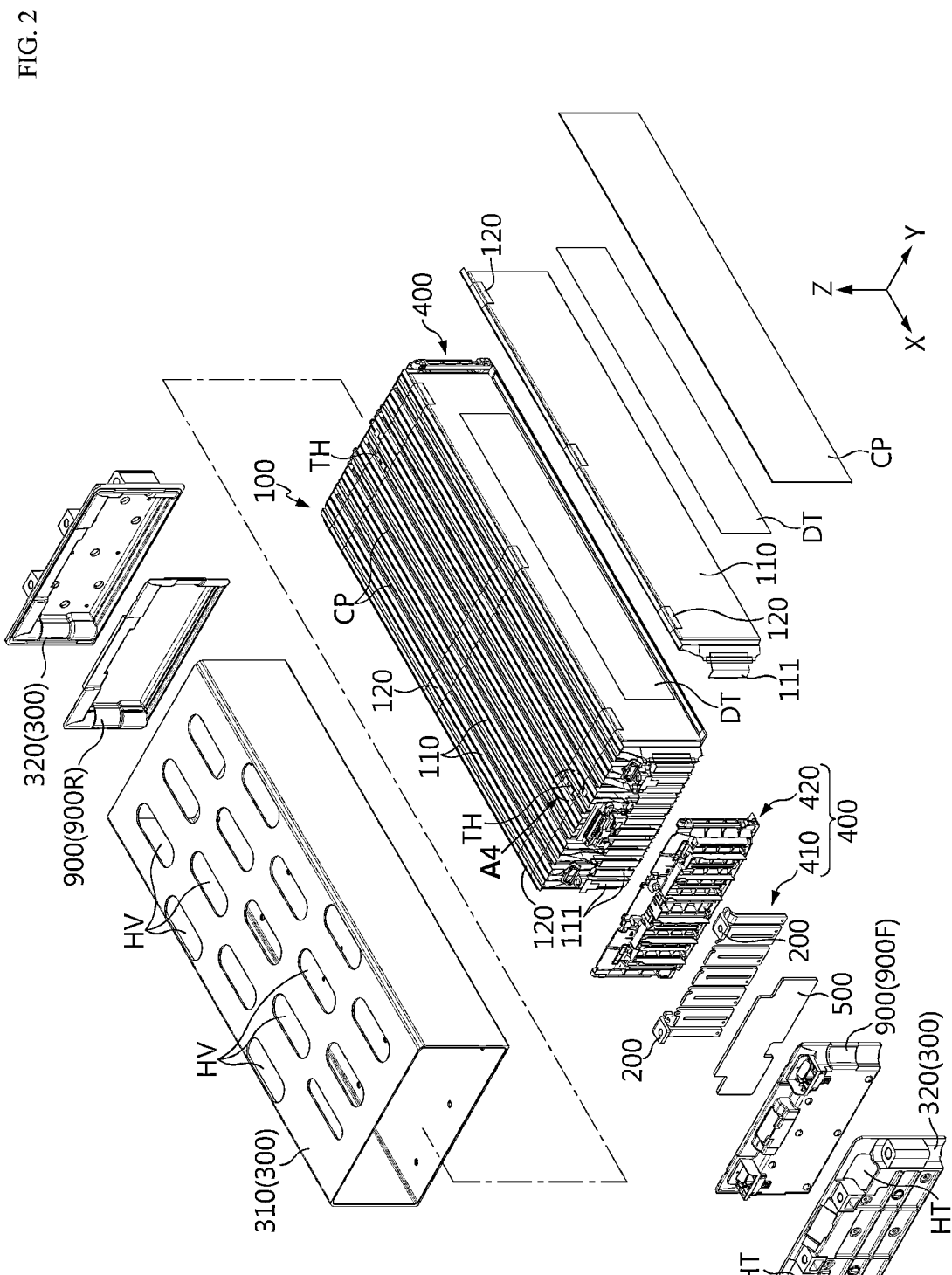
FIG. 2 is an exploded perspective view of FIG. 1.

Referring to FIGS. 1 and 2, a battery module according to the present disclosure can include a cell assembly 100, a module terminal 200, and/or a module case 300.

The cell assembly 100 can include a plurality of battery cells 110. Here, each battery cell 110 can mean a secondary battery. A secondary battery can include an electrode assembly, an electrolyte, and a battery case. In particular, the battery cell 110 can be a pouch-type secondary battery. The configuration of the pouch-type battery will be described in more detail with reference to FIG. 3.

Figure 3:
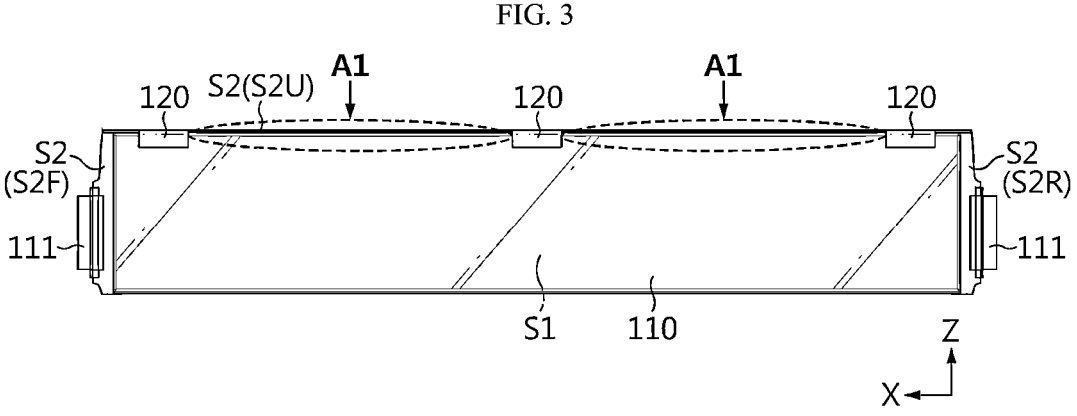
FIG. 3 is a diagram schematically showing a battery cell and a taping member included in the battery module according to an aspect of the present disclosure.

FIG. 3 is a diagram schematically showing a battery cell 110 and a taping member 120 included in the battery module according to an aspect of the present disclosure.

Referring to FIG. 3, the battery cell 110 is a pouch-type battery, and the case can be made of a pouch exterior. In particular, the pouch-type battery can include an accommodation portion and a sealing portion.

Here, the accommodation portion can be a portion formed so that the electrode assembly is accommodated inside the pouch exterior and protrudes outward, as indicated by S1 in FIG. 3. Also, the sealing portion can be a portion formed so that two pouch exteriors are fused around the accommodation portion S1, as indicated by S2 in FIG. 3. In particular, when the pouch-type battery is formed in a substantially rectangular shape, the sealing portion S2 can be located at three or four corners of the edge of the pouch-type battery. At this time, a pouch-type battery in which the sealing portion S2 is located at four corners can be referred to as a four-sided sealing cell, and a pouch-type battery in which the sealing portion S2 is located at three corners can be referred to as a three-sided sealing cell. For example, the battery cell 110 shown in FIG. 3 can be a three-sided sealing cell in which an upper edge, a front edge, and a rear edge are sealed.

The plurality of battery cells 110 can be stacked in parallel in at least one direction. For example, as shown in FIG. 2, the plurality of battery cells 110 can be stacked side by side in a left and right direction (Y-axis direction). At this time, each battery cell 110 can be configured in a state of being erected in an upper and lower direction (Z-axis direction). For example, as shown in FIGS. 2 and 3, the plurality of battery cells 110 provided in the cell assembly 100 can be arranged side by side in a left and right direction in a state of being erected so that the accommodation portion S1 faces the left and right direction and the sealing portion S2 faces the front and rear direction and the upper direction. In addition, the battery cells 110 can be stacked so that the accommodation portions S1 thereof face each other.

Here, in order to more stably maintain the stacked state of the cell assembly 100, the battery cells 110 can be bonded to each other. For example, as indicated by DT in FIG. 2, a cell adhesion member can be interposed between the battery cells 110. In this case, the cell adhesion member DT can be configured in the form of a double-sided adhesive tape in which an adhesive is applied to both surfaces of a substrate.

In the pouch-type cell, the electrode lead 111 can be disposed to protrude in a front and rear direction. For example, as shown in FIG. 3, the electrode lead 111 can be provided at the front (+X-axis direction) end and the rear (−X-axis direction) end of the pouch-type cell, respectively.

Meanwhile, in this specification, unless otherwise specified, a direction in which the battery cells 110 are stacked can be referred to as a left and right direction, and a direction in which the electrode lead 111 is located in each battery cell 110 can be referred to as a front and rear direction. Therefore, in each figure, the X-axis direction is described as representing a front and rear direction, and the Y-axis direction is described as representing a left and right direction.

In addition, the battery module according to the present disclosure can include a compression pad, as indicated by CP in FIG. 2.

The compression pad CP can be disposed between at least some of the battery cells 110 and/or the outer side of the stack in the cell assembly 100. For example, in a plurality of battery cells 110 stacked in the left and right direction, the compression pad CP can be configured to be disposed between every four battery cells 110.

The compression pad CP can be made of an elastic material to absorb swelling of the battery cells 110. For example, the compression pad CP can be made of a foam material such as polyurethane. Alternatively, the compression pad CP can include a material capable of blocking heat or flame. For example, the compression pad CP can include a heat insulation or fire prevention material such as silicon or mica.

The sealing portion of a pouch battery cell can be provided with reinforcement at discrete locations. Therefore, when increased pressure within the pouch causes a rupture in the sealing portion, the location of the rupture can be controlled to be areas that are not reinforced. The sealing portion can be provided with several reinforced locations, creating several areas that are not reinforced between the reinforcements. Moreover, the reinforcements themselves can have varying degrees of strength, so that rupture at a particular reinforcement can occur before rupture at other reinforcements. One way to provide reinforcement is the application of tape to the sealing portion. In the cell assembly 100, a taping member 120 can be attached to each of the plurality of battery cells 110. That is, in the battery module according to the present disclosure, the cell assembly 100 can include a taping member 120 together with the battery cell 110.

The taping member 120 can have an adhesive on at least one surface thereof and be attached to the battery cell 110. Moreover, the taping member 120 can be attached to the sealing portion of the battery cell 110. In particular, as shown in FIGS. 2 and 3, the taping member 120 can be attached to at least a top sealing portion of the battery cell 110 when each battery cell 110 is disposed in an erected form.

More specifically, as shown in FIG. 3, in the battery cell 110, the sealing portion can include a front end sealing portion as indicated by S2F, a rear end sealing portion as indicated by S2R, and a top sealing portion as indicated by S2U. At this time, the taping member 120 can be attached to the top sealing portion S2U located on the upper side among the various sealing portions.

The taping member 120 can be attached to the accommodation portion S1 as well as the top sealing portion S2U. Moreover, when viewing the battery cell 110 from the front side, the accommodation portion S1 can be disposed to protrude left and/or right based on the top sealing portion S2U. In this case, the central portion of the taping member 120 can be bonded to the top sealing portion S2U, and both left and right ends thereof can be bonded to the accommodation portion S1 disposed in the left and right direction, respectively.

Meanwhile, in terms of reducing the space occupied by the battery cell 110 inside the battery module, at least one sealing portion S2 can be folded. For example, referring to FIG. 3, the top sealing portion S2U where the electrode lead 111 is not located can be folded. The folding of the sealing portion S2 can be referred to as side folding or wing folding. In addition, a manufacturing process in which the sealing portion S2 is folded twice, or a portion in which such a process is performed can also be referred to as double side folding (DSF). In FIG. 3, it can be regarded that the top sealing portion S2U is shown in a double-side folded form.

In this aspect in which the top sealing portion S2U is folded, the taping member 120 can be configured to maintain the folded shape. For example, the taping member 120 can be attached to the battery cell 110 in a form of fixing the top sealing portion S2U and the accommodation portions S1 at both sides in a state where the top sealing portion S2U is folded twice.

The taping member 120 can be attached only to a certain region of the specific sealing portion of the battery cell 110, rather than to the entire region thereof. Accordingly, a region to which the taping member 120 (tape) is attached and a region to which the taping member 120 (tape) is not attached can exist together in a specific sealing portion of the battery cell 110.

For example, in FIG. 3, since the taping member 120 is attached to the top sealing portion S2U of the battery cell 110 but does not extend over an entirety of the sealing portion, there can be a region to which the taping member 120 is not attached, as indicated by A1.

The taping member 120 can reduce the space occupied by the cell assembly 100 by fixing the folding configuration of the sealing portion. In addition, the taping member 120 can suppress swelling in the Z-axis direction of the cell assembly 100. That is, while the battery cell 110 is in use, gas can be accumulated therein to cause a swelling phenomenon of the cell, and the taping member 120 can suppress the expansion of the cell in the upper direction.

The module terminal 200 can be electrically connected to the cell assembly 100. In particular, the cell assembly 100 includes a plurality of battery cells 110, and the plurality of battery cells 110 can be electrically connected to each other in series and/or parallel. Also, the plurality of battery cells 110 electrically connected in this way can be connected to other components outside the battery module, such as other battery modules or pack terminals. For example, the module terminal 200 can be connected to a bus bar between modules and be electrically connected to another battery module.

A charging and discharging current for the cell assembly 100 flows in the module terminal 200, and the module terminal 200 can be regarded as a gateway of an electrical path provided to connect such a charging and discharging current to other components located outside the battery module. The module terminal 200 can have two terminals, namely a positive terminal and a negative terminal.

In the module case 300, the module terminal 200 can be installed at an outer side. That is, in order to facilitate connection with external components, the module terminal 200 can be configured to be exposed to the outside of the battery module. In particular, the module terminal 200 can be located at the upper side of the battery module to improve connection convenience.

The module case 300 can have an inner space formed therein to accommodate the cell assembly 100 in the inner space. For example, as shown in FIGS. 1 and 2, the module case 300 can include a body frame 310 formed in a tubular shape with both ends open and an end frame 320 covering the openings at both ends of the body frame 310. The body frame 310 of this type is open at the front and rear sides, and can include a left plate, a right plate, an upper plate, and a lower plate. Also, the left plate, the right plate, the upper plate, and the lower plate can be formed integrally with each other, and the body frame 310 can be referred to as a mono frame. In addition, the end frames 320 located at the front and rear sides of the body frame 310 can be referred to as a front frame (front plate) and a rear frame (rear plate), respectively.

In this aspect, the module case 300 can define an inner space by the body frame 310 and the end frame 320, and allow various components including the cell assembly 100 to be accommodated in the inner space.

In addition, the module case 300 can be formed in various other shapes. For example, the left plate, the right plate, and the lower plate can be integrated with each other. In this case, the integrated case part can be referred to as a U-frame. Alternatively, the module case 300 can include a box-shaped lower case in which a left plate, a right plate, a front frame, and a rear frame are integrated, and an upper cover closing the upper open end of the lower case.

The components of the module case 300, for example the body frame 310 and the end frame 320, can be coupled to each other in various ways such as welding, insertion, adhesion, and hooking. In addition, the module case 300 can be made of various materials such as metal or plastic. In particular, both the body frame 310 and the end frame 320 can be made of aluminum. In this case, mutual weldability is excellent, it is advantageous for weight reduction, and cooling performance can be improved.

The module case 300 can have a top hole formed in at least one side, as indicated by HV in FIG. 2. The top hole HV can be provided to communicate with the inner space of the module case 300 by penetrating the module case 300 inward and outward. In particular, the top hole HV can be formed in the upper side of the module case 300. For example, when the module case 300 is configured in the form of a mono frame having an upper plate, a lower plate, a left plate, and a right plate as shown in FIG. 2, the top hole HV can be formed in the upper plate.

In addition, a plurality of top holes HV can be formed in the upper plate of the module case 300. For example, the plurality of top holes HV can be arranged in a horizontal direction, namely in the front and rear direction (X-axis direction) and/or the left and right direction (Y-axis direction) in the upper side of the body frame 310.

When the top hole HV is formed in the upper side of the module case 300 as above, the top of the cell assembly 100 can be disposed to face the top hole HV of the module case 300. In this case, the module case 300 can be configured such that at least a part of the taping member 120 among the top of the cell assembly 100 is located at a portion where the top hole HV is formed.

For example, referring to FIG. 3, the taping member 120 can be partially cover the sealing portion, rather than an entirety of the top sealing portion S2U of the plurality of battery cells 110 included in the cell assembly 100. Accordingly, an unattached region to which the taping member 120 is not attached can exist in the top sealing portion S2U of the battery cell 110, as indicated by A1. The top hole HV of the module case 300 can be positioned at a place where at least a part of the unattached region A1 of the taping member 120 is located. More specifically, in FIG. 3, the top hole HV can be formed in the module case 300 such that at least a part thereof is located above the unattached region indicated by A1. This configuration will be described in more detail with further reference to FIG. 4.

Figure 4:
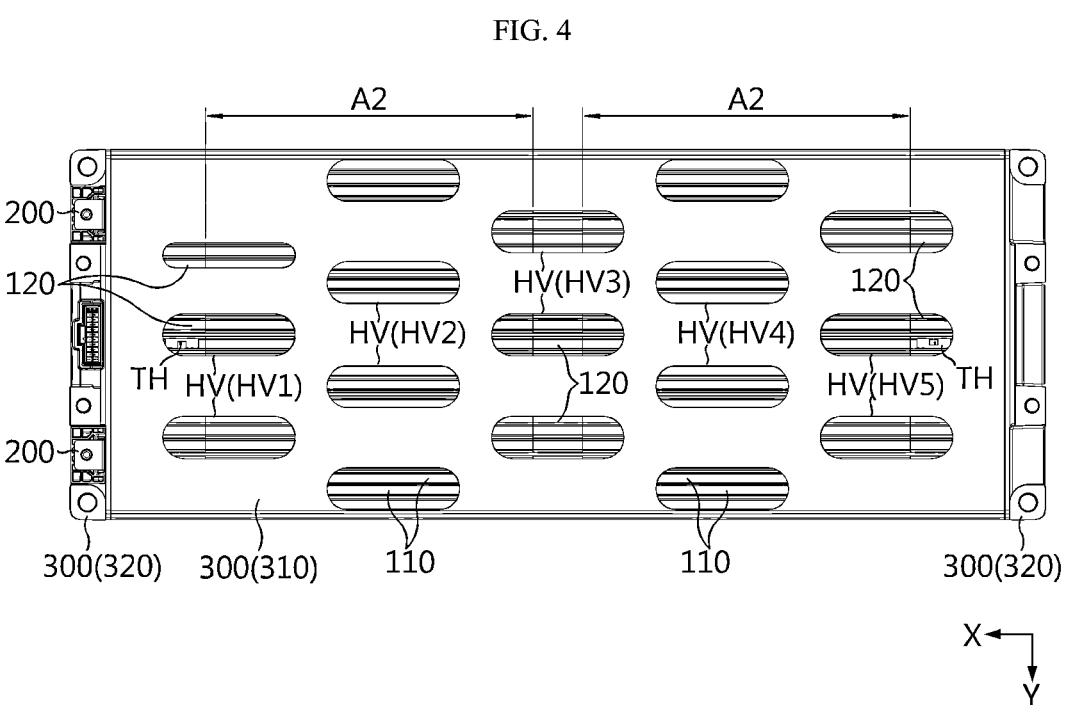
FIG. 4 is a top view schematically showing the battery module according to an aspect of the present disclosure.

FIG. 4 is a top view schematically showing the battery module according to an aspect of the present disclosure.

Referring to FIG. 4, the upper side of the cell assembly 100 accommodated in the inner space of the module case 300 can be exposed through the top hole HV formed in the upper plate of the module case 300. In this case, at least a part of the top hole HV can be formed such that at least a part of the unattached region to which the taping member 120 is not attached is exposed, among the upper portion of the cell assembly 100. For example, in FIG. 4, the region indicated by A1 in the X-axis direction (front and rear direction) can be an unattached region of the taping member 120 in the upper portion of the cell assembly 100. In this case, the top hole HV can be formed in the body frame 310 such that at least a part of the unattached region is exposed to the outside.

According to this aspect of the present disclosure, when a venting gas, flame, or the like is generated inside the battery module due to an event such as thermal runaway, the gas or flame can be smoothly discharged to the outside of the module case 300. Therefore, in case of an emergency, the internal pressure of the module case 300 can be quickly lowered to prevent the battery module from exploding.

In addition, according to an aspect of the present disclosure, it is possible to appropriately control the discharge direction of gas or flame. Therefore, it is possible to minimize heat propagation or flame propagation between battery modules due to discharge of gas or flame.

In particular, according to an aspect of the present disclosure, during high-temperature storage or generation of an internal gas, the Z-axis directional swelling of the battery cell 110 can be properly controlled or suppressed by the taping member 120 attached to the top sealing portion S2U (e.g., the DSF portion), and in an emergency such as thermal runaway, a venting gas, flame, or the like can be induced to be ejected toward the top sealing portion S2U. That is, in this aspect of the present disclosure, since the taping member 120 is only attached to certain locations of the top sealing portion S2U of the battery cell 110, the fixing force can be weakened compared to the case where the taping member 120 is attached to the entire top sealing portion S2U. Therefore, when a gas, flame, or the like is ejected from the inside of the battery cell 110 to the outside, the ejection can be made toward the top sealing portion S2U. In addition, since the top hole HV is provided in the top side of the cell assembly 100 in the module case 300, a gas, flame, or the like can be quickly and smoothly discharged to the outside of the module case 300.

In particular, among the top sealing portion S2U of the battery cell 110, the fixing force of the unattached region of the taping member 120 can be the weakest. Thus, a gas, flame, or the like is likely to be emitted first through the unattached region. Therefore, when the top hole HV is formed at a position directly corresponding to the unattached region of the taping member 120 as in this aspect, a gas, flame, or the like emitted from the cell assembly 100 can be more easily discharged to the outside.

The taping member 120 can be separately attached to each battery cell 110 or commonly attached to several battery cells 110.

In particular, when a plurality of battery cells 110 is provided in the cell assembly 100, a separate taping member 120 can be attached to each battery cell 110. That is, the taping member 120 can be independently attached to each battery cell 110. For example, when twenty battery cells 110 are arranged in a left and right direction in the cell assembly 100, a separate taping member 120 can be attached to the top sealing portion S2U of each of the twenty battery cells 110.

In this case, even if the taping member 120 is separated from a specific battery cell 110 due to the ejection of gas, flame, or the like, the taping member 120 of other battery cells 110 can be maintained as it is. Accordingly, the function of the taping member 120 in other battery cells 110 can be maintained.

In addition, when a problem such as thermal runaway occurs in a specific battery cell 110, a temperature rise can occur first before a gas, flame, or the like is ejected. In addition, the temperature rise can weaken the bonding strength of the taping member 120 attached to the corresponding battery cell 110. Therefore, even if the taping member 120 is attached to the top sealing portion S2U, the bonding force is not strong, so it is possible to make easy ejection toward the top sealing portion S2U.

The module terminal 200 can be located at the front side of the module case 300. For example, as seen in FIG. 2, the electrode leads 111 of each battery cell 110 can be provided to protrude to the front and rear sides of the cell assembly 100, and the module terminal 200 can be electrically connected to the electrode leads 111. Here, the module terminal 200 can include a positive electrode terminal and a negative electrode terminal, and both the positive electrode terminal and the negative electrode terminal can be installed at the front side of the module case 300.

In particular, the battery module according to the present disclosure can include a bus bar assembly 400. The bus bar assembly 400 can be connected to the electrode lead 111 of the battery cell 110. Moreover, as shown in FIG. 3, the electrode leads 111 of the battery cell 110 can be located at both front and rear ends of the cell assembly 100. In this case, the bus bar assembly 400 can be disposed at the front side and the rear side of the cell assembly 100, respectively.

More specifically, the bus bar assembly 400 can include a bus bar terminal 410 and a bus bar housing 420. At this time, the bus bar terminal 410 is made of a conductive metal material such as copper and can be in direct contact with the electrode lead 111. In addition, the bus bar housing 420 is made of an electrically insulating material such as plastic, and the position of the bus bar terminal 410 can be fixed by allowing the bus bar terminal 410 to be mounted. To this end, in the bus bar housing 420, a space or structure in which the bus bar terminal 410 can be mounted can be provided.

The bus bar assembly 400 can include at least one unit bus bar according to a series or parallel connection state of the plurality of battery cells 110 included in the cell assembly 100. For example, as shown in FIG. 2, a plurality of bus bar terminals 410 (unit bus bars) can be mounted to one bus bar housing 420. At this time, the bus bar housing 420 can prevent contact between different unit bus bars.

The module terminal 200 can be connected to the bus bar terminal 410 of the bus bar assembly 400. For example, the module terminal 200 can be connected to the upper portion of the bus bar terminal 410. In particular, the module terminal 200 can be integrated with at least a part of the bus bar terminal 410. For example, in FIG. 2, the module terminal 200 can be provided in an integral form with the bus bar terminals 410 located at the outermost side in the left and right direction. As a more specific example, among the plurality of bus bar terminals 410, the bus bar terminal 410 located at the leftmost side can be configured such that the positive electrode terminal of the battery module is integrated at the top. In addition, the bus bar terminal 410 located at the rightmost side can be configured in an integrated form with the negative electrode terminal of the battery module.

The module terminal 200 can be connected to the bus bar assembly 400 located inside the module case 300, and also needs to be exposed to the outside of the module case 300 for connection with external components. Accordingly, a hole through which the module terminal 200 is exposed to the outside can be formed in the module case 300. Moreover, since the module terminal 200 is located at the front side of the module case 300, the hole can be formed in the front frame located at the front side of the module case 300. As a more specific example, as seen in FIG. 2, a terminal hole can be formed at the top of the front frame, as indicated by HT. Also, the module terminal 200 connected to the bus bar terminal 410 can be exposed to the outside of the module case 300 through the terminal hole HT.

As in this aspect, when the module terminal 200 is located at the front side of the module case 300, the module terminal 200 can be easily connected with the bus bar terminal 410 located at the front side of the cell assembly 100. In particular, according to this aspect of the present disclosure, the top hole HV is formed in the upper side of the module case 300, and the unattached region of the top sealing portion is aligned with the top hole HV at the upper side.

Therefore, when a high-temperature gas, flame, or the like is ejected from the battery cell 110, the high-temperature gas, flame, or the like can be easily discharged to the upper side where the electrode lead 111 is not located. That is, according to the aspect of the present disclosure, it is possible to suppress or delay discharge of a flame or the like in a direction where the module terminal 200 is located. Moreover, the terminal hole HT can be formed in the module case 300 so that the module terminal 200 can be exposed to the outside, and according to this aspect, it is possible to prevent or suppress a flame or the like from being discharged through the terminal hole HT. In this case, it can be more effective to suppress heat propagation between battery modules or prevent voltage drop of the battery pack. This will be described in more detail with further reference to FIGS. 5 and 6.

Figure 5:
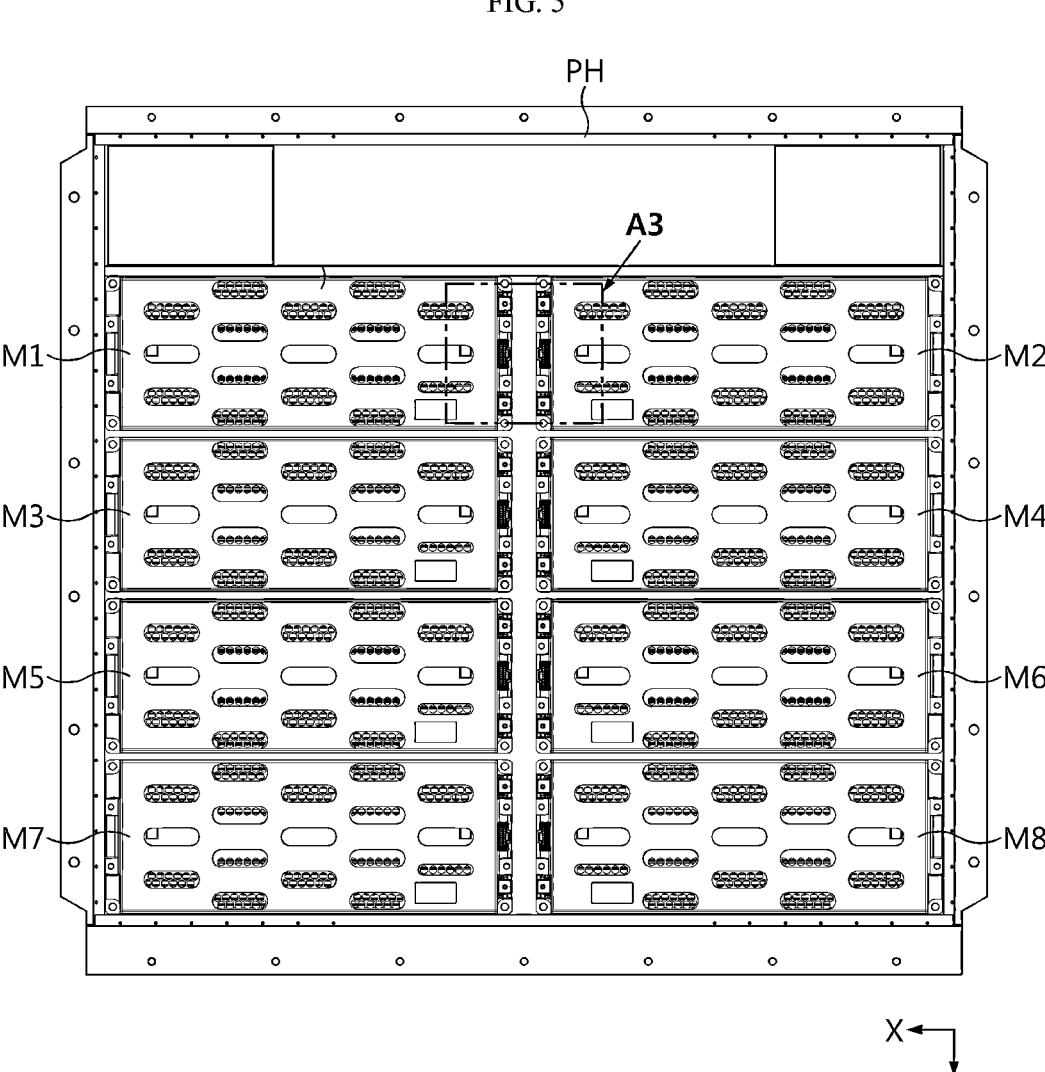
FIG. 5 is a top view schematically showing a battery pack including a plurality of battery modules according to an aspect of the present disclosure.
Figure 6:
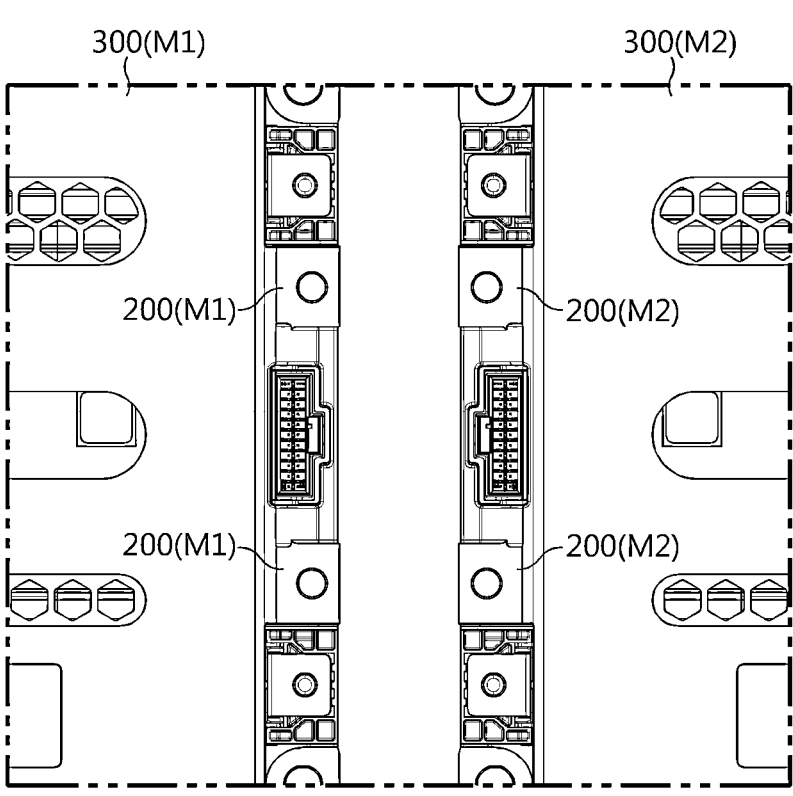
FIG. 6 is an enlarged view showing the portion A3 of FIG. 5.

FIG. 5 is a top view schematically showing a battery pack including a plurality of battery modules according to an aspect of the present disclosure. Moreover, FIG. 5 can also be regarded as a diagram showing a battery pack according to an aspect of the present disclosure. FIG. 6 is an enlarged view showing the portion A3 of FIG. 5.

Referring to FIGS. 5 and 6, a plurality of battery modules according to an aspect of the present disclosure can be accommodated in the inner space of the pack housing PH. As an example, the battery pack can include eight battery modules, as indicated by M1 to M8 in FIG. 5. At this time, each battery module can include the module terminal 200 at the side facing another battery module. For example, in FIG. 6, the module terminal 200 can be located at the end in the −X-axis direction of the first module M1, and the module terminal 200 can be located at the end in the +X-axis direction of the second module M2.

Moreover, in the battery module according to the present disclosure, the module terminal 200 can be arranged to be located at the front side, and as seen in FIGS. 5 and 6, two battery modules can be disposed inside the pack housing PH such that their front sides face each other. When each battery module is arranged so that the module terminal 200 is located at the side close to another battery module, the battery modules can be easily connected to each other using a module bus bar or the like.

In the arrangement of the plurality of battery modules, if a flame or high-temperature gas is discharged toward the module terminal 200, a fire is likely to spread to other battery modules or a thermal runaway propagation problem is likely to occur. However, in the battery module according to the present disclosure, discharge of a flame, gas, or the like toward the module terminal 200 can be suppressed, and thus fire spread or heat propagation problems between modules can be more effectively prevented.

In addition, the front or rear side where the electrode lead 111 is located inside the module case 300 can have a relatively wide space compared to other parts. At this time, if the flame or the like is not properly discharged to the outside of the module case 300, the flame is concentrated toward the electrode lead 111, and the voltage of the battery module can decrease rapidly. However, if the flame is discharged to the upper side and is not discharged toward the electrode lead 111 as in the aspect of the present disclosure, the short circuit between cells can be suppressed and the voltage drop time of the battery module can be delayed as much as possible. Moreover, in this case, the drop time when the voltage of the battery module drops to 0V can be maintained at a certain level or more, for example 5 minutes or more. In addition, if the flame is prevented from heading toward the electrode lead 111, it can be advantageous in suppressing thermal runaway or flame propagation between the battery cells 110 included in one battery module.

Therefore, when the battery module is mounted on an electric vehicle or the like, even if a flame occurs in a specific battery cell 110 due to thermal runaway or the like, it is possible to operate the electric vehicle for a certain period of time, thereby securing the time during which the occupant can move the electric vehicle to a safe place or escape.

A plurality of taping members 120 can be attached to one battery cell 110. In particular, the plurality of taping members 120 can be attached to be spaced apart in the front and rear direction on the top sealing portion S2U of one battery cell 110.

For example, referring to FIG. 3, a plurality of taping members 120 are attached to the top DSF of one battery cell 110, and the plurality of taping members 120 can be disposed to be spaced apart by a predetermined distance in the front and rear direction (X-axis direction).

In this aspect, an unattached region as indicated by A1 can be formed in the space between the taping members 120 spaced apart in the front and rear direction. Also, since the unattached region of the taping member 120 is formed in this way, when the internal pressure of the battery cell 110 increases, the top sealing portion S2U can burst.

According to this aspect, swelling and venting of the battery cell 110 can be appropriately controlled according to circumstances. That is, the taping member 120 controls swelling in the Z-axis direction of the battery cell 110 when the internal pressure of the battery cell 110 is below a certain level, while the taping member 120 can allow the top portion of the battery cell 110 to burst when the internal pressure of the battery cell 110 exceeds a certain level. Therefore, by directing the gas, flame, or the like to the upper side of the battery module, it can be more effective in controlling venting smoothly and suppressing heat propagation between modules.

As shown in FIGS. 2 and 3, three taping members 120 can be attached in the front and rear direction in one battery cell 110. At this time, two taping members 120 can be disposed to be positioned as far as possible in the front and rear direction on the top sealing portion S2U (DSF) of the battery cell 110. In addition, the remaining one taping member 120 can be disposed at the center in the front and rear direction on the top sealing portion S2U (DSF) of the battery cell 110.

According to this aspect, the Z-axis directional swelling is appropriately suppressed through the taping member 120, and the fixing force of the taping member 120 is not excessively set with respect to the top sealing portion S2U, so that the top sealing portion S2U can burst at an appropriate time. In addition, according to this aspect, the separation distance between the taping members 120 in the front and rear direction is appropriately secured, so that the top hole HV can be formed in a sufficient number or sufficient width over the unattached region. Therefore, a venting gas, flame, or the like can be smoothly discharged by the top hole HV.

At least a part of the top hole HV can be configured to expose a portion between the plurality of taping members 120 spaced apart in the front and rear direction to the outside. That is, in the top sealing portion S2U of the battery cell 110, a space between the taping members 120 spaced apart in the front and rear direction can exist as the unattached region, as indicated by A1 in FIG. 3. In addition, the top hole HV can be arranged to correspond to at least a part of the taping unattached region of the battery cell 110.

More specifically, as shown in FIG. 4, a plurality of top holes HV can be formed at the upper side of the module case 300. Moreover, the plurality of top holes HV can be arranged in the front and rear direction (X-axis direction) of the battery module. At this time, among the plurality of top holes HV, at least some top holes HV can be formed at a position and/or in a shape by which the unattached region can be exposed to the outside.

For example, the plurality of top holes HV can be arranged to form five rows in the front and rear direction, from the first venting row HV1 to the fifth venting row HV5. At this time, the second venting row HV2 and the fourth venting row HV4 are formed through the module case 300 so that the unattached region of the top sealing portion S2U can be exposed to the outside with respect to the plurality of battery cells 110 included in the cell assembly 100.

According to this aspect of the present disclosure, a venting gas, flame, or the like can be quickly discharged to the outside through the top hole HV disposed to face the unattached region of the top sealing portion. Therefore, the venting gas, flame, or the like is prevented from staying inside the module case 300, thereby suppressing heat propagation between the battery cells 110 and rapidly lowering the internal pressure of the module case 300 to prevent explosion or the like of the battery module.

Moreover, according to this aspect, a flame or the like can be prevented from moving toward the module terminal 200 located at the front side of the module case 300. Therefore, it is possible to more effectively prevent heat propagation between battery modules.

In addition, the top hole HV can be configured such that, at the top of the cell assembly 100, the unattached region of the top sealing portion is exposed more than the taping member 120. In particular, on the upper plate of one module case 300, a plurality of top holes HV can be provided in the form of opening the inside of the module case 300 to the outside. Here, among the top sealing portion S2U of the module case 300, only the unattached region of the top sealing portion can be exposed through the plurality of top holes HV. Alternatively, the taping member 120 can be exposed to the outside together with the unattached region through the plurality of top holes HV. In this case, the top hole HV can be configured so that the unattached region is exposed relatively more than the taping member 120.

For example, as seen in FIG. 4, among the plurality of top holes HV, the second venting row HV2 and the fourth venting row HV4 can be configured such that only the unattached region is exposed and the taping member 120 is not exposed. In addition, the first venting row HV1, the third venting row HV3, and the fifth venting row HV5 can be configured such that the unattached region and the taping member 120 are exposed to the outside together. At this time, the first venting row HV1, the third venting row HV3, and the fifth venting row HV5 can be configured so that, when viewed from the top, the externally exposed area of the unattached region is larger than the externally exposed area of the taping member 120.

In this aspect, the top hole HV can be configured so that the open area for the unattached region is 1.5 times or more, 2 times or more, or 3 times or more compared to the open area of the taping member 120.

According to this aspect of the present disclosure, the portion to which the taping member 120 is not attached is more exposed to the top hole HV, so that a flame, gas, or the like can be discharged more quickly and smoothly through the top hole HV. Therefore, it is possible to more reliably suppress a flame or the like from being discharged toward the module terminal 200, for example toward the battery module.

The module case 300 can be configured such that the top hole HV is located on the top of all battery cells 110 included in the cell assembly 100. For example, as shown in FIG. 2, a plurality of battery cells 110 can be arranged side by side in an erected state in the left and right direction (Y-axis direction). In this case, the module case 300 can be provided so that the top sealing portions S2U of all the plurality of battery cells 110 stacked in the left and right direction directly face the top holes HV. That is, the tops portion of all battery cells 110 can be exposed to the outside through at least one of the top holes HV.

More specifically, as seen in FIG. 4, a plurality of top holes HV can be arranged in the Y-axis direction, and the top portions of all battery cells 110 can be exposed to the outside through the plurality of top holes HV. In particular, the unattached regions of all battery cells 110 can be configured to be directly under one of the top holes HV.

For example, among the plurality of battery cells 110 included in the cell assembly 100, the unattached regions of the top sealing portions S2U of some battery cells 110 can be exposed to the outside through the second venting row HV2 and/or the fourth venting row HV4. In addition, the top sealing portions S2U of all of the remaining battery cells 110 in which the unattached region of the top sealing portion S2U is not exposed to the outside through the second venting row HV2 or the fourth venting row HV4 can be exposed to the outside through the first venting row HV1, the third venting row HV3, and/or the fifth venting row HV5. Moreover, the second venting row HV2 and/or the fourth venting row HV4 can be formed close to the left and right ends on the upper plate of the module case 300, so that the top hole HV can also be arranged to correspond to the top of the outermost battery cell 110 among the battery cells 110 stacked in the left and right direction.

In this aspect of the present disclosure, the top sealing portions S2U of all of the plurality of battery cells 110 included in the cell assembly 100 can be exposed to the outside through the plurality of top holes HV. In particular, in all battery cells 110, the unattached region can be directly exposed to the outside through the top hole HV. That is, in this aspect, among the plurality of battery cells 110 included in the cell assembly 100, there will not be a battery cell 110 in which the top sealing portion S2U is not exposed through at least one of the top hole HV.

According to this aspect, the area of the top hole HV can be secured as wide as possible. In addition, according to this aspect, even if a gas, flame, or the like is ejected from any battery cell 110 among the battery cells 110 provided in the cell assembly 100, there can be a top hole HV directly corresponding to the top of every battery cell 110. Therefore, it is possible to quickly and smoothly cope with venting of all battery cells 110. In addition, a flame or gas ejected from a specific battery cell 110 is directed directly upward and does not flow in a horizontal direction, thereby minimizing the effect of flame or gas on other battery cells 110. Therefore, in this case, it is possible to rapidly respond to thermal runaway of some battery cells 110 and effectively prevent thermal runaway propagation between cells.

In the module case 300, the plurality of top holes HV can be arranged to be staggered from each other in the front and rear direction. For example, the first venting row HV1, the third venting row HV3, and/or the fifth venting row HV5 can be arranged to be located at different positions in the left and right direction (Y-axis direction) from the second venting row HV2 and/or the fourth venting row HV4 arranged adjacent thereto.

According to this aspect of the present disclosure, while a plurality of top holes HV are formed in the module case 300, the rigidity of the module case 300 by the top holes HV can be secured at a certain level or higher. That is, a plurality of top holes HVs are formed in the front and rear direction of the module case 300, but the top holes HVs are arranged at different positions in the left and right direction, thereby preventing the rigidity of the module case 300 from being excessively reduced in a specific part in the left and right direction. Moreover, according to this aspect, through the zigzag arrangement of the top holes HV, the intervals between the top holes HV can be secured at a certain level or more to facilitate the manufacturing process such as pressing for forming the top holes HV, and also it is possible to easily implement a configuration that allows all the cells to be exposed to the top holes HV.

Moreover, when the top holes HV have a plurality of rows in the front and rear direction, the number of top holes HV can be different from each other in adjacent venting rows. For example, the first to fifth venting rows HV1 to HV5 can be configured to have different numbers of top holes HV in adjacent venting rows.

As a more specific example, the first venting row HV1, the third venting row HV3, and/or the fifth venting row HV5 can be configured to have three top holes HV in the left and right direction. In addition, the second venting row HV2 and/or the fourth venting row HV4 disposed adjacent to the above venting rows can be configured to have four top holes HV in the left and right direction.

In particular, in a plurality of venting rows of the module case 300, the number of top holes HV included in a venting row in which only the unattached region is exposed can be greater than the number of top holes HV included in a venting row in which both the unattached region and the taping attached region are exposed. For example, in the second venting row HV2 in which only the taping unattached region is exposed, four top holes HV are formed, which is more than three top holes HV included in the first venting row HV1 or the third venting row HV3 in which both the unattached region and the taping attached region are exposed.

According to this aspect of the present disclosure, as many unattached regions as possible can be exposed in the cell assembly 100. Therefore, when a flame, venting gas, or the like is ejected from the taping unattached region of the battery cell 110, the flame, venting gas, or the like can be discharged to the outside of the module case 300 as quickly and smoothly as possible.

In addition, the number of venting rows in which the unattached region and the attached region of the taping member 120 are exposed together can be larger than the number of venting rows in which only the unattached region of the taping member 120 is exposed. For example, in the aspect of FIG. 4, three venting rows in which the unattached region and the taping attached region are exposed together can be formed in the front and rear direction (HV1, HV3, HV5), whereas two venting rows in which only the taping unattached region is exposed can be formed in the front and rear direction (HV2, HV4).

According to this aspect of the present disclosure, venting performance can be uniformly achieved for each of the plurality of battery cells 110 included in the cell assembly 100. That is, the cell assembly 100 can include both the battery cell 110 in which both the unattached region and the taping attached region are exposed and the battery cell 110 in which only the unattached region is exposed. At this time, according to this aspect, the battery cell 110 in which not only the unattached region but also the taping attached region is also exposed through the top hole HV can be exposed to the outside through more top holes HV. Therefore, compared to the battery cell 110 in which only the unattached region is exposed, it is possible to prevent venting performance for flame or the like from deteriorating.

Figure 7:
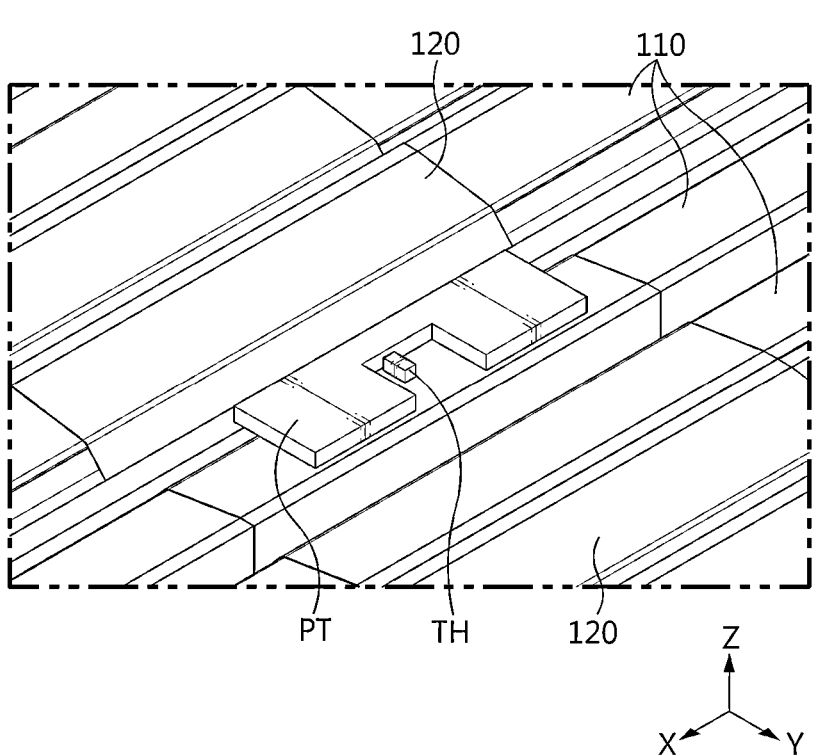
FIG. 7 is an enlarged view showing a portion of the battery module according to an aspect of the present disclosure.

FIG. 7 is an enlarged view showing a portion of the battery module according to an aspect of the present disclosure. For example, FIG. 7 can be an enlarged view showing the portion A4 of FIG. 2.

Referring to FIG. 7 along with FIGS. 2 and 4, the battery module according to the present disclosure can further include a thermistor as indicated by TH.

The thermistor TH can be a component configured to measure the surrounding temperature. The thermistor TH can be located on at least one side of the cell assembly 100 to measure the temperature inside the battery module, for example the temperature of the cell assembly 100. Moreover, the thermistor TH can be disposed on the upper side of the cell assembly 100.

In addition, a plurality of thermistors TH can be included in one cell assembly 100. For example, two thermistors TH can be included. In this case, two thermistors TH can be disposed on the top front side and the rear side of the cell assembly 100, respectively, as shown in FIGS. 2 and 4.

In particular, the thermistor TH can be disposed on the upper side of the taping member 120 as shown in FIGS. 2 and 7. That is, since the taping member 120 can be attached to the upper portion of the cell assembly 100, an unattached region and an attached region of the taping member 120 can exist together. In this configuration, the thermistor TH can be disposed above a portion of the cell assembly 100 to which the taping member 120 is attached, among the upper portion of the cell assembly 100. Moreover, in the cell assembly 100, when three taping members 120 are attached to be spaced apart from each other in the front and rear direction, the thermistor TH can be provided at the upper side of the taping member 120 located at the foremost position and the upper side of the taping member 120 located at the rearmost position, respectively.

According to this aspect of the present disclosure, it can be helpful to prevent the thermistor TH or the battery cell 110 from being damaged. For example, when vibration or shock occurs to the battery module, if a large or repetitive force is applied between the thermistor TH and the battery cell 110, the thermistor TH or the pouch exterior of the battery cell 110 can be damaged. However, the taping member 120 can have the effect of suppressing such damage. Moreover, the taping member 120 can include an adhesive layer and a substrate layer, and the adhesive layer or the substrate layer can be made of a material having elasticity. In this case, an effect of preventing damage to the thermistor TH or the battery cell 110 by vibration or shock can be further improved.

Also, the taping member 120 can be made of an electrical insulation material. In this case, the measurement accuracy of the thermistor TH can be further improved by preventing the thermistor TH from contacting the aluminum layer included in the pouch exterior of the battery cell 110. Moreover, even when a crack or the like occurs on the pouch exterior and the aluminum layer is exposed to the outside, it is possible to prevent the thermistor TH from being affected by current.

In addition, the battery module according to the present disclosure can further include a protection member, as indicated by PT in FIG. 7.

The protection member PT is configured to surround the thermistor TH, and can prevent or reduce pressure or impact from being applied to the thermistor TH. In particular, the protection member PT can be configured to surround the thermistor TH in a horizontal direction.

The protection member PT can be configured to have a greater height than the thermistor TH to prevent pressure or impact in the upper and lower direction from being applied to the thermistor TH. In addition, the protection member PT can be made of an elastic material capable of absorbing pressure or impact well, such as polyurethane, silicone, or other foam material.

According to this aspect, when swelling occurs in the Z-axis direction of the battery cell 110 or when pressure or impact is applied to the module case 300 at the upper portion of the module case 300, it is possible to prevent the thermistor TH from being damaged or cracked by pressure or impact.

Meanwhile, the thermistor TH can be located inside the module case 300 at a position exposed to the outside through the top hole HV formed in the module case 300. For example, as shown in FIG. 4, the front thermistor TH can be installed to be exposed to the upper side through the top hole HV of one of the first venting row HV1, and the rear thermistor TH can be installed to be exposed to the upper side through the top hole HV of one of the fifth venting row HV5.

In this case, mechanical stability of the thermistor TH can be improved. In particular, even when Z-axis directional swelling or the like occurs in the cell assembly 100, it is possible to prevent the thermistor TH from being cracked or damaged by being pressed by the module case 300. In addition, in this case, when a situation such as a failure of the thermistor TH occurs, the thermistor TH can be easily replaced or repaired.

Figure 8:
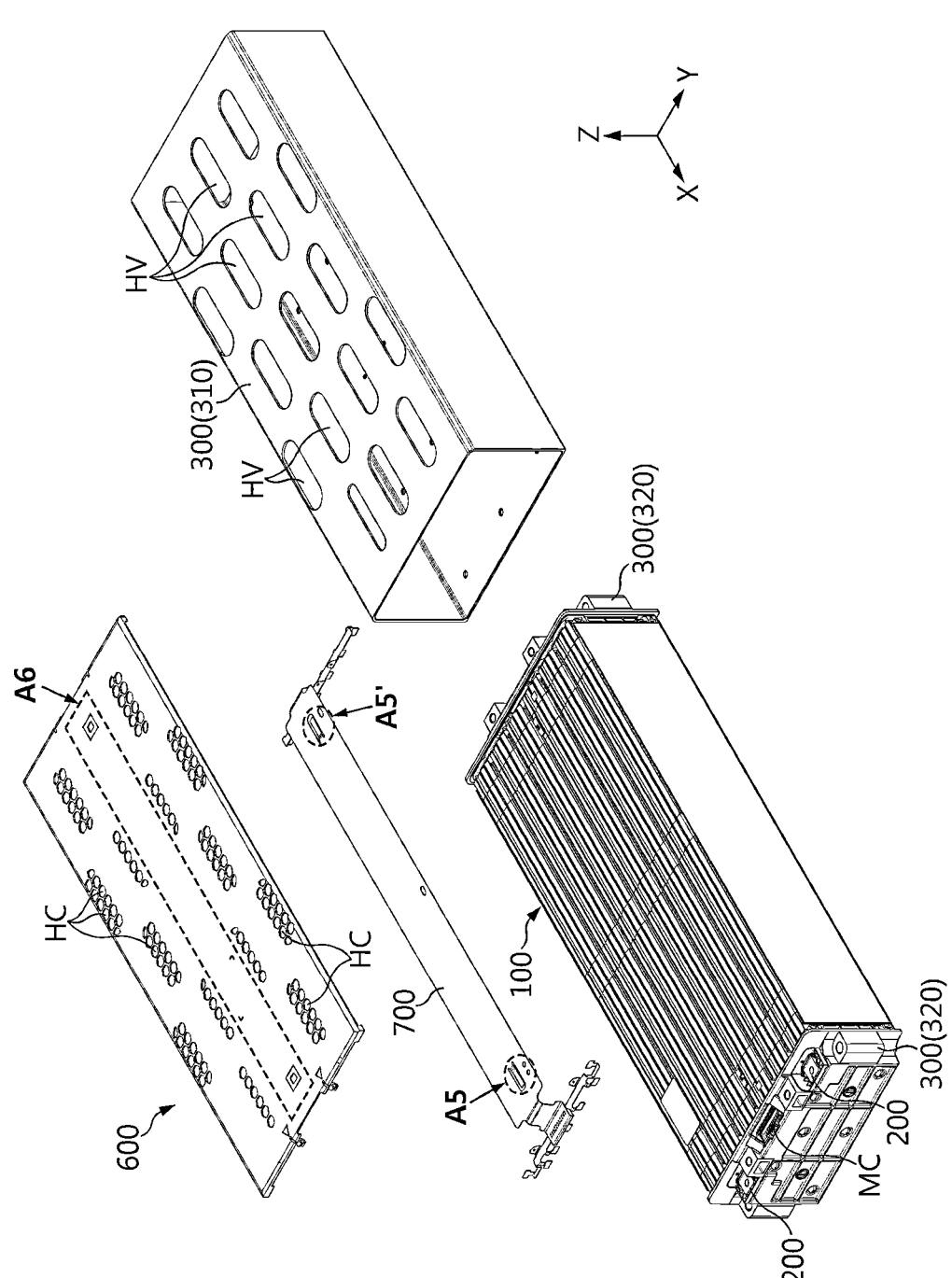
FIG. 8 is a perspective view in which some components of a battery module according to another aspect of the present disclosure are separated.
Figure 9:
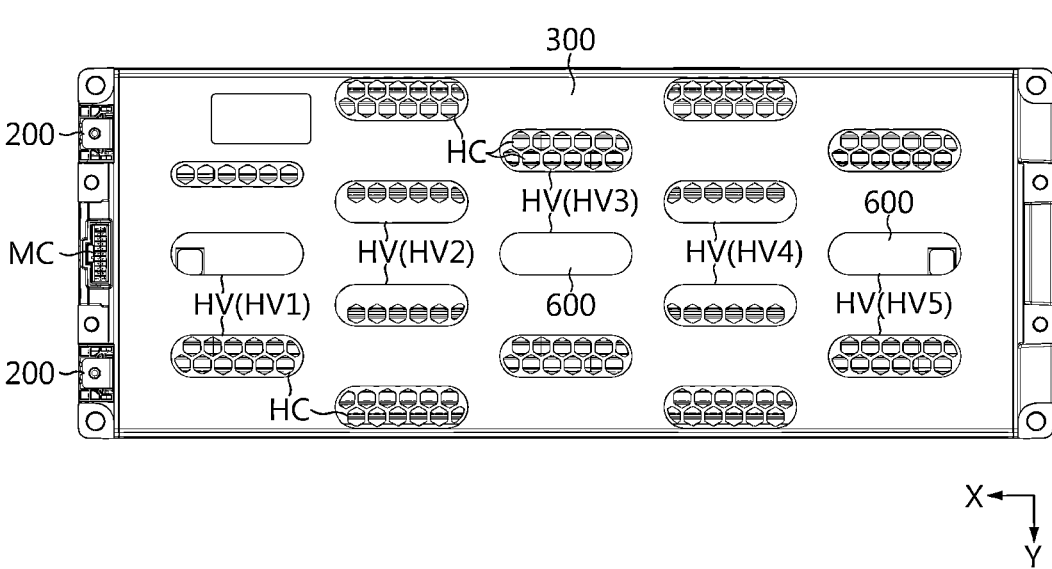
FIG. 9 is a top view showing the assembled configuration of the battery module according to another aspect of the present disclosure.

FIG. 8 is a perspective view in which some components of a battery module according to another aspect of the present disclosure are separated. FIG. 9 is a top view showing the assembled configuration of the battery module according to another aspect of the present disclosure.

Referring to FIGS. 8 and 9, the battery module according to the present disclosure can further include a top cover 600.

The top cover 600 can be made of an electrical insulation material. For example, the top cover 600 can be made of a plastic material. Also, the top cover 600 can be located inside the module case 300. Moreover, the top cover 600 can be disposed on the upper side of the cell assembly 100. In particular, the top cover 600 can be interposed between the upper portion of the cell assembly 100 and the module case 300.

The top cover 600 can be configured in a plate shape. The top cover 600 can be configured to cover the upper side of the cell assembly 100 inside the module case 300 so that the upper side of the cell assembly 100 does not directly contact the upper plate of the module case 300. In particular, the module case 300 can be made of a metal material such as aluminum or SUS. In this case, the top cover 600 made of an electrically insulating material can secure electrical insulation between the cell assembly 100 and the module case 300.

In particular, in the top cover 600, a cover hole can be formed, as indicated by HC in FIG. 8. The cover hole HC can be formed to penetrate the top cover 600 in the thickness direction. In particular, the cover hole HC can be provided to be located in a portion facing the top hole HV. That is, the position where the cover hole HC is formed in the top cover 600 can be provided at a portion corresponding to the position where the top hole HV is formed in the module case 300. For example, referring to FIG. 9, when the top cover 600 is inserted into the module case 300, the cover hole HC can be provided at a position that can be exposed to the outside, namely to the upper side, through the top hole HV.

According to this aspect of the present disclosure, while electrical insulation between the module case 300 and the cell assembly 100 can be stably secured through the top cover 600, the top cover 600 will not disturb that a venting gas or the like is discharged through the top hole HV in case of emergency. For example, when a situation such as thermal runaway occurs in some of the battery cells 110 provided in the cell assembly 100, a venting gas can be released first. At this time, the venting gas can be quickly and smoothly discharged to the outside of the module case 300 through the cover hole HC and the top hole HV. Therefore, electrical insulation and stable venting performance by the top cover 600 can be achieved together.

Also, according to this aspect, the top cover 600 can restrain the top sealing portion S2U of the cell assembly 100 in a downward direction. In particular, since the top cover 600 can press each battery cell 110 downward when swelling occurs in the Z-axis direction of each battery cell 110, the amount of swelling in the Z-axis direction of the battery cell 110 can be reduced.

As shown in FIG. 8, the cover hole HC can be formed in plurality in one top cover 600. Moreover, the plurality of cover hole HCs can be grouped into several groups and distributed. In particular, each cover hole HC can have a smaller size than the top hole HV formed in the module case 300. Also, in a state where the top cover 600 is inserted into the module case 300, a plurality of cover holes HC can be correspondingly under one top hole HV.

For example, referring to FIG. 9, a plurality of top holes HV are formed in the module case 300, and in each top hole HV, a cover hole HC having a size much smaller than each top hole HV can be located to communicate therewith. As a more specific example six to twelve cover holes HC casm correspond to one top hole HV.

Each cover hole HC can be configured to have a size of 1 cm or less, more preferably 0.8 cm or less, particularly 0.6 cm or less. However, these sizes are only examples, and each cover hole HC formed in the top cover 600 can be formed in various sizes and shapes.

According to this aspect, it can be more advantageous to improve the safety of the battery module. In particular, according to one aspect of the present disclosure, a top hole HV can be formed in at least one side of the module case 300, for example, in the upper side. At this time, since the cover hole HC is provided in a small size in the lower portion of the top hole HV, it is possible to prevent a worker or a user's fingers from entering the inside of the battery module. In this case, the cover hole HC can be provided with a size smaller than the typical size of a user's finger. In addition, according to this aspect, it is possible to prevent the battery module from being damaged or broken due to external foreign matters introduced through the top hole HV.

The cover hole HC can be formed in a honeycomb structure. For example, a plurality of cover holes HC are formed in the top cover 600, and at least some of the cover holes HC can be formed in a hexagonal shape. Also, the edge of each cover hole HC can be formed in a shape parallel to the edge of an adjacent cover hole HC.

As a more specific example, corresponding to one top hole HV, a plurality of cover holes HC can be arranged side by side in the front and rear direction to form one or two rows. Moreover, in the aspect shown in FIG. 9, corresponding to each top hole HV, six cover holes HC can be arranged in the front and rear direction to communicate with each other in a honeycomb structure.

According to this aspect of the present disclosure, it is possible to make the entire area of the cover holes HC in the top cover 600 as large as possible while preventing the insertion of fingers or foreign substances through the top hole HV. Therefore, through the cover hole HC, the venting gas can be discharged to the outside quickly and smoothly.

The battery module according to the present disclosure can include a printed circuit board 700 as shown in FIG. 8.

The printed circuit board 700 can be interposed between the cell assembly 100 and the top cover 600. Also, the printed circuit board 700 can be configured to transmit an electrical signal for the cell assembly 100. For example, the bus bar assembly 400 can be disposed at the front and rear sides of the cell assembly 100, and the voltage of each battery cell 110 included in the cell assembly 100 can be measured from the bus bar assembly 400. Also, the voltage measurement value can be transmitted to the inside or outside of the battery module through the printed circuit board 700.

In addition, the printed circuit board 700 can provide a path for transmitting a temperature measurement value by the thermistor TH. Moreover, the printed circuit board 700 can be configured such that the thermistor TH is mounted thereto. For example, as indicated by A5 and A5' in FIG. 8, the printed circuit board 700 can include a thermistor mounting portion. Also, the thermistor TH can be mounted on one surface of the printed circuit board 700 in the thermistor mounting portion.

In particular, the thermistor mounting portion can be formed to be concave downward, as indicated by A5 and A5'. Also, the thermistor TH can be attached to the upper surface of the printed circuit board 700 at this concave portion. In this case, the thermistor TH can be located as close to the cell assembly 100 as possible. Here, as shown in the aspect of FIG. 7, when the protection member PT surrounds the thermistor TH, both the thermistor TH and the protection member PT can be mounted on the upper surface of the thermistor mounting portion of the printed circuit board 700.

In addition, the printed circuit board 700 can be configured such that the thermistor mounting portions A5, A5' are positioned at the upper portion of the taping member 120. According to this aspect, it is possible to prevent the thermistor mounting portion concave downward from directly contacting the battery cell 110. Accordingly, electrical insulation can be ensured between the printed circuit board 700 or the thermistor TH and the pouch exterior of the battery cell 110. Accordingly, it is possible to prevent or reduce the occurrence of noise or errors in an electric signal transmitted through the printed circuit board 700 or a measurement result of the thermistor TH. Also, according to this aspect, it is possible to prevent the printed circuit board 700 or the battery cell 110 from being damaged or broken due to vibration, shock, friction, or the like.

The printed circuit board 700 can be configured in the form of a flexible printed circuit board (FPCB) 700. In addition, the printed circuit board 700 can be formed to be elongated in the front and rear direction along which the electrode lead 111 of each battery cell 110 is located in the cell assembly 100. Moreover, the printed circuit board 700 can be configured to connect the bus bar assembly 400 located in front of the cell assembly 100 and the bus bar assembly 400 located in the rear of the cell assembly 100.

The battery module according to the present disclosure can further include a module connector as indicated by MC in FIGS. 8 and 9. The module connector MC can be a terminal that transmits and receives electrical signals for the battery module to and from the outside. In particular, the printed circuit board 700 can transfer information of the battery module to various control devices such as an external component, for example a battery management system (BMS) or an energy controller unit (ECU), through the module connector MC.

As such, in an aspect in which the printed circuit board 700 is included in the battery module, the top cover 600 can be configured such that the cover hole HC is not formed in the top cover at the upper side of the printed circuit board 700.

For example, referring to FIG. 8, the top cover 600 can be configured in a form in which the cover hole HC is not formed in the central portion in the left and right direction (Y-axis direction), as indicated by A6. This aspect can be implemented because the printed circuit board 700 is located to be elongated in the front and rear direction in the central portion of the lower part of the top cover 600.

In this case, most of the cell assembly 100 disposed below the top cover 600 can be exposed to the upper side through the cover hole HC, but the printed circuit board 700 disposed below the top cover 600 will not be exposed to the upper side through the cover hole HC.

According to this aspect of the present disclosure, the printed circuit board 700 will not be exposed to the outside of the battery module through the cover hole HC. Therefore, it is possible to block foreign substances from being introduced toward components in the module case, such as the printed circuit board 700 or the thermistor TH, which are vulnerable to particles or moisture. Therefore, in this case, it is possible to prevent damage or malfunction of the printed circuit board 700 and components mounted thereto more effectively.

Also, according to this aspect, the configuration in which the printed circuit board 700 is attached to the top cover 600 can be more easily implemented. For example, the printed circuit board 700 can be attached to the lower surface of the top cover 600 through a double-sided adhesive tape or the like, and in this aspect, the double-sided adhesive tape can be attached to a portion where the cover hole HC is not formed. Therefore, in this case, since a sufficient space for attaching the double-sided adhesive tape can be secured on the top cover 600, the printed circuit board 700 can be more stably fixed inside the module case 300.

The module case 300 can be configured such that a top hole HV is also formed at the upper side of the printed circuit board 700.

For example, as seen in FIG. 9, in most of the top holes HV arranged in a zigzag form, a plurality of cover holes HC are arranged to make direct communication with a top hole, but in some top holes HV, there is no cover hole HC aligned with the top hole HV. In particular, among five venting rows formed in the front and rear direction (X-axis direction), in the $1^{st}$, $3^{rd}$, and $5^{th}$ venting rows HV1, HV3, HV5, the cover hole HC is not arranged in the top hole HV located at the center in the left and right direction (Y-axis direction) at all. In addition, in two top holes HV located at the center of the $2^{nd}$ and $4^{th}$ venting rows HV2, HV4, the cover holes HC are formed in only one line to be biased toward the outer side in the left and right direction. Here, in the case of the top hole HV in which the cover hole HC is not communicated at all or only partially communicated, this can be because the printed circuit board 700 is located therebelow.

That is, in this aspect, in the case of the top hole HV below which the printed circuit board 700 is located, the cover hole HC is not formed at all or only partially formed. Meanwhile, in the case of the top hole HV formed in a region below which the printed circuit board 700 is not located, the cover hole HC can be configured to be sufficiently communicated.

According to this aspect, the flame or the like generated in the cell assembly 100 can be smoothly and sufficiently discharged to the upper side. In particular, when thermal runaway or the like of the cell assembly 100 intensifies beyond a certain level, a flame can occur, and the flame can melt or burn the printed circuit board 700 or the top cover 600 due to high heat or pressure. Therefore, even if the top hole HV does not directly expose the cell assembly 100 due to the printed circuit board 700 and the top cover 600 in a normal state, when the printed circuit board 700 and the top cover 600 are lost due to the flame, the top hole HV can play a role of discharging the flame or the like. Therefore, it is possible to prevent a flame or the like from being directed to the front side where the module terminal 200 is located by sufficiently and rapidly discharging the flame through the top holes HV of the module case 300.

Figure 10:
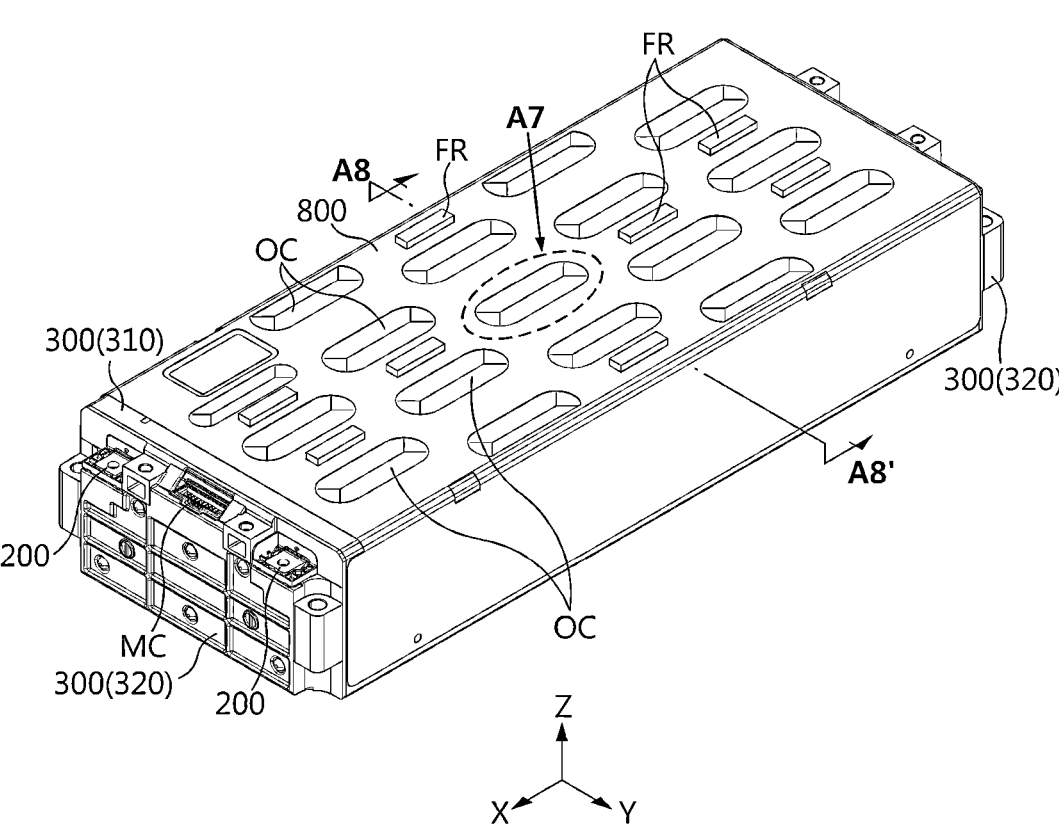
FIG. 10 is a perspective view schematically showing a battery module according to still another aspect of the present disclosure.
Figure 11:
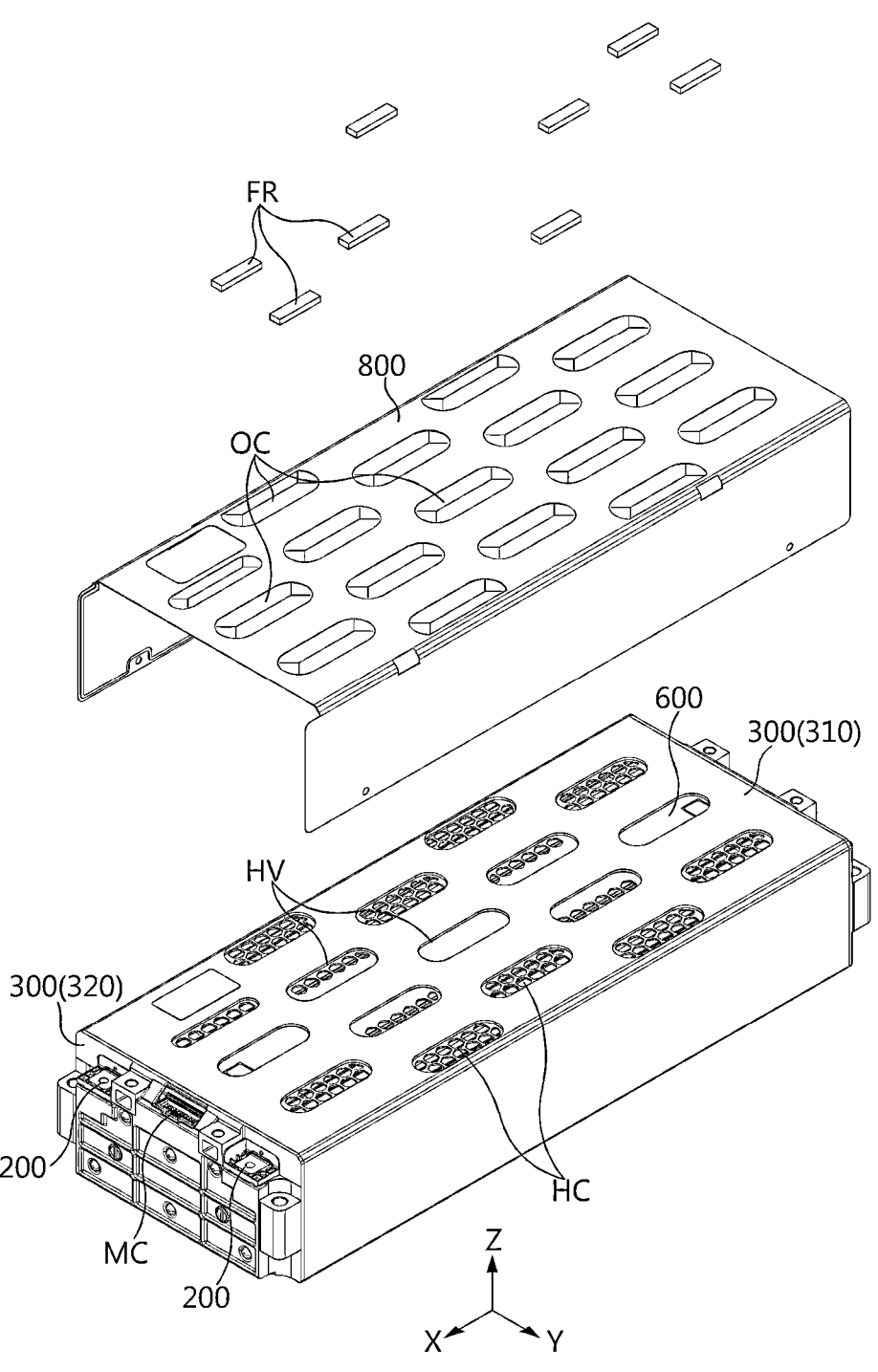
FIG. 11 is a perspective view showing the battery module of FIG. 10 in which some components are separated.
Figure 12:
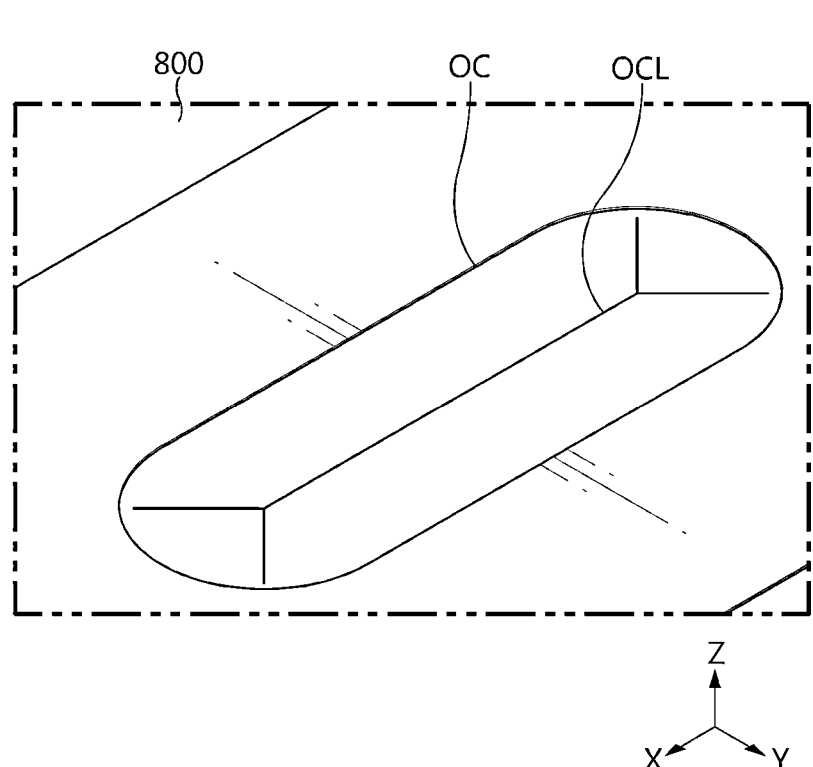
FIGS. 12 and 13 are enlarged views showing a battery module according to an aspect of the present disclosure.
Figure 13:
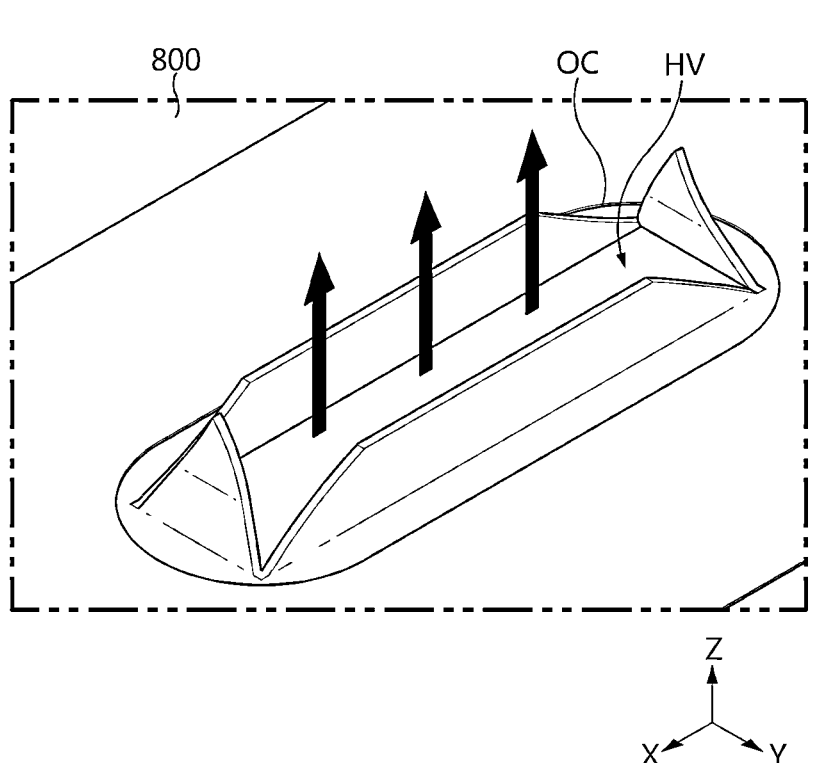

FIG. 10 is a perspective view schematically showing a battery module according to still another aspect of the present disclosure. Also, FIG. 11 is a perspective view showing the battery module of FIG. 10 in which some components are separated. In addition, FIGS. 12 and 13 are enlarged views showing a battery module according to an aspect of the present disclosure. In particular, FIGS. 12 and 13 can be regarded as enlarged views showing configurations before and after the top hole HV is opened with respect to the portion A7 of FIG. 10.

Referring to FIGS. 10 to 13, the battery module according to the present disclosure can further include a blocking cover 800.

The blocking cover 800 can be located outside the module case 300. In particular, the blocking cover 800 can be located above the module case 300. Moreover, the top hole HV can be located at the upper side of the module case 300, and the blocking cover 800 can be attached to the outer side of the module case 300, at least in a portion where the top hole HV is formed. In addition, as described in the former aspect, the battery module according to an aspect of the present disclosure can include a top cover 600. In this case, the top cover 600 can be located inside the module case 300, and the blocking cover 800 can be located outside the module case 300.

In addition, the blocking cover 800 can be located not only on the side where the top hole HV is formed, but also on the side where the top hole HV is not formed. For example, the blocking cover 800 can be formed in an approximately n-shape and be attached to the outer side, not only for the upper plate of the module case 300 in which the top hole HV is formed, but also for the left and right plates of the module case 300 in which the top hole HV is not formed.

The blocking cover 800 can have a heat-resistant material that can withstand high temperatures. For example, the blocking cover 800 can include a ceramic material such as mica. Moreover, the blocking cover 800 can include a mica sheet. In this case, by the blocking cover 800, it is possible to more reliably prevent the flame from moving or spreading toward the inside or outside of the battery module.

The blocking cover 800 can be configured to open and close the top hole HV of the module case 300. Moreover, the blocking cover 800 can be configured to open or close the top hole HV according to the internal pressure of the module case 300. In particular, the blocking cover 800 can include an opening and closing portion configured to open and close the top hole HV according to the internal pressure of the module case 300, as indicated by OC in FIGS. 10 to 13. Here, the opening and closing portion OC can be formed at a position corresponding to the top hole HV of the module case 300 in a state where the blocking cover 800 is attached to the outer side of the module case 300. In addition, the opening and closing portion OC of the blocking cover 800 can be formed in a shape corresponding to the top hole HV of the module case 300. For example, when the top hole HV of the module case 300 is formed in a substantially elliptical shape, the opening and closing portion OC of the blocking cover 800 can also be formed in a substantially elliptical shape with a similar size and shape.

More specifically, the opening and closing portion OC of the blocking cover 800 can be configured to close all top holes HV in a normal state where the internal pressure of the module case 300 is below a certain level. For example, as shown in FIG. 11, a top hole HV can be formed in the module case 300. However, as shown in FIGS. 10 and 12, when the blocking cover 800 covers the upper portion of the module case 300, the top hole HV of the module case 300 can be covered by the opening and closing portion OC of the blocking cover 800 not to be exposed to the outside, especially to the upper side.

However, when the internal pressure of the module case 300 increases to a certain level or above, the blocking cover 800 can be configured to open at least some top holes HV. For example, when a gas, flame, or the like occurs due to thermal runaway in the cell assembly 100, the internal pressure of the module case 300 can increase. Also, when the internal pressure increases to a certain level or above, the opening and closing portion OC of the blocking cover 800 is opened, and the top hole HV located therebelow can be opened. Accordingly, the gas, flame, or the like existing inside the module case 300 can be emitted to the outside of the module case 300, especially to the upper side, as indicated by an arrow in FIG. 13.

According to this aspect of the present disclosure, since the top hole HV is blocked by the blocking cover 800 when the battery module is in a normal state, it is possible to block external foreign substances, such as moisture or dust, from entering the module case 300 through the top hole HV.

In addition, according to this aspect of the present disclosure, when a venting gas or flame is generated due to thermal runaway inside the module case 300, the opening and closing portion OC of the blocking cover 800 is opened, so that the venting gas, flame, or the like can be quickly discharged to the outside, especially to the upper side where the top hole HV is formed. Therefore, it is possible to suppress the flame from affecting other battery cells 110 inside the corresponding battery module or from affecting other battery modules located at the side surface of the corresponding battery module.

In addition, according to this aspect, even if a venting gas, flame, or the like is discharged from another battery module due to thermal runaway, the top hole HV of another normal battery module can be kept closed. Therefore, it is possible to prevent the venting gas, flame, or the like from entering another normal battery module through the top hole HV thereof. Therefore, propagation of thermal runaway or flame between battery modules can be more effectively blocked.

The opening and closing portion OC of the blocking cover 800 can be configured to form a cutting line on a sheet constituting the blocking cover 800. For example, as seen in FIG. 12, an opening and closing portion OC can be provided to form a cutting line, as indicated by OCL, on a mica sheet prepared as the blocking cover 800. In this case, the cutting line OCL can be provided by completely cutting the blocking cover 800 in the thickness direction or partially cutting the blocking cover 800 to form a notch or groove. In addition to this, the opening and closing portion OC can be configured in various other ways. For example, the opening and closing portion OC can be formed in a form in which a stopper is provided to cover a hole or a form in which a door is provided in a hole.

Meanwhile, a plurality of top holes HV can be formed in the module case 300, and a plurality of corresponding opening and closing portions OC can also be formed at the blocking cover 800. In this case, each of the plurality of opening and closing portions OC provided in one battery module can independently perform an opening and closing operation. For example, even when some opening and closing portions OC are open, other opening and closing portions OC can remain closed.

For example, in the aspects of FIGS. 10 and 11, when an event occurs in some battery cells 110 among the plurality of battery cells 110 included in the cell assembly 100, a venting gas, flame, or the like can be ejected first. At this time, the venting gas, flame, or the like can be directed to the top hole HV corresponding to or adjacent to the battery cell 110 (event cell) where the event has occurred. Then, the opening and closing portion OC corresponding to the event cell or corresponding to an adjacent top hole HV is first opened, so that the venting gas, flame, or the like can be discharged. At this time, other top holes HV can be kept closed for at least a certain period of time.

According to this aspect, even if a venting gas, flame, or the like is discharged from an event cell in which thermal runaway occurs inside one battery module, it is possible to suppress the venting gas, flame, or the like from being introduced into other normal battery cells 110. Accordingly, propagation of thermal runaway or flame between the battery cells 110 inside the battery module can be blocked or delayed. Moreover, according to this aspect of the present disclosure, it can be advantageous to delay the voltage drop rate of the battery module.

The blocking cover 800 can be configured in the form of a sheet having a composite layer. This will be described in more detail with further reference to FIGS. 14 to 16.

Figure 14:
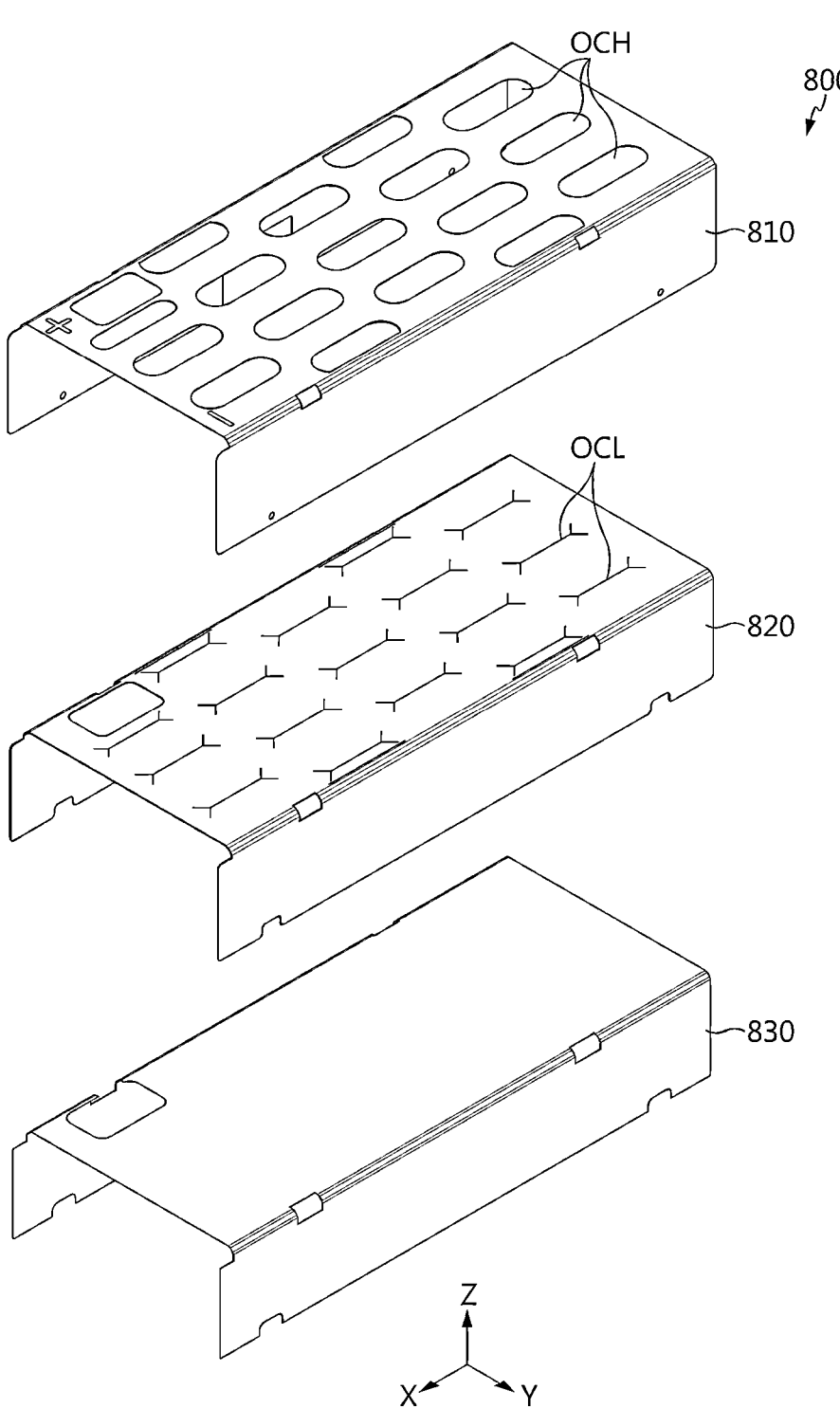
FIG. 14 is a diagram schematically showing a blocking cover according to an aspect of the present disclosure.
Figure 15:
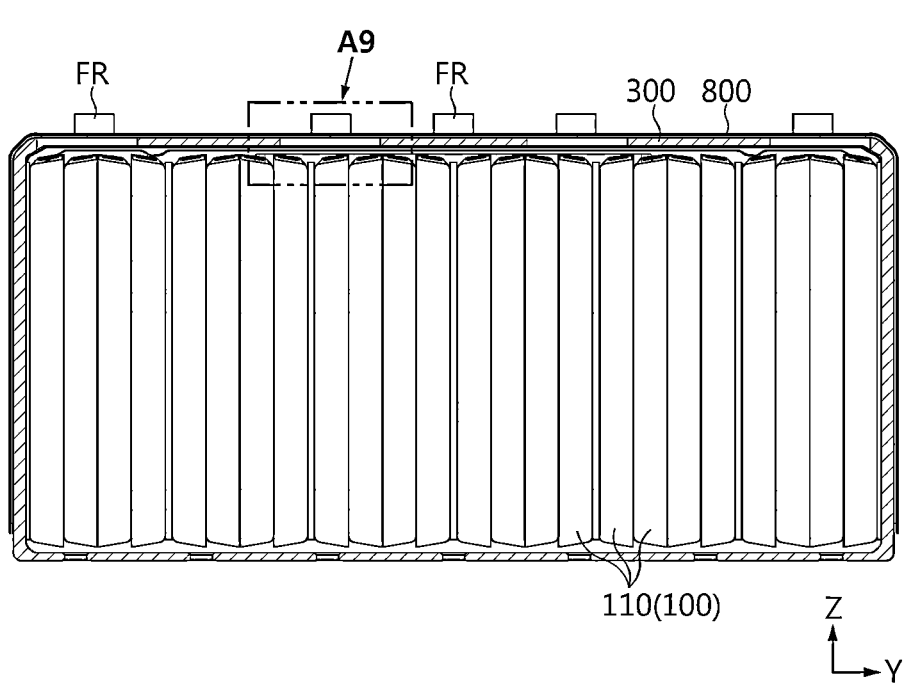
FIG. 15 is a cross-sectional view schematically showing a battery module to which the blocking cover of FIG. 14 is applied.

FIG. 14 is a diagram schematically showing a blocking cover 800 according to an aspect of the present disclosure. FIG. 15 is a cross-sectional view schematically showing a battery module to which the blocking cover 800 of FIG. 14 is applied. For example, FIG. 15 is a cross-sectional view, taken along line A8-A8' of FIG. 10. Also, FIG. 16 is an enlarged view showing the portion A9 of FIG. 15.

Figure 16:
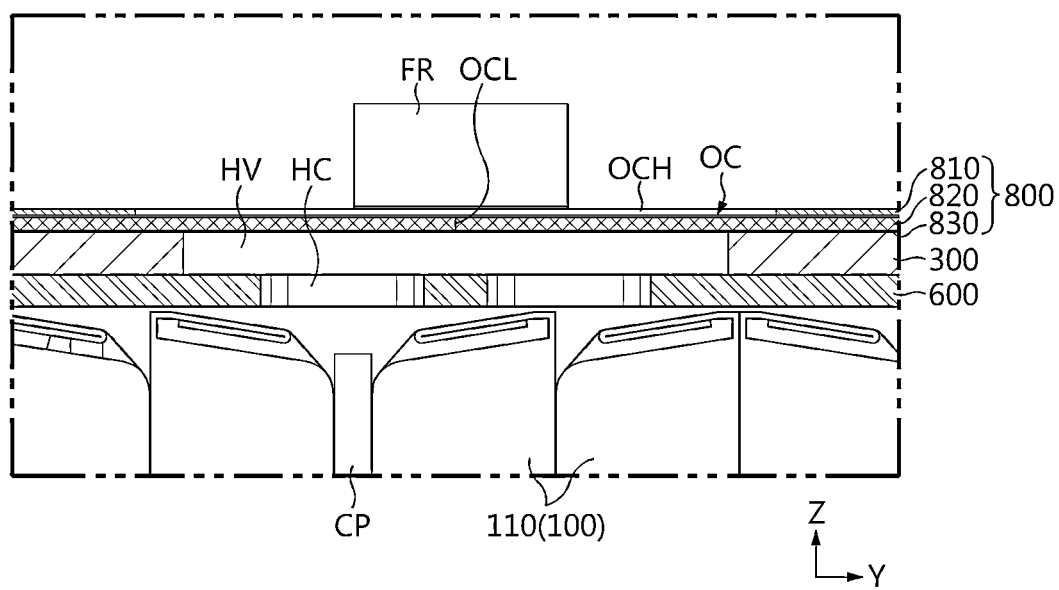
FIG. 16 is an enlarged view showing the portion A9 of FIG. 15.

Referring to FIGS. 14 to 16, the blocking cover 800 can include a first sheet cover 810, a second sheet cover 820, and/or a third sheet cover 830. The first sheet cover 810, the second sheet cover 820, and the third sheet cover 830 can be sequentially stacked from top to bottom.

The first sheet cover 810 can be located at the outermost side of the blocking cover 800, particularly at the upper side. Also, the first sheet cover 810 can be made of a flame-resistant material such as mica. Moreover, in the first sheet cover 810, as shown in FIGS. 15 and 16, when the blocking cover 800 is attached to the module case 300, a blocking hole OCH can be formed in a position and shape corresponding to the top hole HV. The blocking hole OCH can be formed in advance to penetrate the first sheet cover 810 in the thickness direction. That is, the blocking hole OCH can be configured to have a partially cut open form in the first sheet cover 810.

Moreover, the blocking hole OCH can be formed in a larger size than the top hole HV. For example, as shown in FIG. 16, the horizontal length of the blocking hole OCH can be larger than the horizontal length of the top hole HV. In this case, the venting gas discharged from the top hole HV can be smoothly released to the outside of the battery module through the blocking hole OCH.

The second sheet cover 820 can be disposed in contact with the lower portion of the first sheet cover 810. For example, the second sheet cover 820 can be bonded to the first sheet cover 810. Moreover, in the second sheet cover 820, the cutting line OCL described above completely or partially penetrating the second sheet cover can be formed at a position corresponding to the blocking hole OCH of the first sheet cover 810. Therefore, in a normal state, the top hole HV of the module case 300 can be closed without communicating with the blocking hole OCH of the first sheet cover 810 by the second sheet cover 820. Also, when a gas, flame, or the like is applied through the top hole HV of the module case 300 due to an increase in internal pressure, the cutting line OCL can be torn or widened, so that the top hole HV can be opened by communicating with the blocking hole OCH of the first sheet cover 810.

Similar to the first sheet cover 810, the second sheet cover 820 can be made of a material resistant to flame. For example, the second sheet cover 820 can be made of mica material.

The third sheet cover 830 can be disposed in contact with the lower portion of the second sheet cover 820. Also, the third sheet cover 830 can be attached in direct contact with the outer side of the module case 300. The third sheet cover 830 can be made of an electrically insulating material such as plastic. For example, the third sheet cover 830 can be made of a polyurethane material. The third sheet cover 830 can be bonded to the module case 300 and/or the second sheet cover 820. Moreover, the third sheet cover 830 is coated with an adhesive on both surfaces thereof, to bond the module case 300 and the second sheet cover 820 to each other. In addition, the third sheet cover 830 can perform a waterproof or dustproof function of preventing moisture or dust from entering the top hole HV from the outside of the module case 300.

The third sheet cover 830 can be made of a material having a lower melting point than the first sheet cover 810 or the second sheet cover 820. Therefore, when a flame or the like is generated in the top hole HV of the module case 300, the third sheet cover 830 can be removed by melting or disappearing. Therefore, as shown in FIG. 14, even if no hole is formed in the third sheet cover 830, the flame or the like can be ejected from the top hole HV toward the blocking hole OCH.

According to this aspect, in the portion where the top hole HV is not formed, the first sheet cover 810 and the second sheet cover 820 can block the flame as a composite layer. Therefore, flame blocking performance can be improved in a portion other than the top hole HV. Therefore, it is possible to prevent or suppress the battery cells 110 inside the battery module from being affected by flames emitted from other battery modules or other parts of the corresponding battery module.

In addition, in this aspect, since the cutting line OCL is formed at the second sheet cover 820 having a relatively thin thickness, the cutting line OCL can be easily formed on a sheet member such as mica. Also, according to this aspect, when the internal pressure of the module case 300 increases, the thin second sheet cover 820 is quickly ruptured, so that the flame or gas can be discharged quickly and smoothly through the top hole HV.

Moreover, in this aspect, since the first sheet cover 810 and the second sheet cover 820 are included in the blocking cover 800 in the form of a composite layer, the thickness of the overall blocking cover 800 can be secured at a certain level or higher while reducing the thickness of the second sheet cover 820. Therefore, the configuration for stably blocking a flame from the outside and rapidly opening when the internal pressure increases can be easily implemented.

Also, according to this aspect, the second sheet cover 820 on which the cutting line OCL is formed is disposed below the first sheet cover 810. In this case, even if the flame or gas discharged from other battery modules flow along the outer surface of the first sheet cover 810, the second sheet cover 820 located inside cannot be easily ruptured. Therefore, it is possible to more effectively prevent the flame or gas of a battery module in which a thermal event has occurred from rupturing or damaging the second sheet cover 820 of another battery module and thus the flame from entering the inside of another battery module.

As shown in FIG. 14, the first sheet cover 810, the second sheet cover 820, and/or the third sheet cover 830 can have a bent shape such an inverted U-shape to cover the upper surface and the left and right surfaces of the module case 300.

The battery module according to the present disclosure can include a spacer, as indicated by FR in FIGS. 10 and 11.

The spacer FR can be disposed at the top of the blocking cover 800. For example, the spacer FR can be attached to the upper surface of the first sheet cover 810. Moreover, the spacer FR can be configured to protrude upward from the blocking cover 800.

In addition, the spacer FR can be provided in plurality, and the plurality of spacers FR can be arranged to be spaced apart from each other in a horizontal direction at the upper portion of the blocking cover 800. Also, the spacer FR can be located in a space between the opening and closing portions OC on the surface of the blocking cover 800.

The spacer FR can be made of an elastic material such as foam. For example, the spacer FR can be made of a silicon material.

According to this aspect, when a flame or gas is generated and a gas is discharged from the top hole HV, it is possible to suppress the blocking cover 800 from moving toward the pack housing PH. For example, when the battery module as shown in FIG. 15 is accommodated in the pack housing PH, an upper cover or the like of the pack housing PH can be located at the upper portion of the battery module in a covered form. At this time, when the flame or the like is discharged from the battery module through the top hole HV and the blocking hole OCH, the blocking cover 800 can be lifted upward by the discharge pressure. At this time, if the blocking cover 800 is lifted too much, the flame can be introduced into the space between the blocking cover 800 and the module case 300, and the flame or the like will not be properly discharged to the outside of the blocking cover 800, and the flame or the like can stay only in the space between the blocking cover 800 and the module case 300. However, in this aspect, such a problem can be prevented since the spacer FR prevents the blocking cover 800 from being lifted to a certain level or more toward the pack housing PH. Therefore, according to this aspect, discharge performance of a venting gas, flame, or the like through the top hole HV and the blocking hole OCH can be sufficiently and stably secured.

Figure 17:
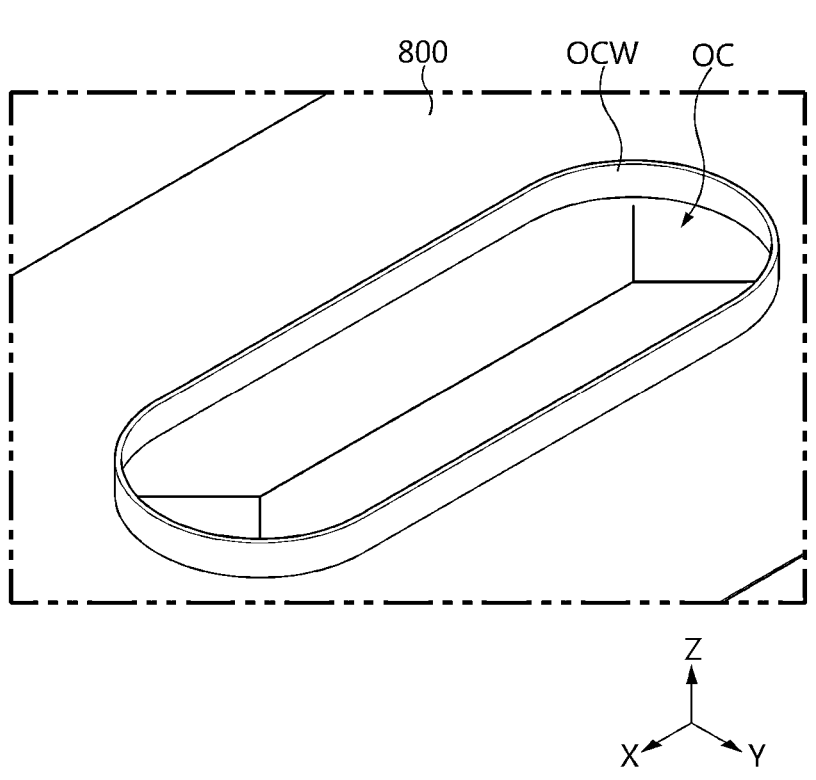
FIGS. 17 and 18 are a perspective view and a cross-sectional view schematically showing some components of a battery module according to still another aspect of the present disclosure.
Figure 18:
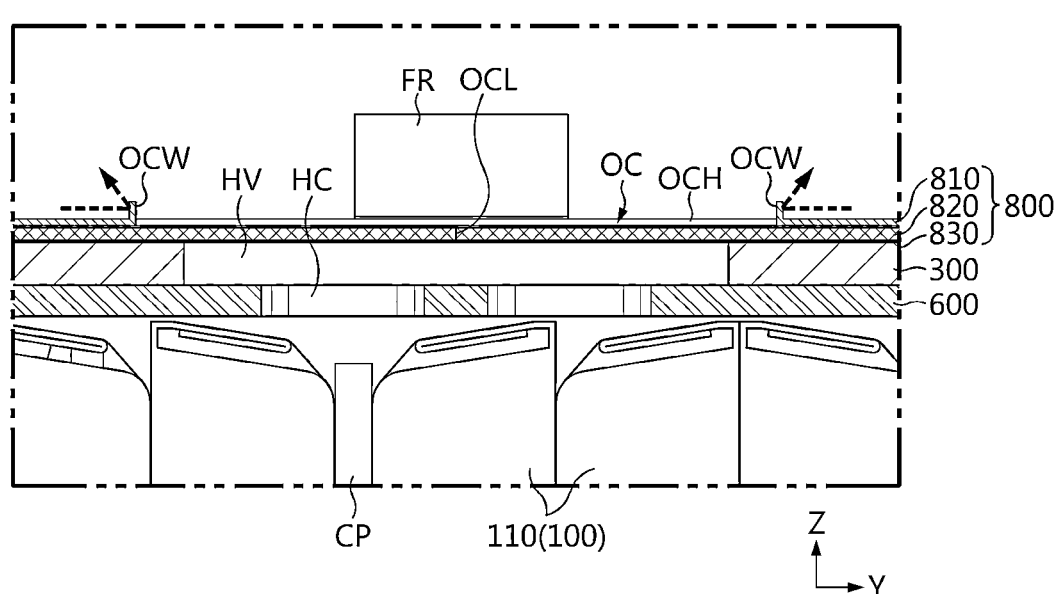

FIGS. 17 and 18 are a perspective view and a cross-sectional view schematically showing some components of a battery module according to still another aspect of the present disclosure. For example, FIG. 17 is an enlarged view of a portion where one opening and closing portion OC is formed in the blocking cover 800, and can be a modified example of the portion A7 of FIG. 10. Also, FIG. 18 is a diagram showing a cross-sectional structure of an upper side of a battery module to which the aspect of FIG. 17 is applied, and can be a modified example of the portion A9 of FIG. 15.

Referring to FIGS. 17 and 18, in the battery module according to the present disclosure, the blocking cover 800 can include a blocking protrusion configured to protrude upward, as indicated by OCW. The blocking protrusion OCW can be formed around the opening and closing portion OC. For example, when the opening and closing portion OC is formed in a substantially elliptical shape, the blocking protrusion OCW can be formed in a ring shape along the edge of the ellipse.

According to this aspect, the opening and closing portion OC of the blocking cover 800 can be more reliably prevented from being opened due to an external flame or venting gas. For example, as seen in FIG. 18, a flame, venting gas, or the like discharged from another battery module or another opening and closing portion OC can flow along the outer surface of the blocking cover 800, particularly the first sheet cover 810. At this time, the flame or the like flowing along the outer surface of the blocking cover 800 can collide with the blocking protrusion OCW and change its direction upward, as indicated by an arrow. In particular, such a direction change can prevent the flame or the like from being directed toward the opening and closing portion OC of the blocking cover 800, particularly toward the cutting line OCL of the second sheet cover 820. Therefore, by preventing the opening and closing portion OC of the blocking cover 800 from being opened due to an external flame or the like, propagation of flame between cells or between modules can be effectively prevented.

The blocking protrusion OCW can be formed on the upper surface of the first sheet cover 810. At this time, the blocking protrusion OCW can be prepared in the process of forming the blocking hole OCH in the first sheet cover 810. For example, in order to form a blocking hole OCH in the first sheet cover 810, a penetrating press is penetrated from the bottom to the top, so that the blocking hole OCH is formed and at the same time a burr is intentionally formed on the edge of the blocking hole OCH. In addition, the burr can be formed to protrude upward around the blocking hole OCH and function as a blocking protrusion. Additionally, the blocking protrusion OCW can have a height sufficient to prevent upward movement of the blocking cover and thereby serve the function of the spacer, as well as insulate the blocking hole OCH from external flame or venting gas.

Meanwhile, in the aspect of FIGS. 2 and 3, a plurality of taping members 120 are attached to the top sealing portion S2U of each battery cell 110 provided in the cell assembly 100 to be spaced apart from each other in the front and rear direction. At this time, the plurality of taping members 120 can be attached with the same adhesive strength. Meanwhile, the plurality of taping members 120 attached to one battery cell 110 can also be attached with different adhesive strengths. This will be described in more detail with reference to FIG. 19.

Figure 19:
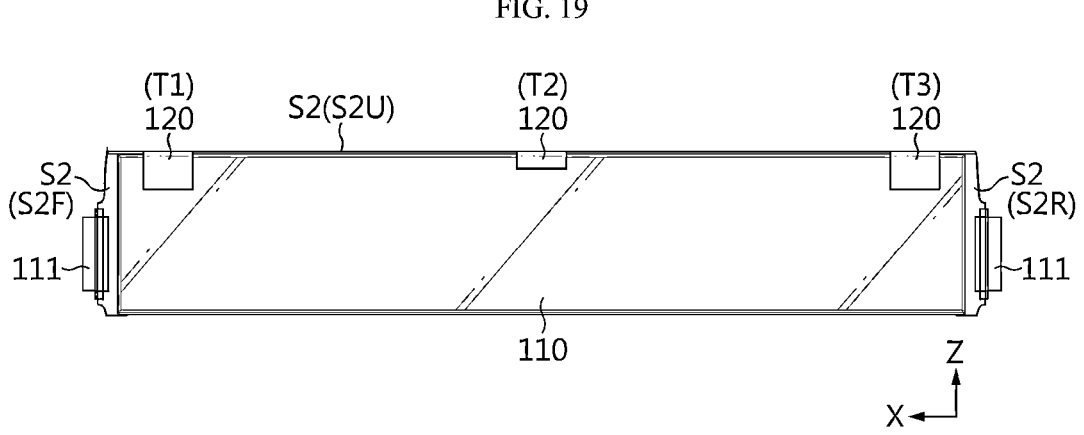
FIG. 19 is a diagram schematically showing a battery cell and a taping member included in a battery module according to another aspect of the present disclosure.

FIG. 19 is a diagram schematically showing a battery cell 110 and a taping member 120 included in a battery module according to another aspect of the present disclosure.

Referring to FIG. 19, the plurality of taping members 120 attached to the top sealing portion S2U of the battery cell 110 can be configured to at least partially have different adhesive strengths. For example, as shown in FIG. 19, a first tape T1, a second tape T2, and a third tape T3 can be attached to the top sealing portion S2U of the battery cell 110 in front and rear direction. Here, the first tape T1 and the third tape T3 are taping members 120 positioned at the foremost and rearmost sides in the top sealing portion S2U of the battery cell 110, and can be disposed close to the front end sealing portion S2F and the rear end sealing portion S2R. Also, the second tape T2 can be located between the first tape T1 and the third tape T3.

At this time, the first tape T1 and the third tape T3 located at the outer periphery can be configured to have different adhesive strengths from the other taping member 120, namely the second tape T2. In particular, the first tape T1 and the third tape T3 located at the outer periphery can have stronger adhesion than the second tape T2, which is another taping member 120. In other words, the second tape T2 located at the center can have weaker adhesive strength than the first tape T1 and the third tape T3.

Here, the different adhesive strengths of the plurality of taping members 120 can be implemented by differentiating the sizes of the taping members 120. For example, as shown in FIG. 19, the first tape T1 and the third tape T3 can be formed to have a wider attachment area than the second tape T2. In this case, the plurality of taping members 120 can be configured to have the same material and characteristics, and a difference in adhesive strength can occur only by adjusting the size. As another example, different adhesive strengths of the plurality of taping members 120 differently can be implemented by varying the amount or type of adhesive used for the taping members 120. For example, the first tape T1 and the third tape T3 can be attached to the top sealing portion S2U of the battery cell 110 using an adhesive having stronger adhesion than the second tape T2.

According to this aspect of the present disclosure, when a gas, flame, or the like is discharged from the inside of the battery cell 110, a discharging direction can be induced to a specific part of the top sealing portion S2U. In particular, as shown in FIG. 19, if the adhesive strength of the second tape T2 located at the center is less than the adhesive strength of the first tape T1 and the third tape T3 located at the outside, when a flame or the like is discharged from the inside of the battery cell 110, there is a high possibility that the flame or the like is discharged at the central portion, rather than a part close to the electrode lead 111 in the top sealing portion S2U of the battery cell 110. Moreover, when the internal pressure of the battery cell 110 increases, a flame or the like are easily discharged first at the unattached region between the taping members 120 in the top sealing portion S2U of the battery cell 110. In addition, when the amount of flame or gas discharge increases, even the taping attached region can be opened and the flame or the like can be discharged through the taping attached region, and at this time, there is a high possibility that the second tape T2 located at the center is torn or separated from the pouch exterior before the first tape T1 or the third tape T3. Therefore, the flame or the like is easily directed toward the top hole HV disposed at the upper side of the battery cell 110, such as HV3 depicted in FIG. 9. Then, the flame or the like directed toward the side of the battery module where the electrode lead 111 is located, particularly toward the front side where the module terminal 200 is located, can be suppressed.

Figure 20:
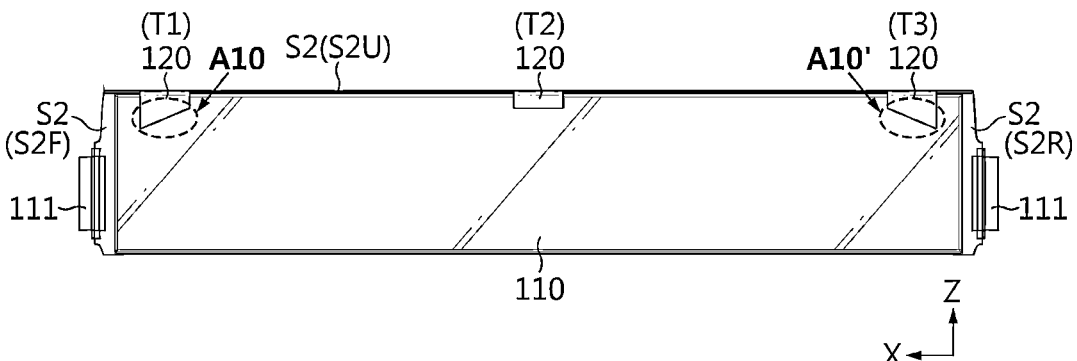
FIG. 20 is a diagram schematically showing a battery cell and a taping member included in a battery module according to still another aspect of the present disclosure.

FIG. 20 is a diagram schematically showing a battery cell 110 and a taping member 120 included in a battery module according to still another aspect of the present disclosure.

Referring to FIG. 20, the taping member 120 can have an inclined end. For example, in the aspect of FIG. 20, the first tape T1 and the third tape T3 have a shape in which a lower end of a part attached to the pouch exterior of the battery cell 110 can be inclined to be raised in a specific direction, as indicated by A10 and A10'.

In particular, the taping member 120 can be configured such that the attachment length becomes shorter in the direction toward the central portion. For example, the first tape T1 disposed at the front side can be configured such that the length in the upper and lower direction becomes shorter in the rear direction (−X-axis direction) toward the central portion, as indicated by A10. In addition, the third tape T3 disposed at the rear side can be configured such that the length in the upper and lower direction becomes shorter in the front direction (+X-axis direction) toward the central portion, as indicated by A10'.

According to this aspect of the present disclosure, in one taping member 120, it can be possible to control a portion that is first damaged or separated. For example, the first tape T1 in the aspect of FIG. 20 is easily separated from the outer surface of the battery cell 110 first from the rear side because the adhesive strength of the rear side is weak. Therefore, when a flame, gas, or the like is discharged from the inside of the battery cell 110, the central portion of the top sealing portion S2U of the battery cell 110 can be induced to be opened first rather than the corner at the front end where the electrode lead 111 is located. Also, in the case of the third tape T3, the center portion of the top sealing portion S2U of the battery cell 110 can also be induced to be opened first rather than the corner at the rear end where the electrode lead 111 is located. Therefore, in this case, the flame or the like is induced to be ejected from the top sealing portion S2U of the battery cell 110 to the upper side through the central portion, and the ejection can be suppressed as much as possible toward the front or rear side where the electrode lead 111 is located.

(Moved to page 15) The battery module according to the present disclosure can include an expansion member 500.

The expansion member 500 can be disposed at the front side and rear side of the cell assembly 100 in the inner space of the module case 300. For example, as shown in FIG. 2, the expansion member 500 can be disposed in the inner space defined by the mono frame and the end frame 320, and can be located in the +X-axis direction, which is the front direction of the cell assembly 100.

Also, the expansion member 500 can be expanded in volume by heat to fill at least a part of the inner space of the module case 300. This will be described in more detail with further reference to FIGS. 21 to 23.

Figure 21:
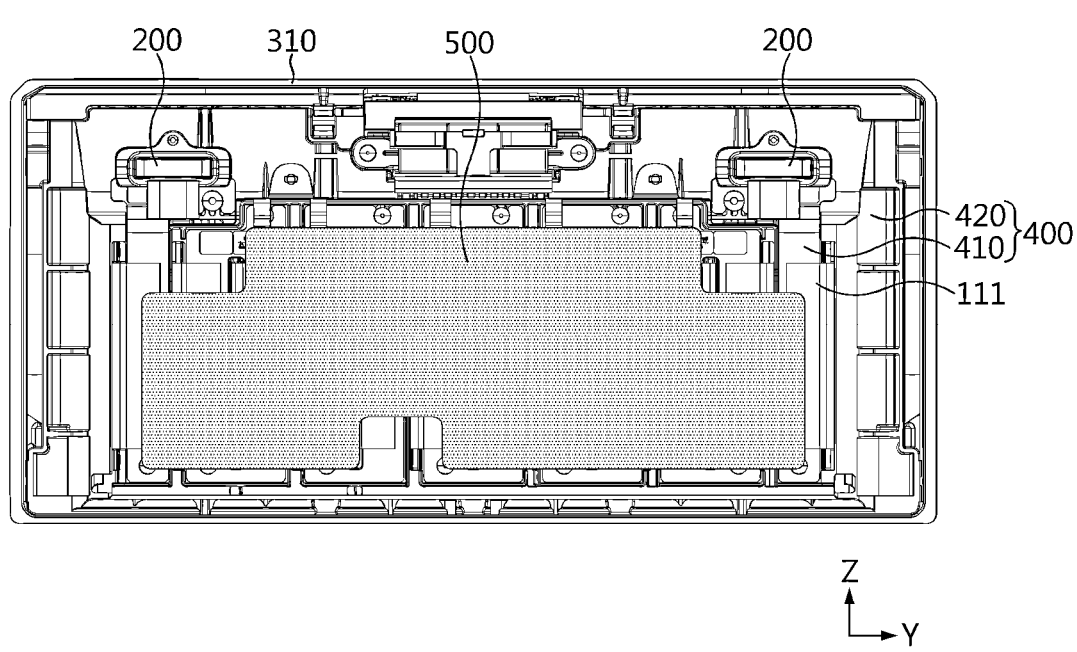
FIG. 21 is a diagram schematically showing an inner front configuration of a battery module according to an aspect of the present disclosure.
Figure 22:
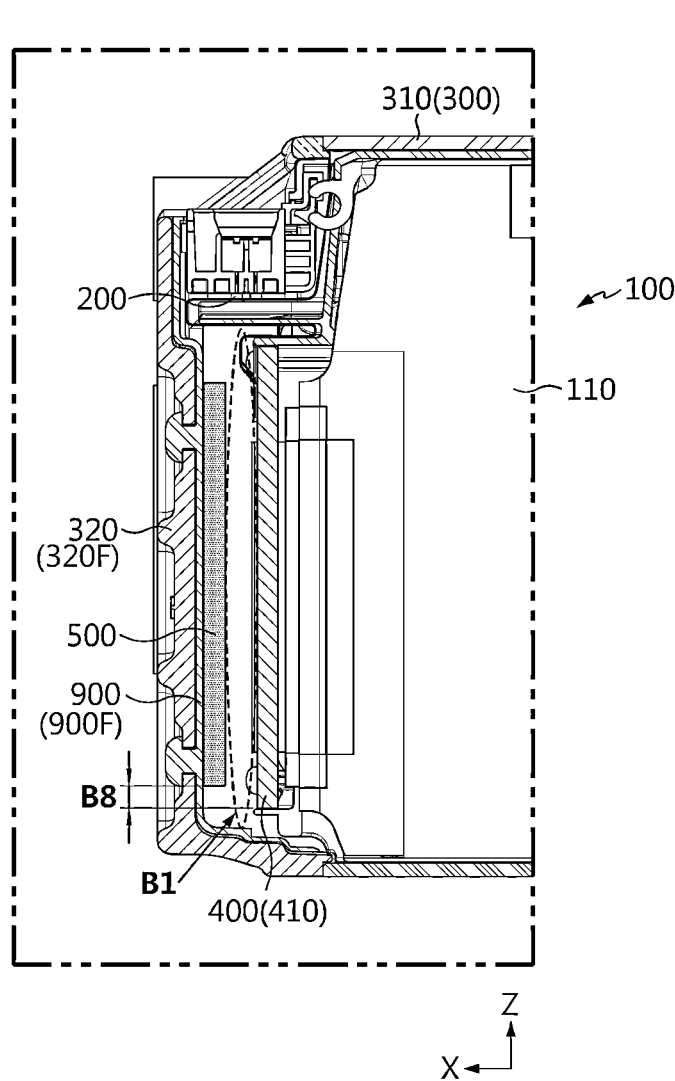
FIG. 22 is a cross-sectional view showing a front side of a battery module according to an aspect of the present disclosure.

FIG. 21 is a diagram schematically showing an inner front configuration of a battery module according to an aspect of the present disclosure. Also, FIG. 22 is a cross-sectional view showing a front side of a battery module according to an aspect of the present disclosure. In addition, FIG. 23 is a diagram showing one form in which an expansion member 500 is expanded in the configuration of FIG. 22.

Figure 23:
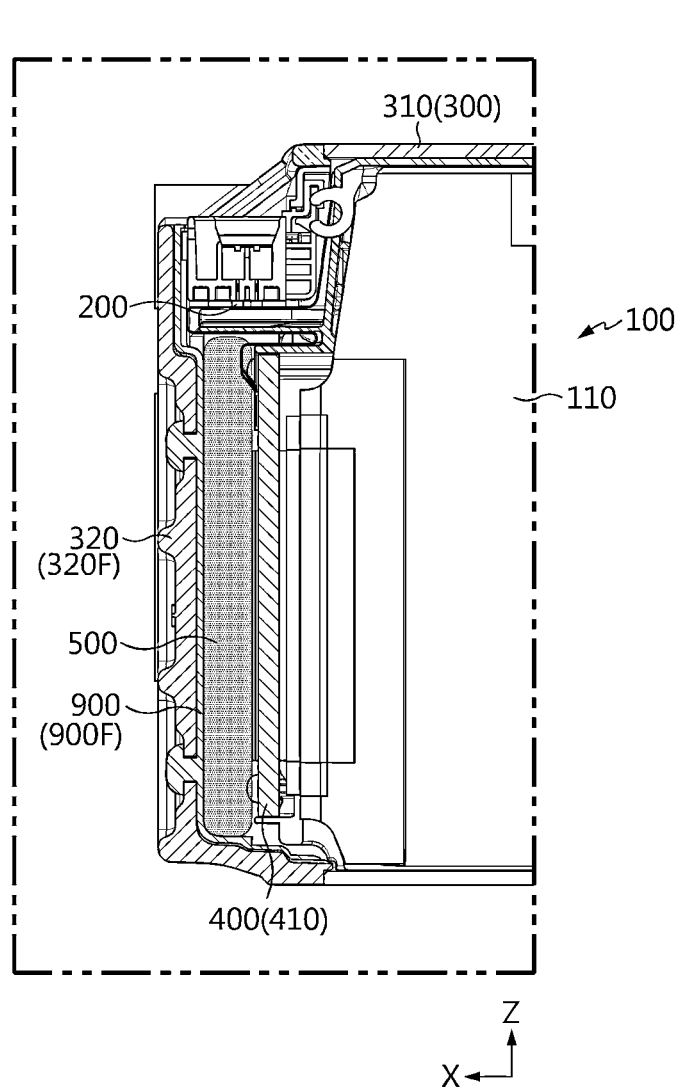
FIG. 23 is a diagram showing one form in which an expansion member is expanded in the configuration of FIG. 22.

Referring to FIGS. 21 to 23, the expansion member 500 can be disposed at the front side or rear side of the cell assembly 100 to cover at least a part of the front surface or rear surface of the cell assembly 100. For example, as shown in FIGS. 21 and 22, the front side of the cell assembly 100 in the inner space of the module case 300 can be covered by the expansion member 500. Also, the expansion member 500 disposed at the front side of the cell assembly 100 can be configured to expand by heat. For example, when thermal runaway occurs inside the cell assembly 100, heat can be transferred from the cell assembly 100 to the expansion member 500. At this time, the volume of the expansion member 500 is expanded by the heat transferred in this way, and as shown in FIG. 23, the expansion member 500 can fill at least a part of the empty space located at the front side of the cell assembly 100. Moreover, the expansion member 500 can be configured to fill the empty space between the front frame 320F and the cell assembly 100. For example, the expansion member 500 can fill at least a part of the portion indicated by B1 in FIG. 22 by expansion.

According to this aspect, exposure of flame, heat, electrode discharge, or the like to the front side of the battery module where the module terminal 200 is located due to the expansion of the expansion member 500 can be suppressed or reduced.

In addition, in this aspect, electrode discharge is prevented from being discharged toward the module terminal 200, so that it is possible to prevent the electrode discharge from being attached to the module terminal 200 or a bus bar between modules to cause a short circuit inside the battery module or battery pack. Also, according to this aspect, when the expansion member 500 expands, it is possible to prevent the flame or heat from being directed toward the front frame 320F, thereby preventing the front frame 320F from being melted by the flame. Therefore, even when a flame erupt inside the battery module, structural collapse of the module case 300 can be prevented as much as possible.

The expansion member 500 can include a material that is foamed by heat. For example, the expansion member 500 can include a material that starts to foam at 200° C. or higher. Moreover, the expansion member 500 can be configured to be foamed by a flame, hot gas or the like providing such a temperature condition. As a specific example, the expansion member 500 can include a carbon-based material and be configured to be foamed by heat.

According to this aspect, when a flame or high-temperature gas is generated due to thermal runaway at the cell assembly 100, the space at the front side of the cell assembly 100 can be quickly filled. Accordingly, it is possible to quickly block or suppress the flame or the like from being exposed to the front side of the cell assembly 100.

The expansion member 500 can be disposed to be spaced apart from the electrode lead 111 of the cell assembly 100 by a predetermined distance.

For example, the expansion member 500 can be spaced apart from the electrode lead 111 by a predetermined distance or more, as indicated by B1 in FIG. 22. That is, the expansion member 500 can be mounted not to directly contact the electrode lead 111 in the inner space of the module case 300.

According to this aspect, it is possible to use an electrically conductive material for the expansion member 500. That is, even if the expansion member 500 includes a material having electrical conductivity, since the electrode lead 111 and the expansion member 500 do not directly contact each other, problems such as a short circuit due to direct contact between them can be prevented.

The expansion member 500 can be configured such that a lower end is positioned higher than a lower end of the bus bar terminal 410.

For example, as seen in FIG. 22, the lower end of the expansion member 500 can be located higher than the lower end of the bus bar terminal 410 as indicated by B8 in a normal, non-expanded state. In other words, the lower end of the bus bar terminal 410 can be positioned lower than the lower end of the expansion member 500.

According to this aspect, electrical insulation between the expansion member 500 and the bus bar terminal 410 can be improved. In particular, when electrolyte leaks from the cell assembly 100 or moisture flows into the module case 300, the electrolyte or moisture can accumulate on the bottom of the module case 300. At this time, if the lower end of the expansion member 500 is higher than the lower end of the bus bar terminal 410, even if the electrolyte or the like rises to a predetermined level, it is possible to prevent electric connection between the bus bar terminal 410 and the expansion member 500. Therefore, electrical safety of the battery module can be improved even in situations where electrolyte or the like leaks out or moisture inflows.

In addition, the expansion member 500 can be at least partially insulation-coated. In particular, at least a part of the expansion member 500 facing the cell assembly 100 can be coated with an electrically insulating material.

For example, as seen in FIG. 22, the surface of the expansion member 500 facing the cell assembly 100, namely the rear surface, can be coated with a polyethylene terephthalate (PET) material. However, the insulating coating layer can be provided with various other materials.

According to this aspect, it can be advantageous to secure electrical insulation for the expansion member 500. For example, in this case, when the expansion member 500 directly contacts the electrode lead 111 or other electrical components, it is possible to prevent electrical problems such as short circuit from occurring. In particular, the battery module according to the present disclosure can be mounted to a vehicle that can be exposed to vibration or shock during use. At this time, according to this aspect, even when the expansion member 500 temporarily contacts the electrode lead 111 during vibration or shock, it is possible to prevent problems such as short circuit from occurring.

As shown in FIGS. 2 and 22, the battery module according to the present disclosure can further include an insulating cover 900, particularly a front insulating cover 900F.

The front insulating cover 900F can include an electrically insulating material. For example, the front insulating cover 900F can include a polymer material such as plastic. As a more specific example, the front insulating cover 900F can include a modified polyphenylene oxide (MPPO) material.

The front insulating cover 900F can be interposed between the front side of the cell assembly 100 and the module case 300. That is, the front insulating cover 900F can be interposed between the cell assembly 100 and the front frame 320F. Accordingly, electrical insulation can be secured between the cell assembly 100 and the front frame 320F. In particular, an electrical component such as the electrode lead 111 can be located at the front side of the cell assembly 100. Also, the front frame 320F can be made of an electrically conductive material such as aluminum. In this case, the front insulating cover 900F made of an electrically insulating material can be interposed between the electrode lead 111 of the cell assembly 100 and the front frame 320F, thereby electrically insulating them from each other.

An expansion member 500 can be attached to the inner surface of the front insulating cover 900F. That is, the expansion member 500 can be attached to the rear surface of the front insulating cover 900F through a double-sided adhesive tape or the like. In this case, the front insulating cover 900F can be configured to provide a space to which the expansion member 500 can be attached. For example, the rear surface of the front insulating cover 900F can have a flat portion to which the expansion member 500 can be attached. In this case, the expansion member 500 can be stably positioned inside the module case 300. In particular, it is preferable that the expansion member 500 is spaced by a certain distance from the electrode lead 111 of the cell assembly 100 or the like, but in this aspect, the distance between the expansion member 500 and the electrode lead 111 can be stably secured.

Meanwhile, the front insulating cover 900F can be made of a polymer material, and in this case, the front insulating cover 900F can be melted or lost by a high-temperature flame. However, in the present disclosure, even if the front insulating cover 900F is melted or lost at the front side of the cell assembly 100, the expansion member 500 can be foamed or expanded to block the front frame 320F at the front side of the cell assembly 100. In addition, when the expansion member 500 expands, it is possible to suppress a flame or the like from being directed toward the front insulating cover 900F, thereby reducing the chance of melting or loss of the front insulating cover 900F.

The front insulating cover 900F can be fastened to the module case 300 by a protruding structure. This will be described in more detail with reference to FIG. 24.

Figure 24:
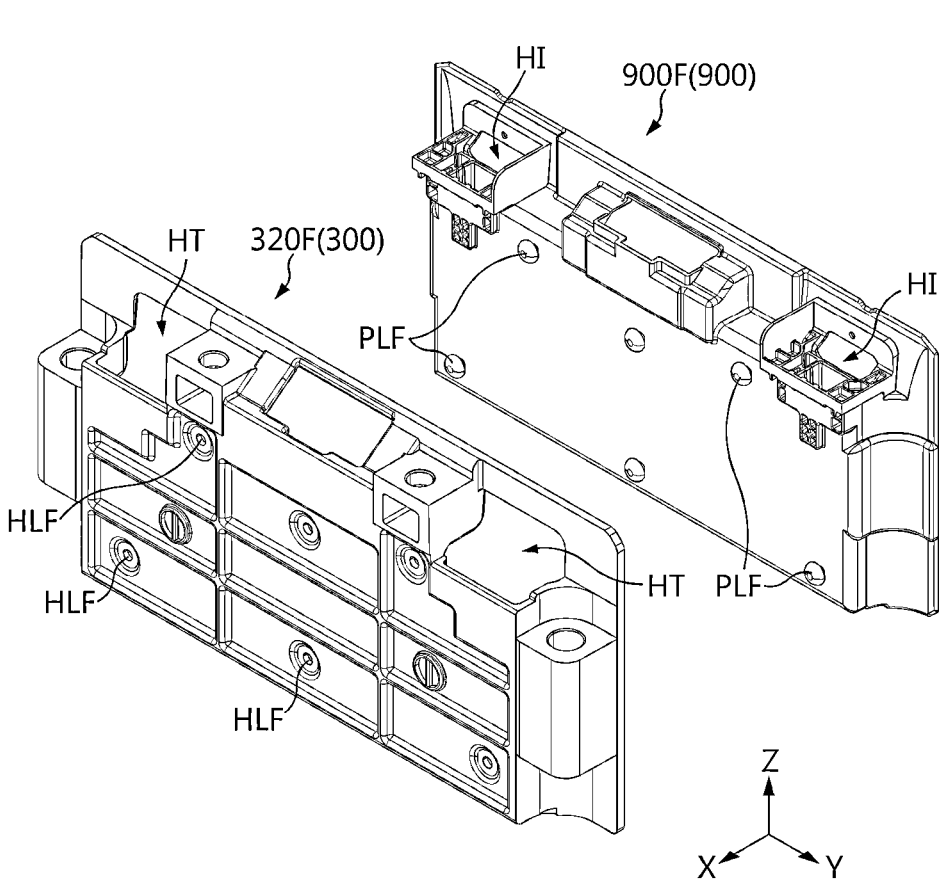
FIG. 24 is an exploded and enlarged perspective view showing come components of a battery module according to an aspect of the present disclosure.

FIG. 24 is an exploded and enlarged perspective view showing come components of a battery module according to an aspect of the present disclosure. In particular, FIG. 24 shows that the front frame 320F and the front insulating cover 900F are in a separated form.

Referring to FIG. 24, a front fastening hole can be formed in the module case 300, particularly in the front frame 320F, as indicated by HLF. In addition, the front insulating cover 900F can have a front fastening protrusion, as indicated by PLF. Here, the front fastening protrusion PLF can be inserted into the front fastening hole HLF when assembling the battery module. A plurality of front fastening protrusions PLF can be formed on the front insulating cover 900F. In addition, a plurality of front fastening holes HLF can also be formed in the front frame 320F to correspond to the plurality of front fastening protrusions PLF.

Moreover, the front fastening protrusion PLF can be inserted to penetrate the front frame 320F from the inside to the outside. Also, in the front fastening protrusion PLF, the outer end exposed to the outside of the front frame 320F can be formed thicker than the penetrated portion. That is, the outer end of the front fastening protrusion PLF can be formed larger than the size of the front fastening hole HLF. At this time, the thick part of the outer end can be prepared by inserting the front fastening protrusion PLF into the front fastening hole HLF and then pressing the front fastening protrusion PLF by applying pressure together with heat.

According to this aspect of the present disclosure, the coupling force between the front frame 320F and the front insulating cover 900F can be stably secured. In addition, in this case, it is possible to prevent the front insulating cover 900F or the expansion member 500 attached thereto from moving toward the electrode lead 111 and contacting the electrode lead 111 or the like.

The expansion member 500 can be configured to block the front fastening hole HLF during expansion. First, the expansion member 500 can be located at a position to block the front fastening hole HLF during expansion. The expansion member 500 can be disposed at a position capable of covering the front fastening hole HLF on the Y-Z axis plane during expansion. In addition, the expansion member 500 can have a shape or structure capable of blocking the front fastening hole HLF during expansion. In particular, the expansion member 500 can have a position and shape capable of covering the front fastening hole HLF on the Y-Z axis plane even before expansion.

As a more specific example, when a plurality of front fastening holes HLF are formed in the front frame 320F, the expansion member 500 can be configured to block all of the plurality of front fastening holes HLF in an expanded state.

According to this aspect of the present disclosure, even if at least a part of the front insulating cover 900F is melted or lost, a flame, high-temperature gas, electrode discharge, or the like can be prevented from being ejected toward the front side of the battery module through the front fastening hole HLF. In particular, in a normal state, the front fastening hole HLF is blocked by the front fastening protrusion PLF of the expansion member 500, but when the front insulating cover 900F is deformed due to high heat caused by a flame or the like, the front fastening hole HLF can be expanded. However, by blocking the opening of the front fastening hole HLF by the expansion member 500, it is possible to reliably limit external exposure of the flame or the like through the front fastening hole HLF.

The expansion member 500 can be configured to block a flame or gas from being directed toward the module terminal 200. This will be described in more detail with further reference to FIG. 25.

Figure 25:
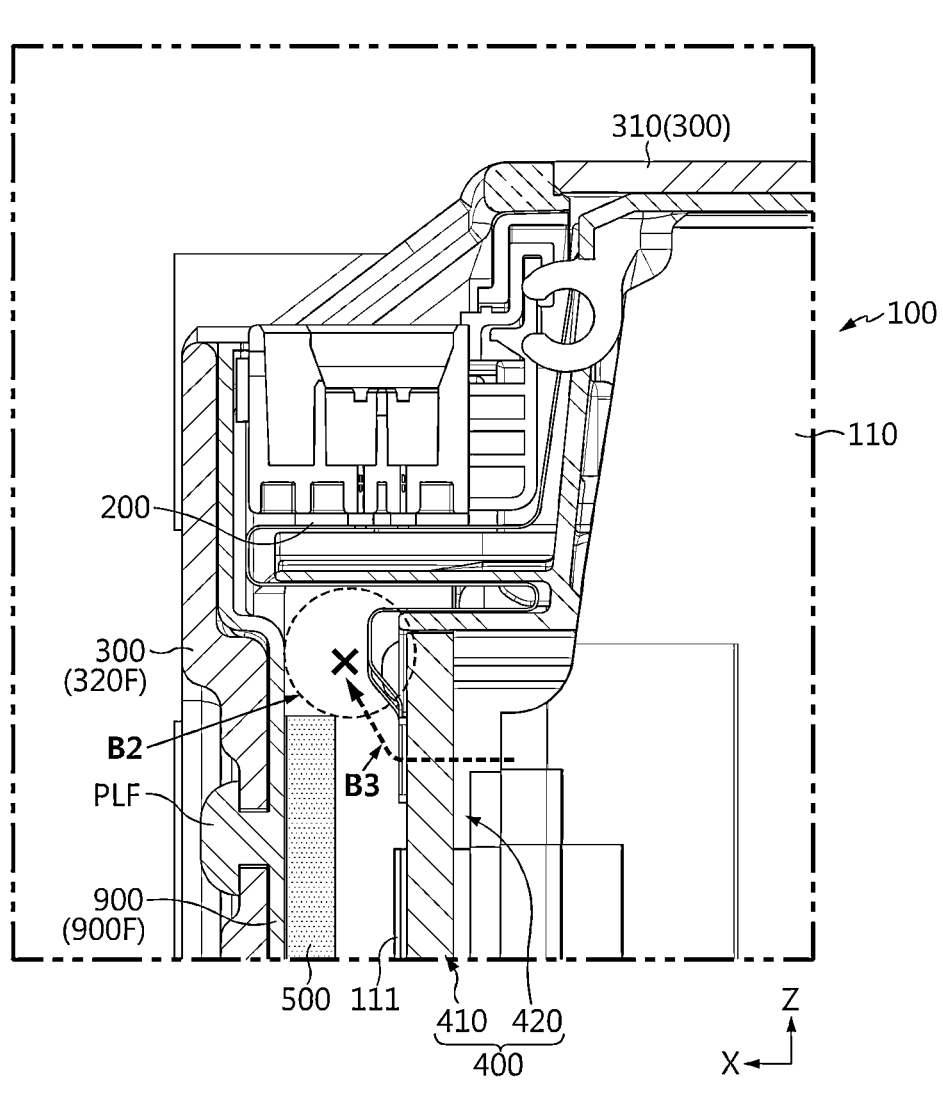
FIG. 25 is an enlarged view showing some components of a battery module according to an aspect of the present disclosure.

FIG. 25 is an enlarged view showing some components of a battery module according to an aspect of the present disclosure. For example, FIG. 25 can be an enlarged view showing a top portion of FIG. 22.

Referring to FIG. 25 along with FIGS. 22 and 23, the expansion member 500 can expand when a flame or gas is discharged from the cell assembly 100. In particular, the module terminal 200 can be located at the front upper side, and an empty space can exist below the module terminal 200, as indicated by B2 in FIG. 25. However, when a thermal runaway situation occurs in the cell assembly 100 and the expansion member 500 expands, at least a part of the empty space B2 below the module terminal 200 can be filled by the expansion member 500.

In this case, as indicated by arrow B3 in FIG. 25, even if the flame or the like is directed from the cell assembly 100 toward the module terminal 200, the already expanded expansion member 500 can block the movement of the flame. In particular, a terminal hole HT can exist in the front frame 320F and an insulation hole HI can be formed in the insulation cover 900, and the expansion member 500 can suppress a flame, gas, electrode discharge, or the like from being discharged outward toward the terminal hole HT and insulation hole HI in an expanded state. Therefore, according to this aspect, it is possible to more effectively prevent heat propagation or flame propagation between modules, or short-circuit or the like of electrical connection components between modules.

The expansion member 500 can be configured to expand in all directions by heat. This will be described in more detail with further reference to FIG. 26.

Figure 26:
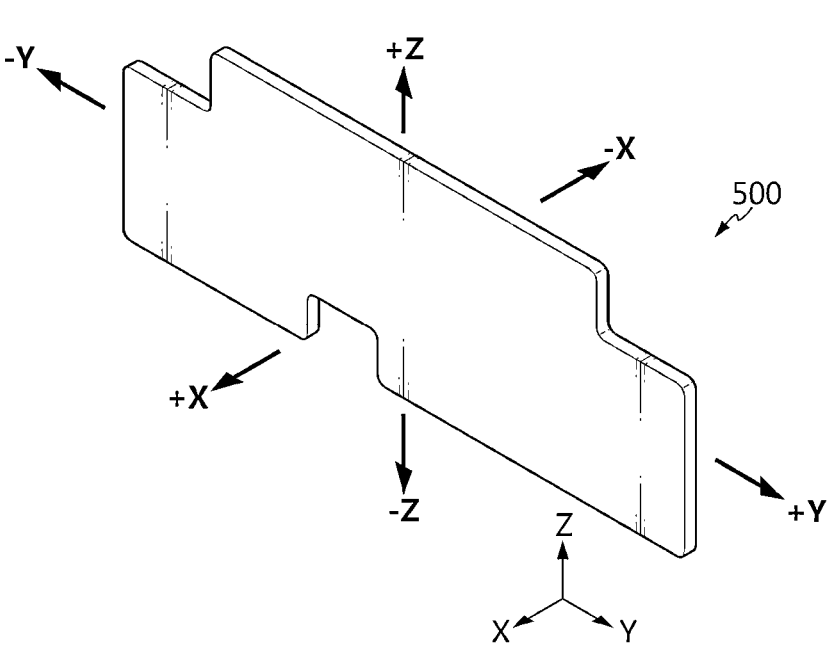
FIG. 26 is a schematic diagram showing an example of an expansion configuration of the expansion member according to an aspect of the present disclosure.

FIG. 26 is a diagram showing an example of an expansion configuration of the expansion member 500 according to an aspect of the present disclosure.

Referring to FIG. 26, the expansion member 500 can have a sheet shape in which two wide surfaces are erected to face the front and rear direction (X-axis direction). At this time, the expansion member 500 can include a material that expands not only in the front and rear direction, which is a thickness direction, but also in all of the upper, lower, left and right directions. For example, as indicated by six arrows in FIG. 26, the expansion member 500 can expand in all of +X direction, −X direction, +Y direction, −Y direction, +Z direction, and −Z direction. That is, the expansion member 500 in a sheet form can be configured to be expandable in all of directions (directions parallel to the Y-Z plane) parallel to the surface and directions (+X-axis direction) perpendicular to the surface during expansion. Moreover, the expansion member 500 can be made of a material that is foamed in all directions when it is expanded in a heat-induced foaming method.

According to this aspect, even if the shape or structure of the expansion member 500 in a normal state is not specially prepared, the empty space inside the module case 300 can be well filled when the expansion member 500 expands. Accordingly, the expansion member 500 or the inner space of the module case 300 equipped with the expansion member 500 can be easily manufactured. In addition, the flame blocking effect by the expansion member 500 can be stably secured.

The expansion member 500 can be configured in the form of a sheet of a single material. However, the present disclosure is not necessarily limited to this form, and the expansion member 500 can be configured in various other forms. In particular, the expansion member 500 can be configured in the form of a composite sheet made of different materials. This will be described in more detail with reference to FIG. 27.

Figure 27:
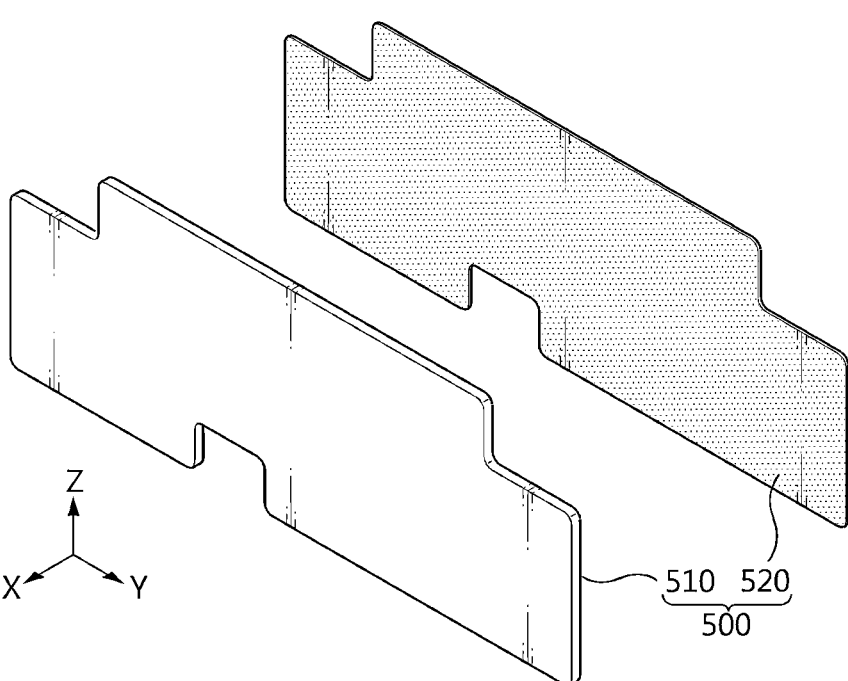
FIG. 27 is an exploded perspective view schematically showing an expansion member according to another aspect of the present disclosure.

FIG. 27 is an exploded perspective view schematically showing an expansion member 500 according to another aspect of the present disclosure.

Referring to FIG. 27, the expansion member 500 can include two sheets, namely a first expansion sheet 510 and a second expansion sheet 520. Here, the first expansion sheet 510 and the second expansion sheet 520 can be made of different materials. Moreover, the first expansion sheet 510 can be specialized for expansion, and the second expansion sheet 520 can be specialized for flame blocking. In this case, the second expansion sheet 520 can be made of a material with a higher melting point than the first expansion sheet 510. In addition, the first expansion sheet 510 and the second expansion sheet 520 can be made of materials having different electrical conductivity. Moreover, the first expansion sheet 510 can be made of a material having electrical conductivity, and the second expansion sheet 520 can be made of a material having electrical insulation.

As a representative example, the first expansion sheet 510 can be made of a material that is foamed by heat, for example a graphite-based foam material. In addition, the second expansion sheet can be made of a mica material.

In addition, the first expansion sheet 510 and the second expansion sheet 520 can be configured to have different thicknesses. For example, the first expansion sheet 510 can have a thickness of 3 mm, and the second expansion sheet 520 can have a thickness of 1 mm.

The first expansion sheet 510 and the second expansion sheet 520 can be laminated to each other in the thickness direction. In particular, the second expansion sheet 520 can be located at the inner side of the first expansion sheet 510. In particular, when the expansion member 500 is located at the front side of the cell assembly 100, the second expansion sheet 520 can be laminated on the rear side of the first expansion sheet 510. In this case, the second expansion sheet 520 can directly face the electrode lead 111 of the cell assembly 100, and the first expansion sheet 510 does not directly face the electrode lead 111.

According to this aspect, even if the first expansion sheet 510 is made of a graphite-based material and has electrical conductivity, the second expansion sheet 520 having electrical insulation can prevent the first expansion sheet 510 from directly contacting the electrode lead 111 or the like. Therefore, electrical insulation between the first expansion sheet 510 and the electrode lead 111 can be stably secured.

Also, according to this aspect, even if a flame or high-temperature gas is ejected from the cell assembly 100 toward the front side, the second expansion sheet 520 can primarily block the flame from moving toward the first expansion sheet 510. Therefore, the first expansion sheet 510 can be stably foamed or expanded without being immediately burned by the flame or the like. The first expansion sheet 510 can expand without being constrained by the second expansion sheet 520.

Also, according to this aspect, the overall thickness of the expansion member 500 can be reduced. For example, according to this aspect, since the expansion space of the first expansion sheet 510 is reduced by the space occupied by the second expansion sheet 520, even if the thickness of the first expansion sheet 510 is not increased, the space at the front side of the cell assembly 100 can be more rapidly and definitely filled. Therefore, even if the expansion member 500 is configured with a thin thickness, the performance of the expansion member 500 for blocking the discharge of flame at the front side by sealing the space at the front side of the cell assembly 100 can be secured more effectively.

Figure 28:
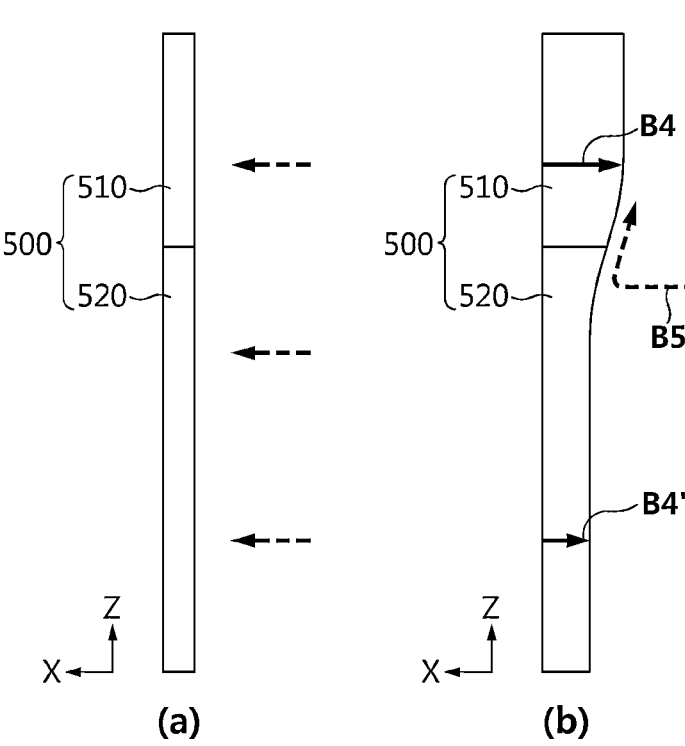
FIG. 28 is a diagram schematically showing an expansion member according to still another aspect of the present disclosure.

FIG. 28 is a diagram schematically showing an expansion member 500 according to still another aspect of the present disclosure. In particular, (a) of FIG. 28 can be a cross-sectional view showing the expansion member 500 before expansion, and (b) FIG. 28 is a cross-sectional view showing the expansion member 500 after expansion.

Referring to FIG. 28, the expansion member 500 can be composed of different materials in the upper and lower direction. For example, in the former aspect of FIG. 27, two sheet members are laminated to each other in the thickness direction, but in FIG. 28, two sheet members can be laminated to each other in the vertical direction. In particular, the two sheet members, namely the first expansion sheet 510 and the second expansion sheet 520, can be laminated in the upper and lower direction with their corners touching each other. At this time, the first expansion sheet 510 can be laminated on the top of the second expansion sheet 520. In this respect, the first expansion sheet 510 can be referred to as an upper expansion sheet, and the second expansion sheet 520 can be referred to as a lower expansion sheet.

The first expansion sheet 510 and the second expansion sheet 520 can be made of different materials. In particular, the first expansion sheet 510 and the second expansion sheet 520 can have different thermal expansion rates. Moreover, the first expansion sheet 510 can have a higher thermal expansion rate than the second expansion sheet 520.

For example, as shown in (a) of FIG. 28, the first expansion sheet 510 and the second expansion sheet 520 can have the same or similar thicknesses before expansion. Meanwhile, the first expansion sheet 510 and the second expansion sheet 520 can have different thicknesses after expansion, as shown in (b) of FIG. 28. In particular, the first expansion sheet 510 can be configured to have a greater thermal expansion rate than the second expansion sheet 520.

That is, as indicated by the dotted arrow in (a) of FIG. 28, when heat is applied from the cell assembly 100, the first expansion sheet 510 can expand in the thickness direction as indicated by arrow B4 in (b) of FIG. 28. Also, the second expansion sheet 520 can expand in the thickness direction as indicated by arrow B4' in (b) of FIG. 28. In this case, the expansion rate of the first expansion sheet 510 in the thickness direction can be greater than the expansion rate of the second expansion sheet 520 in the thickness direction. That is, after expansion, the first expansion sheet 510 can be thicker than the second expansion sheet 520.

According to this aspect, since the expansion member 500 is configured to have partially different expansion rates, it is possible to suppress or induce movement of a flame or the like to a specific part. For example, as shown in FIG. 28, when the expansion rate of the first expansion sheet 510 laminated at the upper portion is made thick, as indicated by arrow B5 in (b), when a flame or electrode discharge directed from the inside to the outside (+X-axis direction) collides with the expansion member 500 and is reflected to the upper side, the reflection angle can be less than 90 degrees)(°. That is, in this aspect, as the flame or electrode discharge is reflected in a bent state to the rear (−X-axis direction), the discharge of the flame or the like toward the front side can be further suppressed.

Meanwhile, in the aspect of FIG. 28, it is shown that the two expansion sheets laminated in the upper and lower direction are made of materials having the same initial thickness but different expansion rates, but the configuration in which the expansion thickness of the expansion member 500 is different can be implemented in other ways. This will be described in more detail with reference to FIG. 29.

Figure 29:
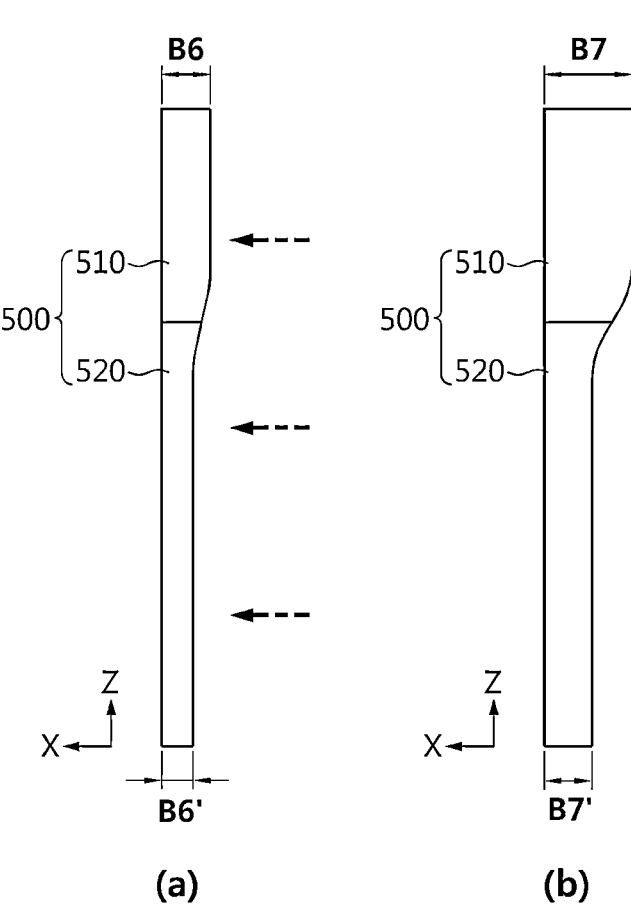
FIG. 29 is a diagram schematically showing an expansion member according to still another aspect of the present disclosure.

FIG. 29 is a diagram schematically showing an expansion member 500 according to still another aspect of the present disclosure. In particular, (a) of FIG. 29 can be a cross-sectional view showing the expansion member 500 before expansion, and (b) of FIG. 29 can be a cross-sectional view showing the expansion member 500 after expansion.

First, referring to (a) of FIG. 29, the first expansion sheet 510 and the second expansion sheet 520 can be configured to have different thicknesses before expansion. That is, the thickness of the first expansion sheet 510 located at the upper side is indicated as B6, and the thickness of the second expansion sheet 520 located at the lower side is indicated as B6'. At this time, B6 and B6' are different values, and can have a relationship of B6 being greater than B6'.

Also, as indicated by the dotted arrow, when heat is applied from the cell assembly 100, the first expansion sheet 510 and the second expansion sheet 520 can expand in the thickness direction. At this time, as shown in (b) of FIG. 29, the first expansion sheet 510 and the second expansion sheet 520 can have even greater difference in thicknesses after expansion. That is, the first expansion sheet 510 can have a thickness indicated by B7, and the second expansion sheet 520 can have a different thickness by B7'. In particular, B7 and B7' have a relationship of B7 being greater than B7', and the thickness of the first expansion sheet 510 after expansion can be greater than the thickness of the second expansion sheet 520 after expansion.

Even in this configuration, as described in the former aspect of FIG. 28, movement of flame or particles in a specific direction can be suppressed or induced. Moreover, in this aspect, the first expansion sheet 510 and the second expansion sheet 520 do not need to have different expansion rates, so they can be made of the same material. In addition, the first expansion sheet 510 and the second expansion sheet 520 can be manufactured in an integrated form, and there can be no need for a process of coupling them after separate manufacture. Therefore, in this case, the expansion member 500 can be more easily manufactured, and structural stability can be secured.

Meanwhile, in the aspects of FIGS. 28 and 29, the expansion member 500 is described based on the configuration in which the expansion member 500 expands in the thickness direction, but as described above, the expansion member 500 can expand in the plane (Y-Z plane) direction.

In addition, when the bus bar assembly 400 is included in the battery module, the expansion member 500 can be located to be spaced apart from the bus bar assembly 400 at the front side by a predetermined distance. For example, the expansion member 500 can be located at a position spaced apart from the bus bar terminal 410 or the bus bar housing 420 by a predetermined distance toward the front side, as indicated by B1 in FIG. 22. That is, in a normal state where thermal runaway or the like does not occur, an empty space can be located between the expansion member 500 and the bus bar assembly 400. Also, when the expansion member 500 expands due to thermal runaway or the like, the empty space can be filled by the expansion member 500. For example, the expansion member 500 can be configured to be foamed by heat and fill the space between the bus bar assembly 400 and the insulating cover 900.

According to this aspect, even if the expansion member 500 includes an electrically conductive material, electrical insulation between the expansion member 500 and the bus bar terminal 410 can be secured by a coating of electrically insulative material. In addition, in this case, a problem in which the bus bar assembly 400 is damaged since the expansion member 500 contacts the bus bar assembly 400 by external shock, vibration, or the like can be prevented.

The bus bar housing 420 of the bus bar assembly 400 at the front side can include a front housing protrusion. This will be described in more detail with further reference to FIG. 30.

Figure 30:
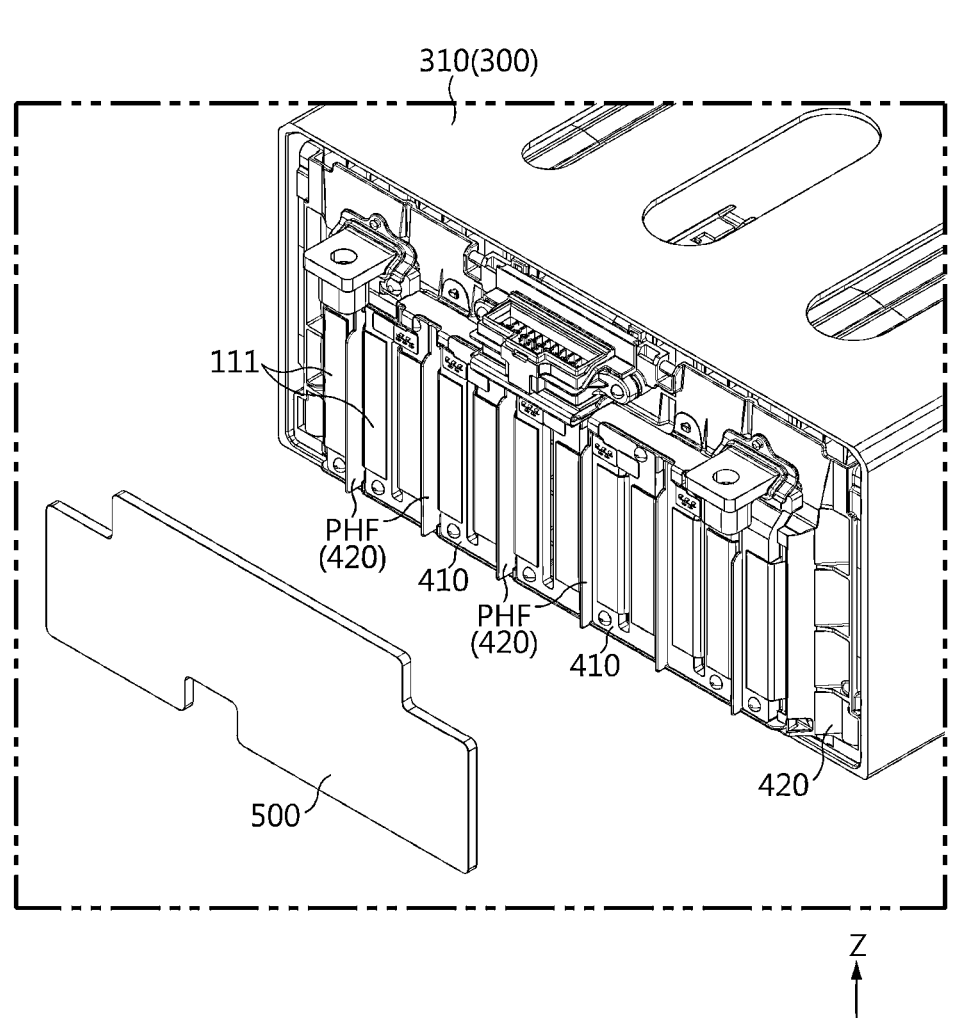
FIG. 30 is a diagram schematically showing some components of a battery module according to an aspect of the present disclosure.

FIG. 30 is a diagram schematically showing some components of a battery module according to an aspect of the present disclosure. In particular, FIG. 30 shows a form in which the front frame 320F and the front insulating cover 900F are removed at the front side of the battery module, and the expansion member 500 is further moved toward the front side of the bus bar assembly 400.

Referring to FIG. 30, the bus bar assembly 400 at the front side can include a bus bar terminal 410 and a bus bar housing 420. At this time, the bus bar housing 420 can have a front housing protrusion as indicated by PHF. The front housing protrusion PHF can protrude toward the expansion member 500 located at the front side. In particular, the bus bar terminal 410 is mounted to the bus bar housing 420, and the electrode lead 111 can be coupled in contact with the bus bar terminal 410 in a bent form. At this time, the front housing protrusion PHF can protrude further to the front side than the bus bar terminal 410 or the electrode lead 111 in contact with the bus bar terminal 410.

According to this aspect of the present disclosure, in a normal state, direct contact between the bus bar terminal 410 or the electrode lead 111, which is a component for electrical connection, and the expansion member 500 can be prevented more reliably. In particular, even if the expansion member 500 is made of an electrically conductive material, the separation distance between the bus bar terminal 410 or the electrode lead 111 and the expansion member 500 can be stably secured by the front housing protrusion PHF.

Referring to FIG. 22, the front housing protrusion PHF can be configured to protrude toward the expansion member 500 in the separation space between the bus bar terminal 410 or the electrode lead 111 and the expansion member 500, as indicated by B1. At this time, the front end of the front housing protrusion PHF will not directly contact the inner surface of the expansion member 500 but be spaced apart therefrom by a predetermined distance. In this case, the tolerance can be stably secured between the expansion member 500 and the bus bar assembly 400.

As another example, the front end of the front housing protrusion PHF can directly contact the inner surface of the expansion member 500. In this case, the expansion member 500 can more stably maintain its position inside the module case 300 even in the event of external vibration or impact.

In addition, the front housing protrusion PHF can be formed to be elongated in the upper and lower direction. In particular, since the bus bar terminal 410 mounted to the bus bar housing 420 can be formed long in the upper and lower direction, the front housing protrusion PHF can be formed long in the upper and lower direction like the bus bar terminal 410.

In addition, a plurality of bus bar terminals 410 can be arranged to be spaced apart from each other in the left and right direction on the bus bar housing 420. At this time, the front housing protrusion PHF can be interposed between adjacent bus bar terminals 410 as shown in FIG. 30. Moreover, a plurality of front housing protrusions PHF can be arranged in the horizontal direction on the bus bar housing 420. In this case, a stable separation distance can be maintained between the entire bus bar terminal 410 and the expansion member 500. Also, in this case, physical separation between adjacent bus bar terminals 410 can be stably secured.

(moved to page 67) Meanwhile, in an aspect of the present disclosure, when the expansion member 500 is provided at the front side of the cell assembly 100, a flame or gas can be discharged toward the upper side through the top hole HV without first moving toward the expansion member 500. In this case, only heat is transferred to the expansion member 500 side first, so that the expansion member 500 can be sufficiently inflated. Moreover, it is possible to prevent a gas, flame, or the like from being ejected to the expansion member 500 before the expansion member 500 expands, and thus prevent the expansion member 500 from escaping due to the gas, flame, or the like or the flame or the like from being leaked into the empty space before expansion.

Also, in the module case 300, a rear hole can be formed. This will be described in more detail with further reference to FIGS. 31 and 32.

Figure 31:
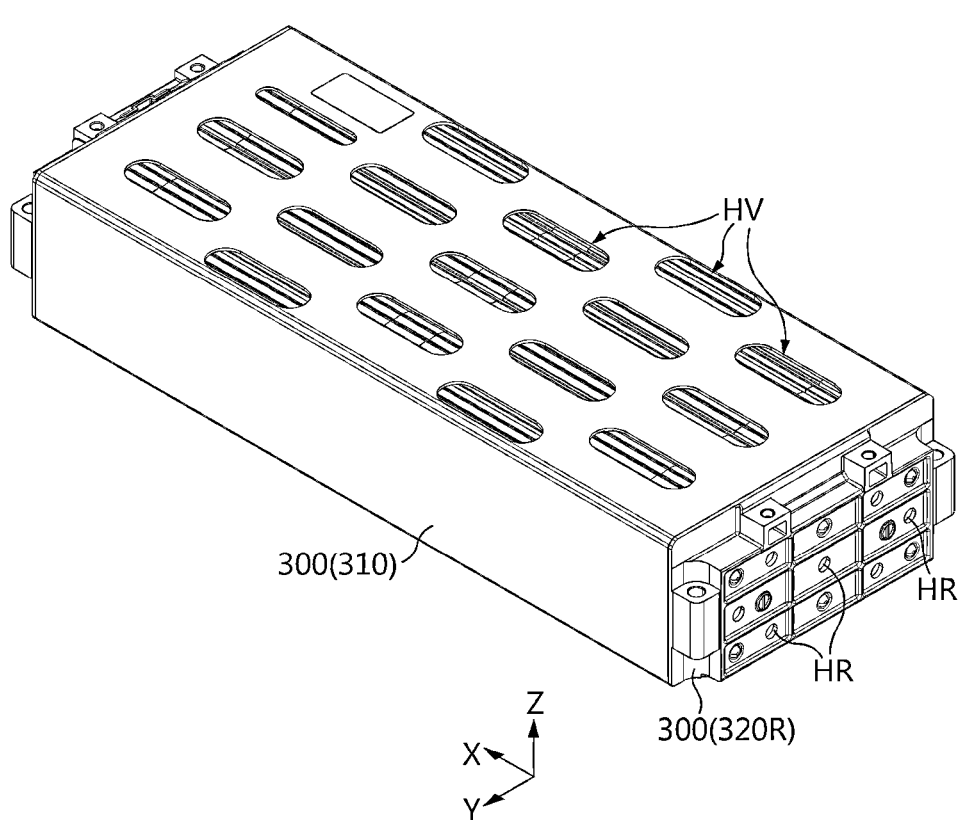
FIG. 31 is a perspective view showing the rear side of the battery module according to an aspect of the present disclosure.

FIG. 31 is a perspective view showing the rear side of the battery module according to an aspect of the present disclosure. Also, FIG. 32 is a diagram in which some components of FIG. 31 are separated.

Figure 32:
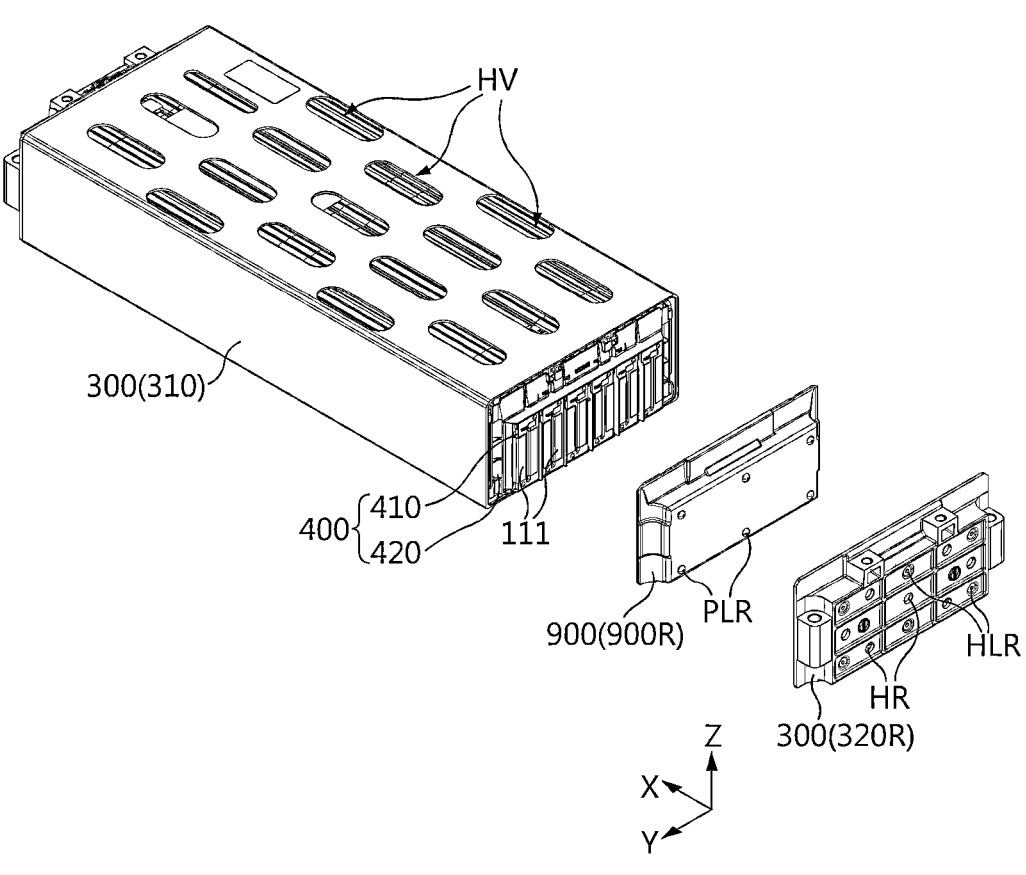
FIG. 32 is a diagram in which some components of FIG. 31 are separated.

Referring to FIGS. 31 and 32, in the module case 300, a rear hole can be formed in the opposite side of the part where the module terminal 200 is installed, namely in the rear side, as indicated by HR. Like the top hole HV, the rear hole HR can also be provided to communicate with the inner space of the module case 300.

According to this aspect of the present disclosure, it is possible to control the direction of the flame or the like ejected from the inside of the battery module. This will be described in more detail with further reference to FIG. 33.

Figure 33:
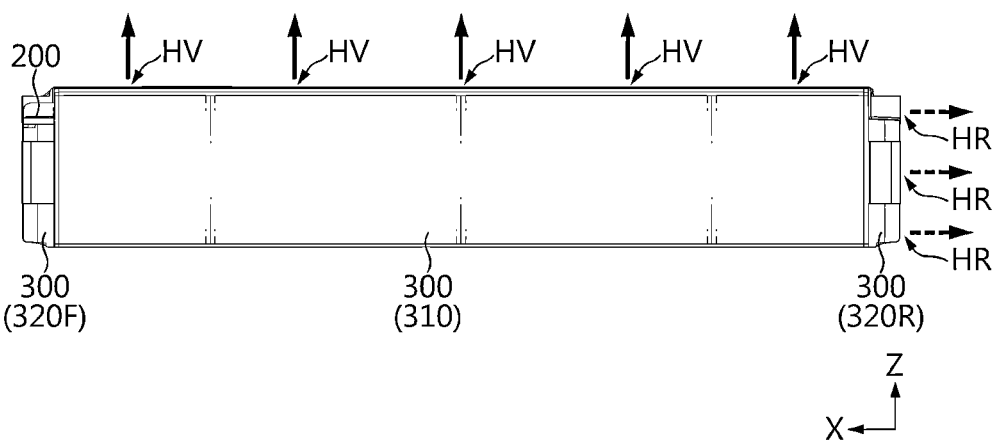
FIG. 33 is a diagram showing a state in which a flame or the like is ejected from the battery module according to an aspect of the present disclosure.

FIG. 33 is a diagram showing a state in which a flame or the like is ejected from the battery module according to an aspect of the present disclosure.

Referring to FIG. 33, when a situation such as thermal runaway occurs in the cell assembly 100 accommodated in the module case 300, a flame, high-temperature venting gas, electrode discharge, or the like can be generated. In addition, when the flame or the like reaches a certain level or higher, the flame or the like can be discharged to the outside of the module case 300. At this time, in the battery module according to an aspect of the present disclosure, since the top hole HV is formed at the upper side and the rear hole HR is formed at the rear side, the flame can be induced upward and backward. That is, the flame or the like can be discharged to the upper side through the top hole HV as indicated by a solid arrow in FIG. 33 or can be discharged to the rear side through the rear hole HR as indicated by a dotted arrow in FIG. 33. In this case an expansion member 500 would not be used with the rear frame 320R.

Therefore, according to this aspect of the present disclosure, discharge of flame toward the front side where the module terminal 200 is located can be suppressed or delayed.

Moreover, in the present disclosure, the top hole HV and the rear hole HR can allow the flame and the like to be discharged in different directions other than the front side. More specifically, the top hole HV can allow the flame or the like to be discharged in a vertical direction (upward), and the rear hole HR can allow the flame or the like to be discharged in a horizontal direction (rearward). Therefore, by discharging the flame or the like upward and rearward simultaneously, the flame or the like can be dispersed and discharged to spaces other than the front side, and also the discharge toward the front side can be suppressed as much as possible.

In addition, according to this aspect of the present disclosure, when a venting gas, flame, or the like occurs due to an event such as thermal runaway inside the battery module, the gas or flame can be smoothly discharged to the outside of the module case 300. Therefore, in case of an emergency, the internal pressure of the module case 300 can be quickly lowered to prevent the battery module from exploding. Therefore, safety of the battery module can be improved.

Meanwhile, the end frame 320 can include a front frame 320F and a rear frame 320R. Here, the front frame 320F can be configured to cover the opening at the front side of the body frame 310. Also, the module terminal 200 can be mounted to the front frame 320F. For example, the front frame 320F can provide a space or structure by which the module terminal 200 can be mounted or exposed, such as a terminal hole. The rear frame 320R can be configured to cover the opening at the rear side of the body frame 310. In addition, the rear hole HR can be formed in the rear frame 320R.

In this aspect, the flame or electrode discharge inside the module case 300 can be discharged upward and rearward through the top hole HV of the body frame 310 and the rear hole HR of the rear frame 320R. Also, a hole through which a flame or the like can be discharged is not formed in the front frame 320F. In this case, a flame, electrode discharge, or the like can be directed upward or rearward and not toward the front side.

A plurality of rear holes HR can be formed in the rear frame 320R. For example, as shown in FIG. 31, a plurality of rear holes HR can be formed in a horizontal and/or vertical direction in the rear frame 320R. Moreover, the plurality of rear holes HR can be formed in a substantially circular shape and can be configured to have no separate vertex. Also, the plurality of rear holes HR can be spaced apart from each other by a predetermined distance on the rear frame 320R.

According to this aspect, the flame at the rear side can be discharged more smoothly and quickly through the plurality of rear holes HR. In addition, according to this aspect, it is possible to prevent the rear hole HR or the rear frame 320R from being damaged or broken by discharge pressure of a flame, gas, or the like.

The battery module according to the present disclosure can further include a rear insulating cover 900R as the insulating cover 900, as shown in FIGS. 2 and 32.

The rear insulating cover 900R can include an electrically insulating material. For example, the rear insulating cover 900R can be made of a polymer material such as plastic. The rear insulating cover 900R can be interposed between the cell assembly 100 and the rear frame 320R. Accordingly, electrical insulation can be secured between the cell assembly 100 and the rear frame 320R. In particular, an electrical component such as the electrode lead 111 can be located at the rear side of the cell assembly 100. Also, the rear frame 320R can be made of an electrically conductive material such as aluminum. In this case, the rear insulating cover 900R made of an electrically insulating material can be interposed between the electrode lead 111 of the cell assembly 100 and the rear frame 320R, thereby electrically insulating them.

The rear insulating cover 900R can be configured to close the rear hole HR of the module case 300. That is, one or more rear holes HR can be formed in the rear frame 320R, so that the inner space of the module case 300 can be exposed to the outside. However, the rear insulating cover 900R can prevent the inner space of the module case 300 from being exposed to the outside. The rear insulating cover 900R can be provided at the inner side (front side) of the rear frame 320R to block the rear hole HR at the inner side.

In particular, as shown in FIG. 31, the rear insulating cover 900R can close the rear hole HR when the battery module is in a normal state, for example in a state where no flame or venting gas is generated inside the module case 300. In this case, a component accommodated inside the module case 300, for example the cell assembly 100, will not be exposed to the outside through the rear hole HR.

According to this aspect, when the battery module is in a normal state, foreign substances, such as dust or moisture, can be prevented from penetrating into the inner space of the module case 300 through the rear hole HR. In addition, according to this aspect, safety can be secured by preventing a conductor, a finger, or the like from entering through the rear hole HR.

The rear insulating cover 900R can closely contact the inner surface of the rear frame 320R. In this case, an accommodation space and a venting space can be secured wider inside the module case 300. Also, in this case, the effect of preventing penetration of foreign substances can be further improved.

The rear insulating cover 900R can be configured to at least partially expose the rear hole HR when heat is discharged from the cell assembly 100. For example, when a flame is generated in some of the battery cells 110 provided in the cell assembly 100 due to thermal runaway or the like, at least a part of the rear hole HR can be opened.

When the rear insulating cover 900R opens the rear hole HR, the inner space of the module case 300 can be exposed to the outside through the rear hole HR. Accordingly, the cell assembly 100 and the like accommodated inside the module case 300 can be exposed to the outside through the rear hole HR.

In this aspect, the configuration in which the rear insulating cover 900R opens the rear hole HR by heat can be implemented by deforming or changing the shape or state of at least a part of the rear insulating cover 900R by heat. In particular, the rear insulating cover 900R can be melted and/or lost due to the heat and pressure of the flame generated during thermal runaway. Also, due to such melting or disappearance, the rear insulating cover 900R will not completely close the rear hole HR any longer and can be separated from the rear hole HR, so that the rear hole HR is opened.

To this end, the rear insulating cover 900R can include a plastic material that melts at a certain temperature or higher. In particular, the rear insulating cover 900R can be made of a plastic material that is weak to heat so that it can be melted by a flame. For example, the rear insulating cover 900R can be made of PC (Poly Carbonate) material.

According to this aspect, the rear hole HR is completely closed when the battery module is in a normal state, so that waterproof and dustproof effects and electrical safety can be stably secured. Also, in an abnormal state where a flame or the like is generated inside the battery module, the rear hole HR can be opened so that the flame or the like generated inside the battery module can be smoothly discharged to the rear side. Therefore, the explosion of the battery module can be prevented by quickly lowering the internal pressure of the battery module, and it is also possible to effectively prevent a flame or the like from being ejected to the front side of the battery module where the module terminal 200 is located.

The rear frame 320R can have a rear fastening hole, as indicated by HLR in FIG. 32. In addition, the rear insulating cover 900R can have a rear fastening protrusion as indicated by PLR. Here, the rear fastening protrusion PLR can be inserted into the rear fastening hole HLR when assembling the battery module. A plurality of rear fastening protrusions PLR can be formed on the rear insulating cover 900R. In addition, to correspond to the plurality of rear fastening protrusions PLR, a plurality of rear fastening holes HLR can also be formed in the rear frame 320R.

Meanwhile, one or more rear holes HR can be formed in the rear frame 320R. In this case, the rear fastening hole HLR can be formed at a position different from that of the rear hole HR in the rear frame 320R. In particular, the rear fastening hole HLR can be formed at a position spaced apart from the rear hole HR in the rear frame 320R.

The rear fastening protrusion PLR can be inserted to penetrate the rear frame 320R from the inside to the outside. Also, in the rear fastening protrusion PLR, the outer end exposed to the outside of the rear frame 320R can be formed thicker than the penetrated portion, similar to the front fastening protrusion PLF depicted in FIG. 25. That is, the outer end of the rear fastening protrusion PLR can be larger than the size of the rear fastening hole HLR. At this time, the thick part of the outer end can be prepared by inserting the rear fastening protrusion PLR into the rear fastening hole HLR and then applying pressure thereto together with heat so that the rear fastening protrusion PLR is pressed.

According to this aspect of the present disclosure, the coupling strength between the rear frame 320R and the rear insulating cover 900R can be stably secured. Also, in this case, it is possible to prevent the rear insulating cover 900R from moving toward the electrode lead 111 and contacting the electrode lead 111 or the like. Accordingly, it is possible to prevent an electrical short circuit or the like from occurring due to damage or deformation of the rear insulating cover 900R or the electrode lead 111.

Meanwhile, as shown in FIGS. 31 and 32, the outer surface of the rear frame 320R can be formed to be concave inward in a portion where the rear fastening hole HLR is formed. In this case, a space where the thick end of the rear fastening protrusion PLR is seated can be provided in the rear frame 320R. Therefore, it is possible to prevent or minimize the generation of protruding parts toward the rear side of the battery module due to the rear fastening protrusion PLR.

As shown in FIG. 3, the bus bar assembly 400 can be disposed at the front side of the cell assembly 100 and connected to the electrode lead 111 at the front side. Also, as shown in FIG. 32, the bus bar assembly 400 can be disposed at the rear side of the cell assembly 100 and connected to the electrode lead 111 at the rear side.

In an aspect in which the bus bar assembly 400 is provided at the rear side of the cell assembly 100, the rear insulating cover 900R can include a material having a lower melting point than the bus bar housing 420 of the bus bar assembly 400 at the rear side. For example, both the bus bar housing 420 of the bus bar assembly 400 at the rear side and the rear insulating cover 900R can be made of plastic, but the plastic material constituting the rear insulating cover 900R can have a lower melting point than the plastic material constituting the bus bar housing 420 at the rear side. As a more specific example, when the rear insulating cover 900R is made of PC material, the bus bar housing 420 can be made of a material having a higher melting point than the PC material, for example as a modified polyphenylene oxide (MPPO) material.

According to this aspect of the present disclosure, when a thermal runaway situation occurs inside the battery module, the rear insulating cover 900R can melt or disappear before the bus bar housing 420 at the rear side. Therefore, before the bus bar housing 420 at the rear side is melted, the rear insulating cover 900R can be first melted to open the rear hole HR, so that the flame inside the battery module can be quickly and smoothly discharged to the outside. Therefore, the flame or the like can stay in the inner space of the module case 300, especially at the inner rear side, thereby preventing or delaying structural collapse of the bus bar housing 420 at the rear side.

The bus bar housing 420 of the bus bar assembly 400 at the rear side can include a rear housing protrusion. This will be described in more detail with further reference to FIG. 34.

Figure 34:
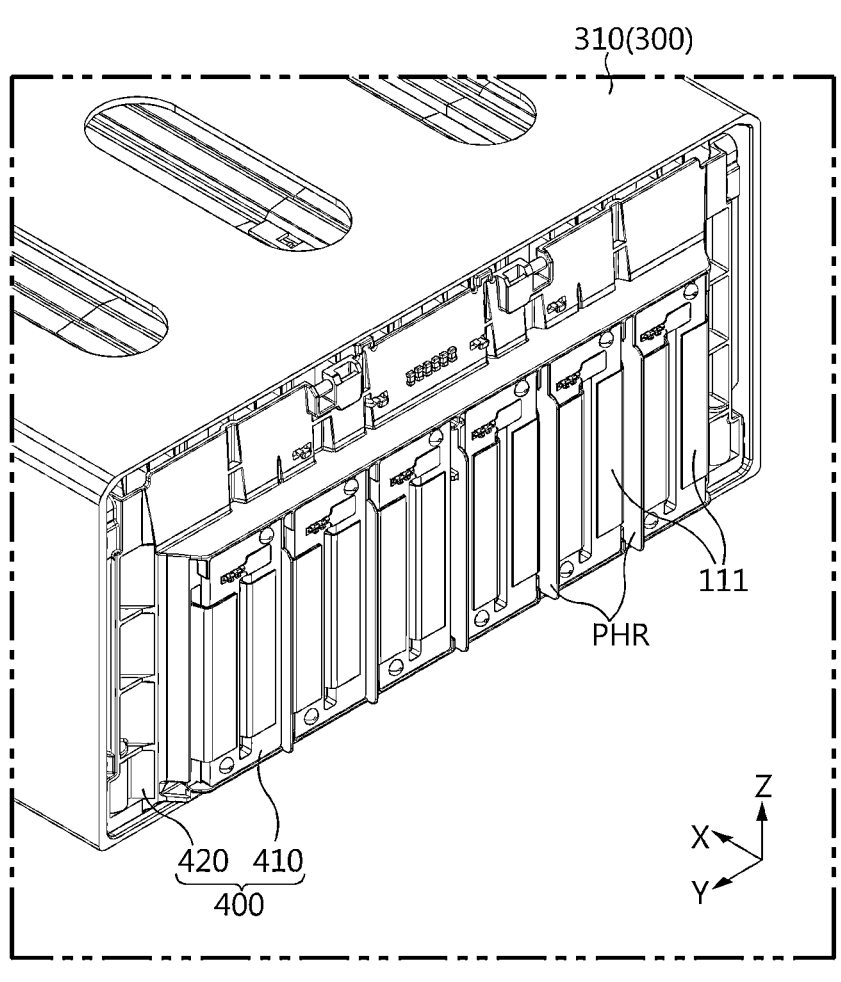
FIG. 34 is a diagram schematically showing some components of a battery module according to an aspect of the present disclosure.

FIG. 34 is a diagram schematically showing some components of a battery module according to an aspect of the present disclosure. In particular, FIG. 34 shows a form in which the rear frame 320R and the rear insulating cover 900R are removed at the rear side of the battery module.

Referring to FIG. 34, the bus bar assembly 400 at the rear side can include a bus bar terminal 410 and a bus bar housing 420. At this time, the bus bar housing 420 can have a rear housing protrusion as indicated by PHR. The rear housing protrusion PHR can protrude toward the rear insulating cover 900R located at the rear side. In particular, the bus bar terminal 410 is mounted to the bus bar housing 420, and the electrode lead 111 can be coupled in contact with the bus bar terminal 410 in a bent form. At this time, the rear housing protrusion PHR can protrude further to the rear side than the bus bar terminal 410 or the electrode lead 111 in contact with the bus bar terminal 410.

According to this aspect of the present disclosure, in a normal state, direct contact between the bus bar assembly 400 or the electrode lead 111 and the rear insulating cover 900R can be prevented more reliably. Therefore, it is possible to prevent the bus bar assembly 400 or the electrode lead 111 from being damaged by the rear insulating cover 900R even in the event of external vibration or impact.

In addition, according to this aspect, in a thermal runaway situation, by ensuring a sufficient empty space between the bus bar assembly 400 and the rear insulating cover 900R, a venting gas, flame, or the like can be smoothly discharged into the space. In addition, according to this aspect, in a state where the rear insulating cover 900R is melted, a space between the bus bar assembly 400 and the rear frame 320R can be secured at a certain level or more. Therefore, the flame or the like can be discharged more quickly and smoothly through the rear hole HR.

Also, according to this aspect, a physical distance between the rear frame 320R and the electrode lead 111 is maintained to a certain level or above, so that a stable electrical insulation distance can be secured.

The rear housing protrusion PHR can be elongated in the upper and lower direction. In particular, since the bus bar terminal 410 mounted to the bus bar housing 420 can be formed to be elongated in the upper and lower direction, the rear housing protrusion PHR can be formed to be elongated in the upper and lower direction like the bus bar terminal 410.

In addition, a plurality of bus bar terminals 410 can be arranged to be spaced apart from each other in the left and right direction in the bus bar housing 420. At this time, the rear housing protrusion PHR can be interposed between adjacent bus bar terminals 410 as shown in FIG. 34. Moreover, a plurality of rear housing protrusions PHR can be arranged in a horizontal direction in the bus bar housing 420. In this case, a separation distance between the bus bar assembly 400 and the rear insulating cover 900R can be stably secured in the entire region along the horizontal direction at the rear side of the cell assembly 100. Also, in this case, a physical separated state between adjacent bus bar terminals 410 can be stably maintained.

Meanwhile, in an aspect in which the rear insulating cover 900R and the front insulating cover 900F are provided in the battery module, the front insulating cover 900F can include a material having a higher melting point than the rear insulating cover 900R. In particular, both the front insulating cover 900F and the rear insulating cover 900R can be made of a plastic material, and the front insulating cover 900F can be made of a plastic material with a higher melting point than the rear insulating cover 900R.

According to this aspect of the present disclosure, when a situation such as thermal runaway occurs inside the battery module, the rear insulating cover 900R can melt before the front insulating cover 900F. Accordingly, the rear hole HR can first be opened before the front insulating cover 900F is melted or lost. Therefore, the flame or high-temperature venting gas generated inside the module case 300 can be quickly discharged to the outside through the rear hole HR, and the flame or the like can be suppressed from being directed to the front side.

In the module case 300, the rear hole HR can be configured to communicate with the inner space at the upper side of the cell assembly 100. This will be described in more detail with further reference to FIGS. 35 and 36.

Figure 35:
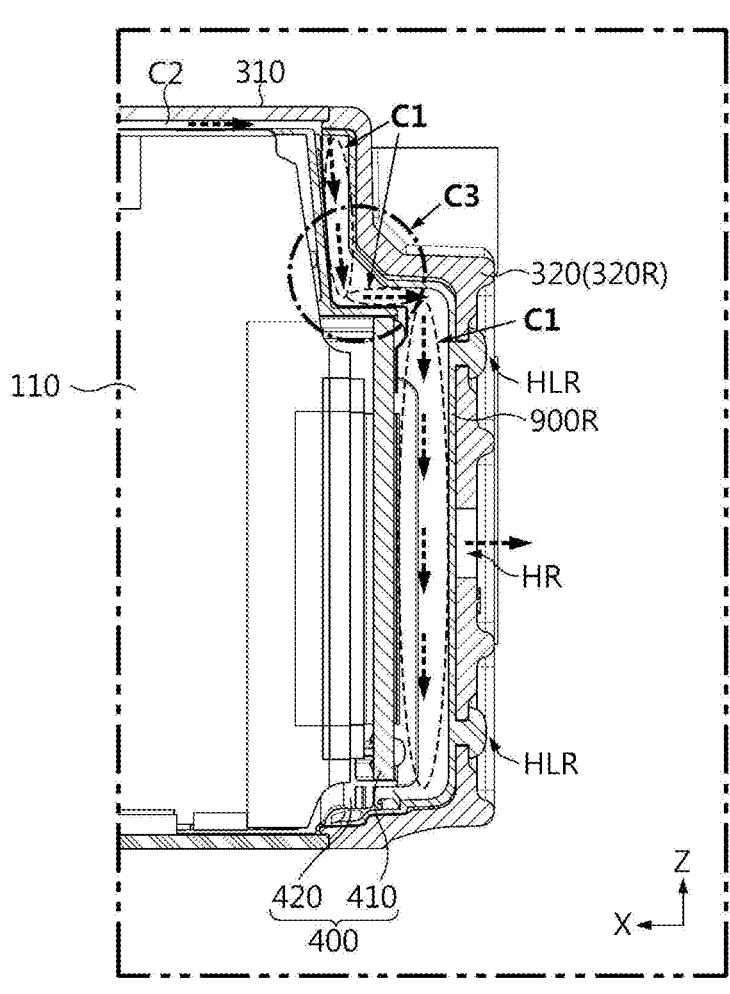
FIG. 35 is a cross-sectional view showing a rear side of a battery module according to an aspect of the present disclosure.
Figure 36:
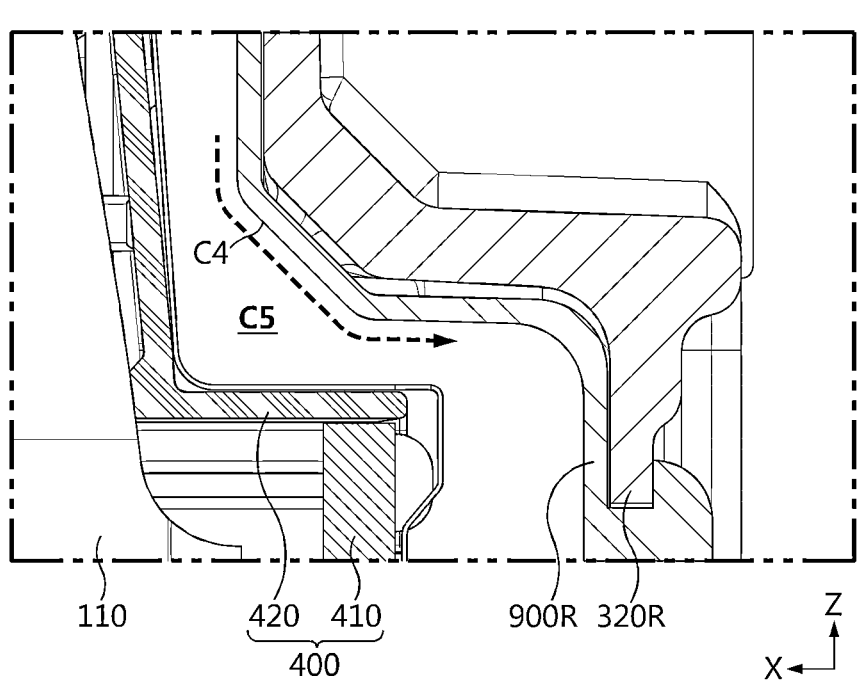
FIG. 36 is an enlarged view showing the portion C3 of FIG. 35.

FIG. 35 is a cross-sectional view showing a rear side of a battery module according to an aspect of the present disclosure. FIG. 36 is an enlarged view showing the portion C3 of FIG. 35.

First, referring to FIG. 35, an empty space can be formed between the cell assembly 100 and the rear insulating cover 900R or the rear frame 320R, as indicated by C1. In particular, the rear empty space C1 can be formed to extend from the inner upper portion of the rear frame 320R to a portion where the rear hole HR is formed.

Also, the rear empty space C1 can be configured to be connected to an upper space of the cell assembly 100, as indicated by C2, inside the module case 300. Accordingly, in a state where the rear insulating cover 900R is removed, it can be regarded that the rear hole HR formed in the rear frame 320R communicates with the upper space of the cell assembly 100. Moreover, the rear frame 320R can be configured to be continuously spaced apart from the cell assembly 100 or the bus bar assembly 400 from the top to the rear hole HR.

According to this aspect of the present disclosure, the flame ejected from the upper side can be smoothly induced and discharged toward the rear hole HR. For example, as indicated by the dotted arrow in FIG. 35, the flame, electrode discharge, venting gas, or the like discharged to the upper space C2 of the cell assembly 100 can be discharged not only to the top hole HV of the module case 300 but also to the rear hole HR. Therefore, by allowing the flame or gas to be smoothly discharged upward and rearward, the internal pressure of the battery module can be quickly lowered, and also the flame directed toward the front side can be more effectively suppressed.

The module case 300 can have an inclined portion. The inclined portion can be configured such that the distance from the cell assembly 100 gradually increases toward the rear hole HR. Moreover, the inclined portion can be provided on the inner surface of the module case 300.

For example, referring to FIG. 36, an inclined portion can be formed in the rear frame 320R, as indicated by C4. The inclined portion C4 can be provided in a direction along which the inclined portion C4 extends away from the cell assembly 100 from the top to the bottom, namely toward the rear side (−X-axis direction). The inclined portion can be implemented in a form in which corners are rounded (chamfered) on the inner surface of the rear frame 320R.

According to this aspect of the present disclosure, a flame or the like can be discharged more smoothly toward the rear hole HR of the module case 300. In particular, the empty space between the cell assembly 100 and the rear frame 320R can be expanded due to the inclined portion C4, as indicated by C5 in FIG. 36. Accordingly, a wider venting path can be secured at the rear side of the cell assembly 100.

Also, according to this aspect, when the flame or the like is discharged at the upper side of the cell assembly 100 toward the rear hole HR, the flame or the like can more smoothly move along the inclined surface, as indicated by a dotted arrow in FIG. 36. In particular, in the space at the rear side of the cell assembly 100, the discharge path of the flame can be formed at a gentle obtuse angle rather than at a right angle due to the inclined portion C4.

Figure 37:
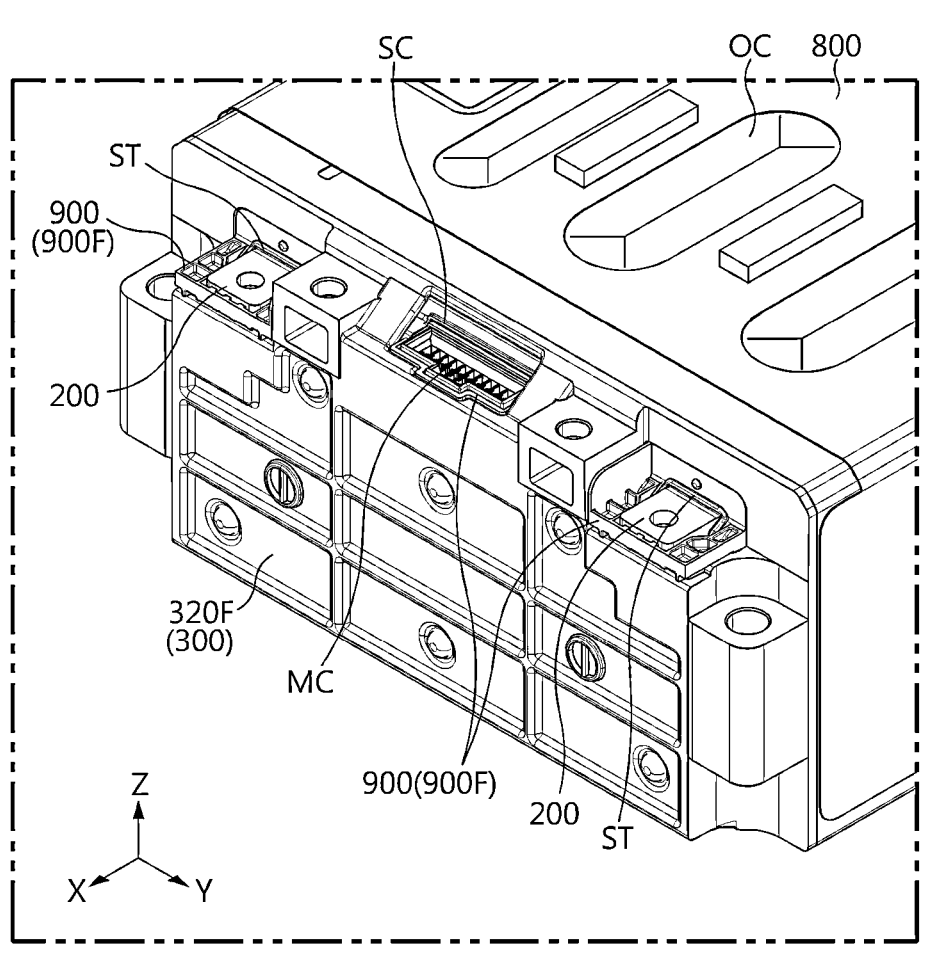
FIG. 37 is a perspective view showing a front side of a battery module according to an aspect of the present disclosure.
Figure 38:
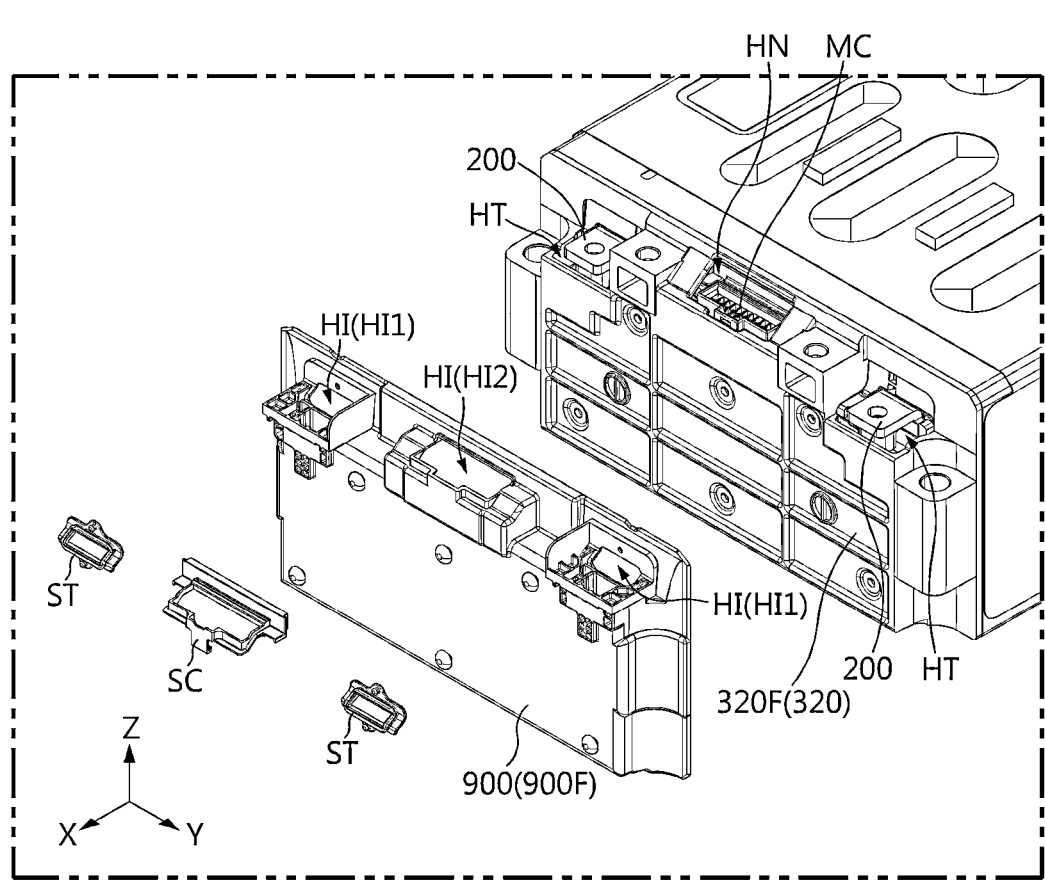
FIG. 38 is an exploded perspective view showing some components of FIG. 37.

FIG. 37 is a perspective view showing a front side of a battery module according to an aspect of the present disclosure. Also, FIG. 38 is an exploded perspective view showing some components of FIG. 37. In particular, FIG. 38 shows a state where some components located at the inside of the battery module are moved to the outside while leaving the front frame, which is a component located at the outside of the battery module.

Referring to FIGS. 37 and 38, as described above, a terminal hole HT can be formed in the module case 300, particularly in the front frame 320F, to allow the module terminal 200 to pass therethrough. Also, the module terminal 200 can be exposed to the outside through this terminal hole HT.

In addition, the battery module according to the present disclosure can further include a terminal sealing member ST. The terminal sealing member ST can be configured to seal the space between the terminal hole HT and the module terminal 200. For example, referring to FIG. 38, since the terminal hole HT of the front frame 320F is formed larger than the module terminal 200, an empty space can exist between the module terminal 200 and the front frame 320F. At this time, the terminal sealing member ST can seal at least a part of the separation space between the front frame 320F and the module terminal 200 in the terminal hole HT.

In addition, as described above, the battery module according to an aspect of the present disclosure can further include a front insulating cover 900F. Moreover, the front insulating cover 900F can electrically insulate the front frame 320F and the module terminal 200 at a portion where the terminal hole HT of the front frame 320F is formed. In this case, the front insulating cover 900F can be interposed in the space between the front frame 320F and the module terminal 200 as shown in FIG. 37. However, in the front insulating cover 900F, an insulation hole can be formed in order to expose the module terminal 200 to the outside, as indicated by HI. In particular, the insulation hole HI through which the module terminal 200 is exposed can be indicated as HI1 and referred to as a first insulation hole in order to be distinguished from the insulation hole HI through which the module connector MC, explained later, is exposed. Here, the insulation hole HI of the front insulating cover 900F can communicate with the terminal hole HT of the front frame 320F. However, the insulation hole HI has a smaller size than the terminal hole HT and thus can be interposed then a space between the module terminal 200 and the end frame 320 to electrically insulate them.

In this aspect, the terminal sealing member ST can be interposed between the first insulation hole HI1 of the front insulating cover 900F and the module terminal 200. Accordingly, the space between the module terminal 200 and the terminal hole HT can be sealed by the front insulating cover 900F and the terminal sealing member ST.

The terminal sealing member ST can be made of an elastic material to secure sealing force. In addition, the terminal sealing member ST can be made of a heat-resistant material to withstand heat or flame. In particular, the terminal sealing member ST can be made of a heat-resistant rubber material. For example, the terminal sealing member ST can be made of or include a fluororubber material.

According to this aspect of the present disclosure, exposure of a flame or the like to a portion where the module terminal 200 is exposed can be prevented or suppressed. In particular, according to this aspect, it is possible to minimize the leakage of flame or the like along the periphery of the module terminal 200. Therefore, it is possible to more effectively restrict that a flame is ejected to another battery module located at the front side of the battery module where the module terminal 200 is located, or to a separate inter-module bus bar that connects modules, to cause thermal runaway propagation between modules or pack voltage drop.

In addition, as described above, the battery module according to the present disclosure can further include a module connector MC. The module connector MC is a connection component for exchanging various information with the outside of the battery module, and can transmit and receive electrical signals.

In addition, a connector hole for inserting the module connector MC can be formed in the module case 300. The connector hole can be formed to penetrate the module case 300 in the inner and outer direction, as indicated by HN in FIG. 38. In particular, the module connector MC can be provided at the front side of the battery module, like the module terminal 200. Therefore, the connector hole HN can also be formed in the front frame 320F together with the terminal hole HT. In addition, when the front insulating cover 900R is interposed between the cell assembly 100 and the front frame 320F, a second insulation hole HI2 can be formed in the front insulating cover 900R as shown in FIG. 38 so that the module connector MC can be exposed or penetrated therethrough.

In the aspect in which the module connector MC is provided as above, the battery module according to the present disclosure can further include a connector sealing member SC, as shown in FIGS. 37 and 38. The connector sealing member SC can be configured to seal the space between the module case 300 and the module connector MC in the connector hole HN of the module case 300.

The connector sealing member SC can be made of an elastic material to secure sealing force. In addition, the connector sealing member SC can be made of a heat-resistant material to withstand heat or flame. In particular, the connector sealing member SC can be made of a heat-resistant rubber material. For example, the connector sealing member SC can be made of or include a fluororubber material.

According to this aspect of the present disclosure, it is possible to prevent or suppress exposure of a flame or the like to a portion where the module connector MC is exposed. In particular, according to this aspect, it is possible to minimize the leakage of flame or the like along the periphery of the module connector MC. Therefore, it is possible to more effectively restrict that a flame is ejected to another battery module located at the front side of the battery module where the module terminal 200 is located, or to a separate inter-module bus bar that connects modules, to cause thermal runaway propagation between modules or pack voltage drop.

Moreover, if the aspect in which the terminal sealing member ST and/or the connector sealing member SC is provided as above is combined with other aspects described above, the flame or the like discharged at the front side can be more effectively suppressed. In particular, when this aspect is combined with the aspect in which the top hole HV is provided at the upper side, the aspect in which the expansion member 500 is disposed at the front side, and/or the aspect in which the rear hole HR is provided at the rear side, the effect of inducing upper and/or rear discharge of flame and suppressing front discharge can be remarkably improved.

A battery pack according to the present disclosure can include one or more battery modules according to the present disclosure. For example, the battery pack according to the present disclosure can include a pack housing PH, as shown in FIG. 5, and can be configured to include a plurality of battery modules according to the present disclosure therein. In particular, inside the pack housing PH, two or more battery modules can be disposed to have the front sides facing each other so that the module terminals 200 are disposed adjacent to each other. At this time, when the battery module according to the present disclosure is accommodated, even in the arrangement in which the module terminals 200 face each other, the flame or the like directed to other battery modules can be effectively suppressed or delayed. Also, in this case, it is possible to prevent a short circuit from occurring between the module terminals 200. Therefore, in an emergency situation such as thermal runaway, the effect of preventing heat propagation between modules is excellent, and it is possible to ensure sufficient time for a user or the like to cope with the situation or escape.

In addition, the battery pack according to the present disclosure can further include various components other than these battery modules, for example various components of the battery pack known at the time of filing of this application, such as a BMS or a bus bar, a relay, and a current sensor.

Meanwhile, components such as a BMS, a bus bar, a relay, and a current sensor can be included as components of the battery module according to the present disclosure. In this case, the components such as a BMS, a bus bar, a relay, and a current sensor can be provided inside the module case 300. In this case, the battery module can be referred to as a battery pack, and the module case 300 can be referred to as a pack housing PH. Moreover, in this case, the battery module according to the present disclosure can be a cell-to-pack type battery pack in which the battery cells 110 are directly mounted in the pack housing PH.

The battery module according to the present disclosure can be applied to a vehicle such as an electric vehicle or a hybrid electric vehicle. That is, the vehicle according to the present disclosure can include the battery module according to the present disclosure or the battery pack according to the present disclosure. In addition, the vehicle according to the present disclosure can further include various other components included in a vehicle in addition to the battery module or the battery pack. For example, the vehicle according to the present disclosure can further include a vehicle body, a motor, a control device such as an electronic control unit (ECU), and the like in addition to the battery module according to the present disclosure.

The present disclosure has been described in detail. However, it should be understood that the detailed description and specific examples, while indicating preferred aspects of the disclosure, are given by way of illustration only, since various changes and modifications within the scope of the disclosure will become apparent to those skilled in the art from this detailed description.

REFERENCE SIGNS

100: cell assembly
110: battery cell
111: electrode lead
120: taping member
200: module terminal
300: module case
310: body frame, 320: end frame
320F: front frame, 320R: rear frame
400: bus bar assembly
410: bus bar terminal, 420: bus bar housing
500: expansion member
510: first expansion sheet, 520: second expansion sheet
600: top cover
700: printed circuit board
800: blocking cover
810: first sheet cover, 820: second sheet cover, 830: third sheet cover
900: insulating cover
900F: front insulating cover, 900R: rear insulating cover
S1: accommodation portion, S2: sealing portion
S2U: top sealing portion, S2F: front end sealing portion, S2R: rear end sealing portion
DT: cell adhesion member
HT: terminal hole
HI: insulation hole
HI1: first insulation hole, HI2: second insulation hole
HV: top hole
HC: cover hole
HR: rear hole
HN: connector hole
PH: pack housing
M1 to M8: battery module (first to eight modules)
MC: module connector
OC: opening and closing portion
OCL: cutting line, OCH: blocking hole, OCW: blocking protrusion
TH: thermistor
PT: protection member
FR: spacer
T1 to T3: taping member (first to third tapes)
CP: compression pad
HLF: front fastening hole, HLR: rear fastening hole
PLF: front fastening protrusion, PLR: rear fastening protrusion
PHF: front housing protrusion, PHR: rear housing protrusion
ST: terminal sealing member
SC: connector sealing member

What is claimed is:

1. A battery module, comprising:
a cell assembly having a plurality of battery cells stacked side by side in a left and right direction, each battery cell having a battery case and an electrode assembly in the battery case, the battery case having a front end sealing portion and a rear end sealing portion and a top sealing portion extending between the front end sealing portion and the rear end sealing portion, a pair of electrode leads extending from the battery case and having at least one taping member partially attached to an exterior surface of the top sealing portion, an area of the top sealing portion not having the at least one taping member being an unattached region;
a module terminal electrically connected to the cell assembly; and
a module case configured to have an outer side at which the module terminal is installed, accommodate the cell assembly in an inner space thereof, and have at least one top hole communicating with the inner space and formed at an upper side thereof,
wherein at least a part of the unattached region is under the at least one top hole, and
wherein the at least one taping member is attached to an exterior surface of the top sealing portion.

2. The battery module according to claim 1, wherein the module terminal is located at a front side of the module case.

3. The battery module according to claim 1, wherein the at least one taping member is a plurality of taping members, and the plurality of taping members are spaced apart in a front and rear direction at the top sealing portion of at least one battery cell of the plurality of battery cells.

4. The battery module according to claim 3, wherein at least a part of the at least one top hole exposes a portion between the plurality of taping members.

5. The battery module according to claim 1, wherein the at least one top hole is configured such that, at the top of the cell assembly, the unattached region is exposed more than the taping member.

6. The battery module according to claim 1, wherein the module case is configured such that the at least one top hole is located above all of the plurality of battery cells.

7. The battery module according to claim 1, further comprising a thermistor configured to measure a surrounding temperature and disposed at an upper side of the at least one taping member.

8. The battery module according to claim 1, further comprising a top cover made of an electrical insulation material, interposed between an upper portion of the cell assembly and the module case, and having at least one cover hole aligned with the at least one top hole.

9. The battery module according to claim 8, wherein the at least one cover hole is a plurality of cover holes having a smaller size than the at least one top hole, the plurality of cover holes being disposed to correspond to the at least one top hole.

10. The battery module according to claim 9, wherein the plurality of cover holes is formed with a honeycomb structure.

11. The battery module according to claim 8, further comprising a printed circuit board interposed between the cell assembly and the top cover and configured to transmit an electrical signal for the cell assembly,
wherein the top cover is configured such that the at least one cover hole is not aligned with the printed circuit board.

12. The battery module according to claim 11, wherein the module case is configured such that the at least one top hole is aligned with the upper side of the printed circuit board.

13. The battery module according to claim 1, further comprising a blocking cover located at an outer side of the module case and configured to open and close the at least one top hole according to an internal pressure of the module case.

14. The battery module according to claim 13, further comprising a spacer disposed at the top of the blocking cover.

15. A battery pack, comprising the battery module according to claim 1.

16. A vehicle, comprising the battery module according to claim 1.

17. A battery module, comprising:

a cell assembly having a plurality of battery cells stacked in a first direction, each battery cell having a battery case and an electrode assembly in the battery case, the battery case having a front end sealing portion and a rear end sealing portion and a top sealing portion extending between the front end sealing portion and the rear end sealing portion and having at least one taping member attached to the top sealing portion of each of the plurality of battery cells, an area of the top sealing portion not having the at least one taping member being an unattached region;

a module case configured accommodate the cell assembly in an inner space thereof; and a plurality of top holes formed at an upper side of the module case, wherein the plurality of top holes are arranged in rows spaced from each other in a first direction, wherein top holes of adjacent rows are offset from each other so as not to be aligned in the first direction so that a portion of each of the plurality of battery cells is exposed, wherein the at least one taping member is a plurality of taping members, and wherein the plurality of taping members are attached with different bonding strengths.

18. The battery module of claim 17, wherein taping members of the plurality of taping members closer to an end of each of the plurality of battery cells have a higher bonding strength than taping members of the plurality of taping members further from the end of each of the plurality of battery cells.

19. The battery module of claim 17, further comprising a blocking cover on the upper side of the module case, the blocking cover having a plurality of opening and closing portions aligned with the plurality of top holes, the plurality of opening and closing portions rupturing when internal pressure of the module case exceeds a predetermined value.

\* \* \* \* \*